(12) United States Patent
Shem-Tov et al.

(10) Patent No.: US 12,169,416 B1
(45) Date of Patent: Dec. 17, 2024

(54) ROBOTIC PHARMACEUTICAL PREPARATION SYSTEM HAVING A MOVABLE PLATFORM

(71) Applicant: Equashield Medical Ltd, Migdal Tefen (IL)

(72) Inventors: Eric Shem-Tov, Ramat Hasharon (IL); Marino Kriheli, Savion (IL); Boaz Slav, Haifa (IL)

(73) Assignee: EQUASHIELD MEDICAL LTD, Migdal Tefen (IL)

( * ) Notice: Subject to any disclaimer, the term of this patent is extended or adjusted under 35 U.S.C. 154(b) by 0 days.

(21) Appl. No.: 18/584,981

(22) Filed: Feb. 22, 2024

Related U.S. Application Data

(63) Continuation of application No. 18/584,924, filed on Feb. 22, 2024.

(60) Provisional application No. 63/599,138, filed on Nov. 15, 2023, provisional application No. 63/447,840, filed on Feb. 23, 2023.

(51) Int. Cl.
| | |
|---|---|
| *A61J 1/16* | (2023.01) |
| *A61J 1/20* | (2006.01) |
| *B65B 3/00* | (2006.01) |
| *G05D 3/12* | (2006.01) |

(52) U.S. Cl.
CPC .............. *G05D 3/12* (2013.01); *A61J 1/2065* (2015.05); *A61J 1/2096* (2013.01); *B65B 3/003* (2013.01); *A61J 1/16* (2013.01)

(58) Field of Classification Search
CPC ....... G05D 3/12; A61J 1/16; A61J 1/20; A61J 1/2065; A61J 1/2096; B65B 3/003
See application file for complete search history.

(56) References Cited

U.S. PATENT DOCUMENTS

| | | | | |
|---|---|---|---|---|
| 4,187,890 | A * | 2/1980 | Stach | A61M 5/1782 141/94 |
| 5,337,919 | A * | 8/1994 | Spaulding | B65G 1/1373 221/265 |
| 5,456,887 | A | 10/1995 | Calvo et al. | |
| 6,360,794 | B1 * | 3/2002 | Turner | G01N 35/1079 141/130 |
| 7,783,383 | B2 * | 8/2010 | Eliuk | A61J 3/002 700/214 |
| 7,913,720 | B2 | 3/2011 | Tribble et al. | |

(Continued)

FOREIGN PATENT DOCUMENTS

| | | |
|---|---|---|
| EP | 2298270 A1 | 3/2011 |
| EP | 2915520 A1 | 9/2015 |

(Continued)

*Primary Examiner* — Nicolas A Arnett
(74) *Attorney, Agent, or Firm* — Workman Nydegger

(57) ABSTRACT

A pharmaceutical preparation system is provided including: a rigid system infrastructure including a top portion, a bottom portion substantially parallel to the top portion, and a connecting portion extending between the top and the bottom portions along a vertical axis; at least one platform comprising at least one container-receiving module configured to receive at least one fluid container; a lift mechanism configured as part of the connecting portion, the lift mechanism being operably connected to the platform for lifting and lowering the platform along the vertical axis relative to the connecting portion.

23 Claims, 35 Drawing Sheets

(56) References Cited

U.S. PATENT DOCUMENTS

| | | | |
|---|---|---|---|
| 8,191,339 B2* | 6/2012 | Tribble | B65C 3/26 |
| | | | 53/485 |
| 8,225,824 B2 | 7/2012 | Eliuk et al. | |
| 8,267,129 B2 | 9/2012 | Doherty et al. | |
| 8,276,623 B2 | 10/2012 | Van Vreeland et al. | |
| 8,408,257 B2 | 4/2013 | Ono et al. | |
| 8,414,556 B2 | 4/2013 | Garfield et al. | |
| 8,596,309 B2* | 12/2013 | Mizuno | A61J 3/002 |
| | | | 141/2 |
| 8,807,177 B2* | 8/2014 | Strangis | B63C 9/0005 |
| | | | 604/416 |
| 9,043,019 B2 | 5/2015 | Eliuk et al. | |
| 9,254,928 B2* | 2/2016 | Fukuda | G16H 20/17 |
| 9,433,558 B2* | 9/2016 | Okuda | A61J 3/002 |
| 10,181,186 B2 | 1/2019 | Kriheli et al. | |
| 11,446,208 B2 | 9/2022 | Kato et al. | |
| 2008/0051937 A1 | 2/2008 | Khan et al. | |
| 2008/0114328 A1* | 5/2008 | Doherty | A61J 1/2096 |
| | | | 604/414 |
| 2012/0205000 A1 | 8/2012 | Phipps et al. | |
| 2012/0241043 A1 | 9/2012 | Perazzo et al. | |
| 2013/0255828 A1 | 10/2013 | Mengibar Rivas | |
| 2014/0311621 A1 | 10/2014 | Okuda et al. | |
| 2016/0200462 A1 | 7/2016 | Kriheli et al. | |
| 2019/0210858 A1 | 7/2019 | Hill | |
| 2019/0274926 A1* | 9/2019 | Liu | B01F 33/84 |

FOREIGN PATENT DOCUMENTS

| | | |
|---|---|---|
| WO | 2009062316 A1 | 5/2009 |
| WO | 2018174710 A1 | 9/2018 |

* cited by examiner

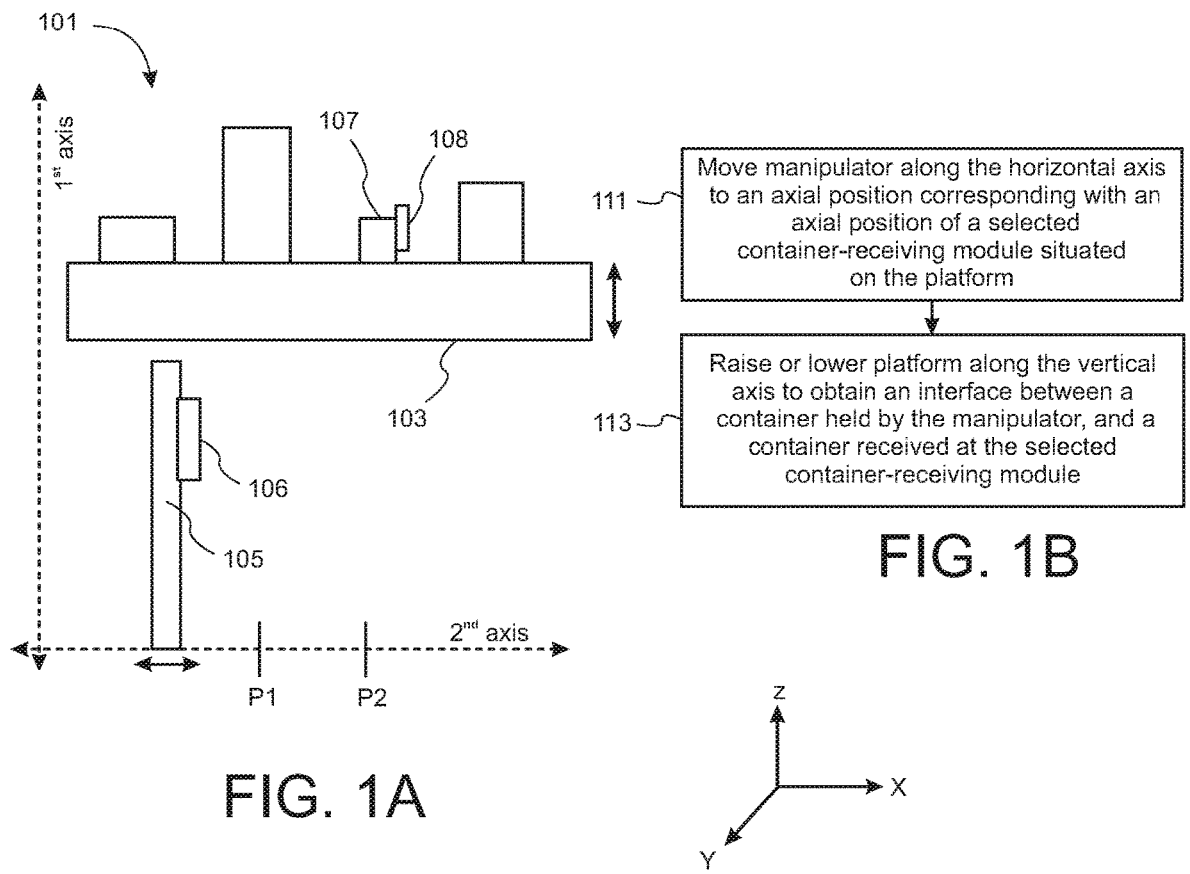

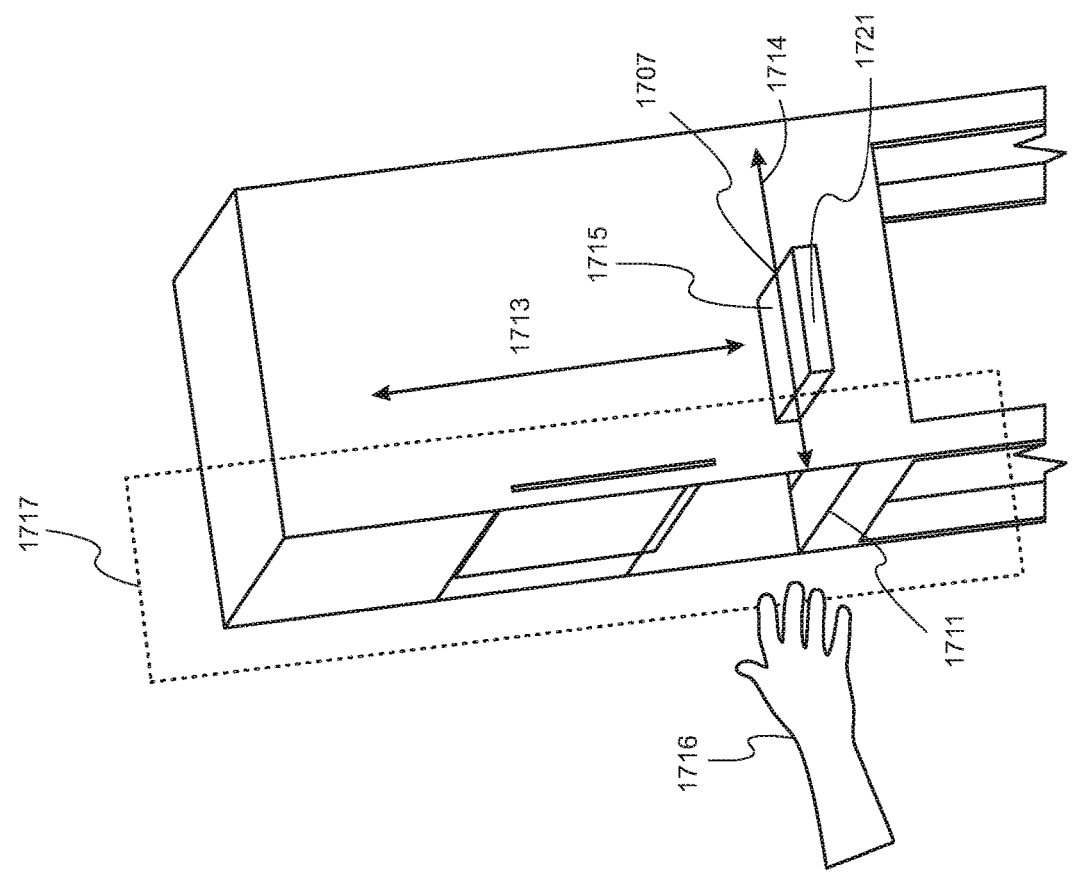
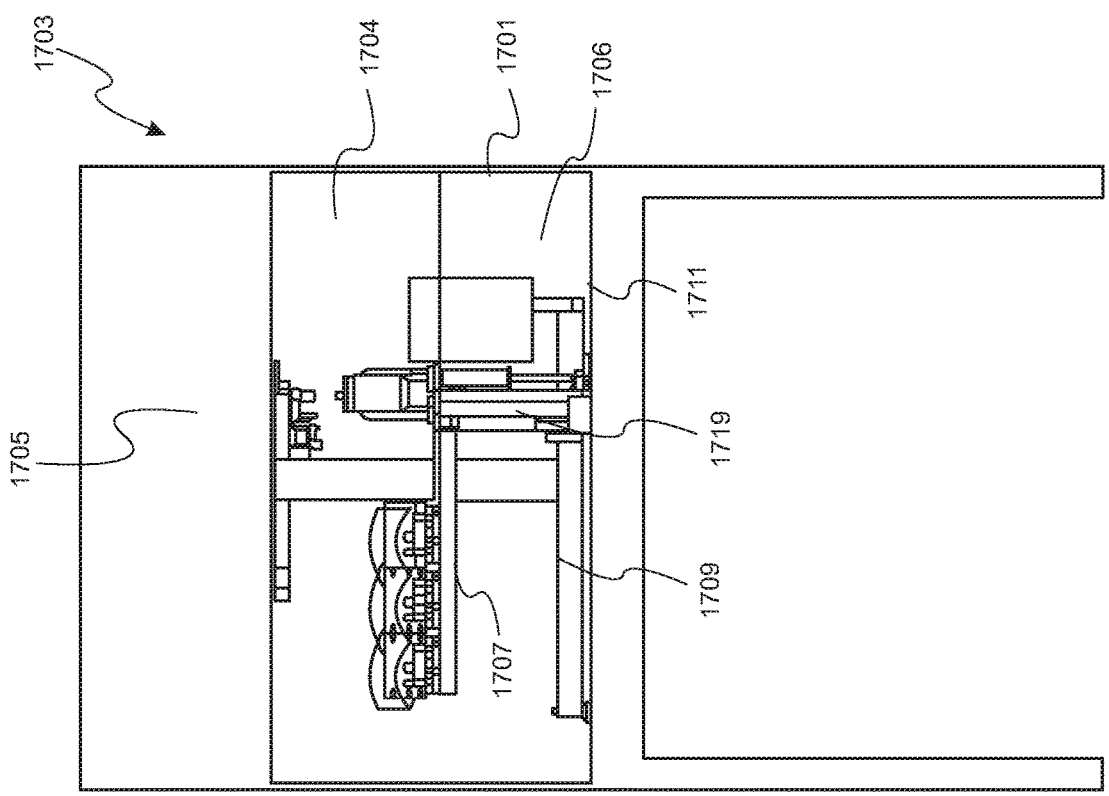
FIG. 17B
FIG. 17A

ROBOTIC PHARMACEUTICAL PREPARATION SYSTEM HAVING A MOVABLE PLATFORM

CROSS-REFERENCE TO RELATED APPLICATIONS

This application is a continuation of U.S. patent application Ser. No. 18/584,924, filed Feb. 22, 2024, which claims the benefit of and priority to U.S. Provisional Patent Applications Ser. Nos. 63/599,138 filed on Nov. 15, 2023 and 63/447,840 filed Feb. 23, 2023, each of which is incorporated herein by reference in its entirety.

TECHNOLOGICAL FIELD

The present application relates to robotic pharmaceutical preparation systems and more particularly to a pharmaceutical preparation system having a movable platform.

BACKGROUND

U.S. Pat. No. 9,433,558B2 discloses "A medicine mixing apparatus transfusing a medicine using a syringe includes a medicine cassette holding a medicine container, a lifting unit moving the medicine cassette upward and downward to a middle position or a lower position of a main body while maintaining a horizontal attitude of the medicine cassette, a first holding portion held by the main body, and a second driving unit which drives a plunger of the syringe held by the first holding portion to transfuse the medicine."

GENERAL DESCRIPTION

According to an aspect of some embodiments there is provided a pharmaceutical preparation system defining first and second axes which intersect each other, the system comprising:
  at least one platform comprising at least one container-receiving module configured to receive a first container;
  a first mechanism operably connected to the platform for linearly displacing the platform along the first axis;
  a manipulator configured for holding and manipulating a second container;
  a second mechanism operably connected to the manipulator for linearly displacing the manipulator along the second axis; and
  a controller configured for:
    a. instructing the second mechanism to linearly displace the manipulator;
    b. instructing the first mechanism to linearly displace the platform; and
    c. synchronizing actuation of the first and second mechanisms to enable a fluid interface between the first container received at the at least one container-receiving module and the second container held by the manipulator.

In some embodiments, the first and second axes lie on the same plane.

In some embodiments, the platform is movable only along the first axis, and the manipulator is movable only along the second axis.

In some embodiments, the first axis constitutes a vertical axis of the system, and the second axis constitutes a horizontal axis of the system.

In some embodiments, the first mechanism comprises a lift which is configured to raise or lower the platform along the vertical axis, and the second mechanism comprises a movement mechanism which is configured to drive the manipulator along the horizontal axis.

In some embodiments, the controller is configured to instruct the movement mechanism to move the manipulator to an axial position which corresponds with that of the at least one container-receiving module; and then to instruct the lift mechanism to raise or lower the platform to obtain said fluid interface.

In some embodiments, the at least one container-receiving module comprises at least one of: an IV bag holder, with the first container constituting an IV bag; a vial holder, with the first container constituting a vial.

In some embodiments, the second container comprises a syringe assembly, and wherein the manipulator comprises: one or more grippers for gripping the syringe assembly, and a plunger-flange receiver for operating a plunger of the syringe assembly.

In some embodiments, the second mechanism is configured to move the manipulator between a home position and at least one working position; wherein at the home position the manipulator does not interfere with movement of the platform, and wherein at the working position the manipulator is located at an axial position along the second axis which corresponds with an axial position of the at least one container-receiving module.

In some embodiments, the system comprises multiple container-receiving modules, wherein the second mechanism is configured to move the manipulator between multiple working positions associated with said multiple container-receiving modules.

In some embodiments, the platform defines a recess for the manipulator to fit within or extend through when the platform is aligned with the manipulator, and the manipulator is at the home position.

In some embodiments, the controller is configured to instruct movement of the second mechanism only when the platform is raised or lowered to a position in which the platform does not interfere with movement of the manipulator.

In some embodiments, the system further comprises a system infrastructure defining top and bottom portions which are parallel to the platform, and a connecting portion extending vertically between the top and bottom portions.

In some embodiments, the connecting portion can be formed in one or more parts, at least one of said one or more parts being detachably connectable to at least one of: at least another one of said one or more parts, and at least one portion of the system infrastructure. In some embodiments, the part(s) that is/are detachably connectable can be connected to the top portion and can be detachably connectable to other parts (of the connecting portion or the system infrastructure together with the top portion. For instance, the detachably connectable part(s) can be modularly formed and can be removed or assembled with the system in modular manner. This facilitates easy assembly/disassembly of the system within/from a hood and also facilitates easy cleaning and maintenance of the system.

In some embodiments, the platform is configured to be raised or lowered by the lift along at least a portion of a length of the connecting portion of the infrastructure.

In some embodiments, the manipulator is movable by the movement mechanism along at least a portion of a length of the bottom portion of the infrastructure.

In some embodiments, the system comprises a linear rail extending along said at least a portion of the length of the bottom portion, wherein the movement mechanism comprises a linear motor for driving the manipulator along the rail.

In some embodiments, the system comprises a plurality of imagers positioned and configured for one or more of: detection of presence of the first container and/or second container, detection of fluid related parameters of the first container and/or second container.

In some embodiments, the controller is configured to receive image data from the plurality of imagers, and to instruct the first and second mechanisms based on the received image data.

In some embodiments, the platform dimension along the second axis of the system is at least 3 as long as its dimension along the first axis and at least 2 times as long as its dimension along a third axis which is perpendicular to the first and second axis.

In some embodiments, the platform comprises a rectangular profile.

According to an aspect of some embodiments there is provided a pharmaceutical preparation hood, comprising:
a housing which defines an inner volume;
a work surface located within the inner volume;
an access window formed in the housing and leading from an exterior of the hood to the work surface;
a pharmaceutical preparation system positioned on the work surface, the system comprising:
  at least one platform comprising at least one container-receiving module configured to receive a first container;
  a first mechanism operably connected to the platform for linearly displacing the platform along a first axis;
  a manipulator configured for holding and manipulating a second container;
  a second mechanism operably connected to the manipulator for linearly displacing the manipulator along a second axis, transverse to the first axis;
wherein the first mechanism is configured to move the platform at least between: a first level in which the at least one container-receiving module is manually accessible via the access window, and a second level in which the at least one container-receiving module is positioned away from the access window and is inaccessible to the user.

In some embodiments, the system comprises a controller configured for:
a. instructing the second mechanism to linearly displace the manipulator;
b. instructing the first mechanism to linearly displace the platform; and
c. synchronizing actuation of the first and second mechanisms to enable a fluid interface between the first container received at the at least one container-receiving module and the second container held by the manipulator.

In some embodiments, the at least one platform is parallel to the work surface.

In some embodiments, the first axis is a vertical axis of both the system and the hood; and the second axis is a horizontal axis of both the system and the hood.

In some embodiments, the first container comprises a vial or an IV bag, and the second container comprises a syringe assembly.

In some embodiments, at the second level the platform is distanced from the work surface a greater distance than at the first level.

In some embodiments, a long dimension of the access window is parallel to the second axis, and wherein the long dimension is at least 3 times longer than a short dimension of the access window.

In some embodiments, the system comprises multiple container-receiving modules and wherein at least at the first level, the multiple container-receiving modules are arranged linearly along the platform, parallel to the long dimension of the access window.

In some embodiments, the multiple container-receiving modules are positioned at a depth of the hood which is in direct manual reach of a user located in front of the access window.

In some embodiments, the system is free of a permanent anchoring to the hood and can be removed from the hood.

In some embodiments, the second mechanism is configured to move the manipulator between a home position and at least one working position; wherein at the home position the manipulator does not interfere with movement of the platform, and the second container is manually accessible via the access window.

In some embodiments, at the home position, the manipulator and the second container do not interfere with access to the multiple container-receiving modules of the platform.

In some embodiments, at the home position of the manipulator, at least in a front view of the system, the manipulator is located laterally to the platform along the second axis of the system.

In some embodiments, the manipulator is located between the access window and the platform, along a depth axis of the system.

In some embodiments, the access window is defined on a front panel of the hood housing, and wherein the first axis along which the platform is moved is parallel to a plane defined by the front panel.

In some embodiments, the access window is shaped and sized to allow a user to introduce their hands transversely to the plane of the front panel to reach the platform.

In some embodiments, when the platform is in the first level, at least an upper surface of the platform is accessible via the access window.

According to an aspect of some embodiments there is provided a pharmaceutical preparation system shaped and sized to fit within a hood, the system comprising:
at least one platform comprising at least one container-receiving module configured to receive a first container;
a first mechanism operably connected to the platform for moving the platform at least along a first axis;
a manipulator configured for holding and manipulating a second container;
a second mechanism operably connected to the manipulator for moving the manipulator at least along a second axis, transverse to the first axis;
wherein the first mechanism is configured to move the platform at least between: a first level in which the at least one container-receiving module is accessible to a user, and a second level in which the at least one container-receiving module is inaccessible to the user.

In some embodiments, the first mechanism is configurable so that the first and second levels are selected according to a size and position of an access window of a hood in which the system is located.

According to an aspect of some embodiments there is provided a pharmaceutical preparation system defining a vertical axis and a horizontal axis, the system comprising:
at least one platform onto which a vial holder is mounted, the vial holder configured to hold and to pivot at least one vial;
a lift mechanism operably connected to the platform for raising or lowering the platform along the vertical axis; and
a controller configured for:
a. instructing the lift mechanism to raise or lower the platform;
b. instructing the vial holder to pivot the vial to assume an upright orientation for injecting fluid into the vial or an inverted orientation for drawing fluid from the vial;
c. synchronizing actuation of the lift mechanism and the vial holder such that a level to which the platform is moved is correlated one or both of: the orientation of the vial, presence of one or more components connected to the vial and aligned vertically with respect to the vial.

In some embodiments, the components include: an adaptor connected to the vial, a syringe, or a cap of the vial.

In some embodiments, the system further comprises:
a syringe manipulator configured for holding and manipulating a syringe assembly;
a movement mechanism operably connected to the syringe manipulator for moving the syringe manipulator along the horizontal axis;
wherein the controller is further configured for:
a. instructing the movement mechanism to move the syringe manipulator along the horizontal axis;
b. synchronizing actuation of the lift mechanism, the movement mechanism and the vial holder to enable a fluid interface between the syringe assembly received at the syringe manipulator, and a vial received at the vial holder.

In some embodiments, the controller is configured to instruct the vial holder and the syringe manipulator to:
a. hold the vial at an upright orientation for injecting fluid from the syringe assembly into the vial;
b. hold the vial at an inverted orientation for drawing fluid from the vial by the syringe assembly.

In some embodiments, the controller is configured to synchronize simultaneous movement of the platform along the vertical axis, the syringe manipulator along the horizontal axis, and the vial holder.

In some embodiments, the vial holder is comprised of a body and a frame which holds the vial to the body, and wherein movement of the vial holder includes one or both of: turning of the body about a body long axis; pivoting of the frame with respect to the body.

In some embodiments, the controller is configured to synchronize movement of the syringe manipulator to position the syringe manipulator laterally to the platform when lowering the platform towards a bottom portion of the system.

In some embodiments, the controller is configured to synchronize movement of the vial holder frame to invert a vial while a syringe is connected to the vial, while at the same time lowering the platform to allow an operational space under a top portion of the system for the syringe to fit in.

In some embodiments, the controller is configured for raising the platform until the top portion of the system pushes on a plunger of the syringe, for injecting the fluid from the syringe and into the vial.

In some embodiments, the controller is configured for setting the extent in which the platform is raised according to a distance by which the plunger needs to be pushed for providing the injection of a controlled volume of fluid from the syringe into the vial.

According to an aspect of some embodiments there is provided a pharmaceutical preparation system comprising:
a rigid system infrastructure including a top portion, a bottom portion substantially parallel to the top portion, and a connecting portion extending between the top and the bottom portions along a vertical axis;
at least one platform comprising at least one container-receiving module configured to receive at least one fluid container;
a lift mechanism configured as part of the connecting portion, the lift mechanism being operably connected to the platform for lifting and lowering the platform along the vertical axis relative to the connecting portion.

In some embodiments, a long axis of the platform is substantially perpendicular to the vertical axis.

In some embodiments, multiple container-receiving modules are arranged along the long axis of the platform.

In some embodiments, if the platform length, as measured along the long axis of the platform, is "D", then at least in a front view of the system the connecting portion and the platform cross each other at a location within the range of 0.1 D-0.9 D.

In some embodiments, at least in a front view of the system the connecting portion and the platform cross each other at a substantial center of the platform.

In some embodiments, the lift mechanism comprises a servo motor which is housed within the connecting portion.

In some embodiments, the top portion extends laterally on both sides of the connecting portion, wherein a first portion on one side of the connecting portion is configured to push on a plunger of a syringe when the syringe is approximated to the top portion by the platform; and a second portion on an opposite side of the connecting portion comprises an imager.

In some embodiments, the infrastructure is shaped and sized to fit within a standard hood.

In some embodiments, the top portion and the connecting portion define a T shape, and the bottom portion and the connecting portion define an inverted T shape.

In some embodiments, the connecting portion can be formed in one or more parts, at least one of said one or more parts being detachably connectable to at least one of: at least another one of said one or more parts, and at least one portion of the system infrastructure. In some embodiments, the part(s) that is/are detachably connectable can be connected to the top portion and can be detachably connectable to other parts (of the connecting portion or the system infrastructure together with the top portion. For instance, the detachably connectable part(s) can be modularly formed and can be removed or assembled with the system in modular manner. This facilitates easy assembly/disassembly of the system within/from a hood and also facilitates easy cleaning and maintenance of the system.

According to an aspect of some embodiments there is provided a fluid transfer assembly for use in a pharmaceutical preparation system, the assembly comprising:
an IV bag holder defining at least two positions for receiving IV bags, the at least two positions arranged linearly along a longitudinal axis of the IV bag holder, each of the at least two positions associated with a designated function of the IV bag received therein;
a syringe manipulator configured to hold and manipulate a syringe assembly;
a movement mechanism operably connected to the syringe manipulator for moving the syringe manipulator along an axis parallel to the longitudinal axis of the IV bag holder, the syringe manipulator being movable between the at least two positions of the IV bags; and
a controller configured to instruct the movement mechanism to move the syringe manipulator between the at least two positions of the IV bag based on a required designated function of the IV bag.

In some embodiments, the designated functions associated with the at least two positions of the IV bags include at least two of: an IV bag filled with a diluent, from which the diluent is to be drawn; an empty IV bag into which a ready drug is to be injected; an IV bag partially filled with a diluent for receiving a drug that requires dilution; an empty IV bag for receipt of excess gas and/or fluids.

In some embodiments, the IV bag holder is mounted on a platform which is moveable along an axis perpendicular to said longitudinal axis by a lift mechanism.

According to an aspect of some embodiments there is provided a mechanism for rotationally aligning a vial assembly, the vial assembly defining a non-circumferential protrusion extending in a radially outwards direction from a top portion of the vial assembly, the mechanism comprising:
a cylindrical shaft extending from a support beam, the cylindrical shaft having a lumen sized to receive at least the top portion of the vial assembly therein, the cylindrical shaft comprising a slit shaped to fit about the non-circumferential protrusion of the vial assembly to allow the top portion of the vial assembly to fit within the lumen of the shaft only when the slit is rotationally aligned with the protrusion; and
an actuator configured to rotate the cylindrical shaft about the shaft long axis to thereby rotate the vial assembly, when the top portion of the vial assembly is received within the lumen of the shaft.

In some embodiments, the top portion of the vial assembly comprises a vial adaptor, and wherein the non-circumferential protrusion constitutes a part of the vial adaptor.

In some embodiments, the cylindrical shaft and its actuator, along with a frame mounted on top of the actuator, together define a vial aligner assembly; the vial aligner assembly being movable with respect to a fixed contact sensor; wherein the frame of the vial aligner assembly is normally located adjacent the sensor and in contact with the frame.

In some embodiments, the actuator is configured to rotate the cylindrical shaft when an indication is provided by the contact sensor that the frame is no longer in contact with the sensor; and wherein the actuator is configured to continue rotating the cylindrical shaft until the protrusion is aligned with the slit, allowing the vial aligner assembly to return to a position in which the frame is back in contact with the sensor.

In some embodiments, the vial assembly is at least indirectly moved by a platform configured for being raised or lowered, and wherein raising of the platform causes the protrusion to push on the vial aligner assembly, thereby moving the frame away from the sensor.

In some embodiments, based on the indication that the frame is no longer in contact with the sensor, raising of the platform is automatically stopped.

In some embodiments, the cylindrical shaft is moveable within the frame in a direction perpendicular to the shaft long axis.

In some embodiments, the cylindrical shaft is spaced from an interior wall of the frame along the direction perpendicular to the shaft long axis, said space between the cylindrical shaft and the frame allowing the movement of the cylindrical shaft within the frame in the direction perpendicular to the shaft long axis.

In some embodiments, the actuator is spaced from the interior wall of the frame along the direction perpendicular to the shaft long axis, said space between the actuator and the frame allowing said movement of the cylindrical shaft within the frame together with the actuator.

According to an aspect of some embodiments there is provided a method of operating a pharmaceutical preparation system defining a first axis and a second axis which intersect each other, the system comprising at least one platform comprising at least one container-receiving module which is configured to receive a first container; and a manipulator which is configured for holding and manipulating at least one second container, the method comprising:
moving the manipulator along the second axis to an axial position which corresponds to an axial position of the at least one container-receiving module; and
moving the platform along the first axis to obtain a fluid interface between the first container received at the at least one container-receiving module and the second container held by the manipulator.

In some embodiments, the first axis constitutes a vertical axis and the second axis constitutes a horizontal axis; wherein moving the platform comprises raising or lowering the platform along the vertical axis.

According to an aspect of some embodiments there is provided a method of operating a pharmaceutical preparation system contained in a hood which comprises an access window, the pharmaceutical preparation system comprising at least one platform comprising a plurality of container-receiving modules, the method comprising:
raising or lowering the platform to a first level in which the plurality of container-receiving modules are manually accessible via the access window of the hood such that the plurality of container-receiving modules are arranged along the platform, parallel to a long dimension of the access window;
manually reaching the container-receiving modules via the access window to load or unload containers therefrom; and
raising or lowering the platform at least to a second level in which the plurality of container-receiving modules are positioned away from the access window.

According to an aspect of some embodiments there is a kit comprising:
a pharmaceutical preparation system defining first and second axes which intersect each other, the system comprising:
at least one platform comprising at least one container-receiving module configured to receive a first container;
a first mechanism operably connected to the platform for linearly displacing the platform along the first axis;
a manipulator configured for holding and manipulating a second container;
a second mechanism operably connected to the manipulator for linearly displacing the manipulator along the second axis; and a controller configured for:
  a. instructing the second mechanism to linearly displace the manipulator;
  b. instructing the first mechanism to linearly displace the platform; and
  c. synchronizing actuation of the first and second mechanisms to enable a fluid interface between the first container received at the at least one container-receiving module and the second container held by the manipulator; and
a hood defining an enclosure shaped and sized to contain the pharmaceutical preparation system therein, the hood or cabinet having a work surface on which said pharmaceutical preparation system is positioned.

In some embodiments, the hood includes an opening leading to the work surface, and wherein the first mechanism is configured to linearly displace the platform between at least a first position in which the platform is accessible via the opening, and a second position in which the platform is inaccessible via the opening.

According to an aspect of some embodiments there is provided a manipulator for holding and manipulating a container in a pharmaceutical preparation system, said manipulator comprising: a gripper for receiving therewithin at least a portion of the container, said gripper being displaceable between a closed state in which the gripper at least partially grips the container and an open state in which the gripper allows at least a restriction-free removal of the container from the gripper, said gripper comprising a restriction mechanism configured to, at the closed state of the gripper, allow at least one of: a restricted removal of the container from the gripper and a restricted introduction of the container into the gripper; and at least one actuation mechanism configured for at least one of: displacing the gripper from the closed state to the open state, and displacing the gripper from the open state to the closed state.

In some embodiments, at the closed state of the gripper, the restriction mechanism allows said at least one of: the restricted removal and the restricted introduction by application of a first force on the container, and at the open state, the gripper allows at least the restriction-free removal of the container from the gripper by application of a second force on the container, the second force being lesser than the first force.

In some embodiments, the gripper comprises a plurality of gripping members, at least one of the gripping members being configured to engage the container at the closed state, said gripping members defining therebetween a gripping space for receiving therewithin said portion of the container, wherein at the open state, the gripping space is expanded.

In some embodiments, the restriction mechanism comprises at least one restriction element protruding into the gripping space at least at the closed state, wherein said at least one restriction element, at the closed state, at least partially interferes with at least one of: removal of the container from the gripping space and introduction of the container into the gripping space, thereby allowing the corresponding at least one of: the restricted removal of the container from the gripper and the restricted introduction of the container into the gripper.

In some embodiments, the at least one actuation mechanism is configured at least for displacing the at least one restriction element to expand the gripping space, thereby displacing the gripper into the open state from the closed state.

In some embodiments, the manipulator further comprises a restriction biasing mechanism configured to bias the at least one restriction element towards the gripping space.

In some embodiments, the restriction biasing mechanism comprises a spring.

In some embodiments, the at least one actuation mechanism is configured to selectively displace the at least one restriction element in a direction opposite the gripping space.

In some embodiments, the at least one restriction element protrudes from a corresponding one of the gripping members into the gripping space.

In some embodiments, the at least one actuation mechanism is configured for at least one of: displacing at least one of the gripping members towards another one of the gripping members to displace the gripper into the closed state, and displacing at least one of the gripping members away from another one of the gripping members to displace the gripper into the open state.

In some embodiments, the manipulator further comprises a gripper biasing mechanism configured to bias at least one of the gripping members in one of: a first gripper bias direction extending from the gripping space towards said at least one gripping member, and a second gripper bias direction extending from said at least one gripping member towards the gripping space.

In some embodiments, the at least one actuation mechanism is configured to selectively displace said at least one gripping member in a direction opposite said one of the first and second gripper bias directions.

In some embodiments, each of the gripping members comprises a corresponding internal surface at least partially defining the gripping space and an opposite external surface, said gripper biasing mechanism configured to bias said at least one of the gripping members in the first gripper bias direction extending from the corresponding internal surface towards the corresponding external surface, wherein the at least one actuation mechanism is configured to engage the corresponding external surface to selectively displace said at least one gripping member in a direction opposite said first gripper bias direction.

In some embodiments, at the closed state, the at least one actuation mechanism maintains said at least one gripping member in a first position associated with the closed state, and for displacing the gripper into the open state, the actuator is configured to allow said at least one gripping member to move under the influence of the gripper biasing mechanism into a second position associated with the open state.

In some embodiments, the gripping members are formed as jaws, and the actuator is formed as brackets positioned radially outwardly to the jaws.

According to an aspect of some embodiments there is provided a manipulator for holding and manipulating a container in a pharmaceutical preparation system, said manipulator comprising: a gripper having a gripping space for receiving therewithin at least a portion of the container, said gripper comprising a restriction mechanism configured to allow at least one of: a restricted removal of the container from the gripping space and a restricted introduction of the container into the gripping space; and a restriction biasing mechanism configured to bias the restriction mechanism towards the gripping space.

In some embodiments, the restriction mechanism allows said at least one of: the restricted removal and the restricted introduction by application of a first force on the container, said first force being greater than a force required for said at least one of: the restricted removal and the restricted introduction in the absence of the restriction mechanism.

In some embodiments, the restriction mechanism comprises at least one restriction element protruding into the gripping space, wherein said at least one restriction element, at least partially interferes with at least one of: removal of the container from the gripping space and introduction of the container into the gripping space, thereby allowing the corresponding at least one of: the restricted removal of the container from the gripping space and the restricted introduction of the container into the gripping space.

In some embodiments, the at least one restriction element is configured to contact the container during said at least one of: removal of the container from the gripping space and introduction of the container into the gripping space, thereby interfering therewith.

In some embodiments, the restriction biasing mechanism is configured to bias the at least one restriction element towards the gripping space.

In some embodiments, the restriction biasing mechanism comprises a spring.

In some embodiments, said at least one restriction element is configured to be displaced against the bias of the restriction biasing mechanism during at least one of removal of the container from the gripping space and introduction of the container into the gripping space, thereby allowing corresponding said at least one of: the restricted removal of the container from the gripping space and the restricted introduction of the container into the gripping space.

In some embodiments, the gripper comprises a plurality of gripping members defining therebetween the gripping space, wherein said at least one restriction element protrudes into the gripping space from a corresponding one of the gripping members.

In some embodiments, the restriction mechanism comprises a snap-fit mechanism.

In some embodiments, the restriction mechanism is in the form of opposing rollable balls, each positioned at a socket of a respective gripping member, the rollable balls being normally biased inwardly towards the gripping space.

It is noted that all features described herein with respect to a certain aspect can be applied to any of the other aspects.

As referred to herein, a "container-receiving module" may include a module which receives, holds and optionally moves one or more containers, e.g. vials, IV bags, syringes and/or other containers suitable for containing and/or transferring fluid. The container-receiving module can be a permanent part of the pharmaceutical preparation system, for example, it can be permanently mounted onto a platform of the system. An example of a container-receiving modules can include a vial holder for example as described in U.S. provisional application No. 63/444,962, which is incorporated herein by reference, titled "A VIAL MANIPULATOR FOR USE IN A ROBOTIC PHARMACEUTICAL PREPARATION SYSTEM" and filed on Feb. 12, 2023 where it is referred to as a "vial manipulator" and U.S. application Ser. No. 18/439,715 which is incorporated herein by reference, titled "A VIAL MANIPULATOR FOR USE IN A ROBOTIC PHARMACEUTICAL PREPARATION SYSTEM" and filed on Feb. 12, 2024. Another example of a container-receiving module can include an IV bag holder.

As referred to herein, a "manipulator" may include a structure and/or a mechanism configured to controllably interact with at least one container (e.g. a container loaded onto the system) and/or with other components or structures of the pharmaceutical preparation system. The manipulator can be configured to move the at least one container. The manipulator can be configured to cause or urge fluid transfer processes, for example, transfer fluid from one container to another, involving for example withdrawal of fluid and/or insertion (e.g. injection) of fluid. The manipulator can include an actuator, e.g. a motor for facilitating its operation.

In an example, a syringe manipulator can include an actuator for pulling or pushing a plunger of a syringe. It is noted that while a manipulator is described herein mostly in the context of being a syringe manipulator, the manipulator can be configured to receive and manipulate other types of fluid containers such as a vial, an IV bag, tubing and/or other suitable container.

As referred to herein, a "vial" may include a closable vessel, formed for example of glass or plastic, and containing a drug in liquid or powder form. The vial can be a single use vial. The vial can be tubular or bottle shaped, having a neck portion in proximity to the vial opening. The vial can be topped with a cap.

As referred to herein, a "vial assembly" may include: a vial alone, or a vial onto which a vial adaptor is mounted. A septum for at least partially sealing access to the vial can be located as part of the vial itself and/or as part of the vial adaptor. The septum may include a membrane, such as a pierceable membrane or a membrane having a closable passageway defined therethrough.

A vial adaptor can be used as part of the vial assembly referred to herein. The vial adaptor may include a device mountable onto a vial, for facilitating transfer of the vial itself (by grasping onto the adaptor instead of grasping the vial) and/or for facilitating fluid transfer into or from the vial. The vial adapter may provide closed access to the contents of the vial. The vial adaptor may be a single use, sterilized device. It is noted that the terms "vial" and "vial assembly" may be alternately used along this application.

As referred to herein, fluid typically comprises a drug, a diluent, saline solution, water or any other fluid used for pharmaceutical preparation.

As referred to herein, a "syringe assembly" may include a syringe alone (such as a standard syringe), or a syringe with a connector attached thereto. The syringe connector may be coupled to a hub of the syringe. The syringe connector may provide closed access and may facilitate fluid transfer. A septum may be configured as part of or mounted onto the syringe connector, such that upon engagement of the syringe assembly with a vial assembly, the two septa may interface with each other. It is noted that the terms "syringe" and "syringe assembly" may be alternately used along this application. It is further noted that a syringe can be generally replaced by any suitable container from which fluid can be injected, and/or by which fluid can be drawn (e.g. an IV bag used with a pump, tubing used with a pump, and as such).

As referred to herein, a "container" may include a container alone, or a syringe with a connector attached thereto and thereby constituting a container assembly. It is noted that the terms "container" and "container assembly" may be alternately used along this application.

The above-described aspects and features of the presently disclosed subject matter as well as additional aspects and features are further specified in embodiments of the presently disclosed subject matter presented below.

1. A pharmaceutical preparation system defining first and second axes which intersect each other, the system comprising:
    at least one platform comprising at least one container-receiving module configured to receive a first container;

a first mechanism operably connected to the platform for linearly displacing the platform along the first axis;

a manipulator configured for holding and manipulating a second container;

a second mechanism operably connected to the manipulator for linearly displacing the manipulator along the second axis; and a controller configured for:
   a. instructing the second mechanism to linearly displace the manipulator;
   b. instructing the first mechanism to linearly displace the platform; and
   c. synchronizing actuation of the first and second mechanisms to enable a fluid interface between the first container received at the at least one container-receiving module and the second container held by the manipulator.

2. The system according to embodiment 1, wherein the first and second axes lie on the same plane.

3. The system according to embodiment 1 or embodiment 2, wherein the platform is movable only along the first axis, and the manipulator is movable only along the second axis.

4. The system according to any one of the preceding embodiments, wherein the first axis constitutes a vertical axis of the system, and the second axis constitutes a horizontal axis of the system.

5. The system according to embodiment 4, wherein the first mechanism comprises a lift which is configured to raise or lower the platform along the vertical axis, and the second mechanism comprises a movement mechanism which is configured to drive the manipulator along the horizontal axis.

6. The system according to embodiment 5, wherein the controller is configured to instruct the movement mechanism to move the manipulator to an axial position which corresponds with that of the at least one container-receiving module; and then to instruct the lift mechanism to raise or lower the platform to obtain said fluid interface.

7. The system according to any one of the preceding embodiments, wherein the at least one container-receiving module comprises at least one of: an IV bag holder, with the first container constituting an IV bag; a vial holder, with the first container constituting a vial.

8. The system according to any one of the preceding embodiments, wherein the second container comprises a syringe assembly, and wherein the manipulator comprises: one or more grippers for gripping the syringe assembly, and a plunger-flange receiver for operating a plunger of the syringe assembly.

9. The system according to any one of the preceding embodiments, wherein the second mechanism is configured to move the manipulator between a home position and at least one working position; wherein at the home position the manipulator does not interfere with movement of the platform, and wherein at the working position the manipulator is located at an axial position along the second axis which corresponds with an axial position of the at least one container-receiving module.

10. The system according to embodiment 9, comprising multiple container-receiving modules, wherein the second mechanism is configured to move the manipulator between multiple working positions associated with said multiple container-receiving modules.

11. The system according to embodiment 9 or 10, wherein the platform defines a recess for the manipulator to fit within or extend through when the platform is aligned with the manipulator, and the manipulator is at the home position.

12. The system according to embodiment 5 or any one of embodiments 6 to 11, when dependent on embodiment 5, wherein the controller is configured to instruct movement of the second mechanism only when the platform is raised or lowered to a position in which the platform does not interfere with movement of the manipulator.

13. The system according to embodiment 5 or any one of embodiments 6 to 12, when dependent on embodiment 5, further comprising a system infrastructure defining top and bottom portions which are parallel to the platform, and a connecting portion extending vertically between the top and bottom portions.

14. The system according to embodiment 13, wherein the platform is configured to be raised or lowered by the lift along at least a portion of a length of the connecting portion of the infrastructure.

15. The system according to embodiment 13 or 14, wherein the manipulator is movable by the movement mechanism along at least a portion of a length of the bottom portion of the infrastructure.

16. The system according to embodiment 15, comprising a linear rail extending along said portion of the length of the bottom portion, wherein the movement mechanism comprises a linear motor for driving the manipulator along the rail.

17. The system according to any one of the preceding embodiments, comprising a plurality of imagers positioned and configured for one or more of: detection of presence of the first container and/or second container, detection of fluid related parameters of the first container and/or second container.

18. The system according to embodiment 17, wherein the controller is configured to receive image data from the plurality of imagers, and to instruct the first and second mechanisms based on the received image data.

19. The system according to any one of the preceding embodiments, wherein the platform dimension along the second axis of the system is at least 3 times as long as its dimension along the first axis and at least 2 times as long as its dimension along a third axis which is perpendicular to the first and second axis.

20. The system according to any one of embodiments 1 to 19, wherein the platform comprises a rectangular profile.

21. The system according to embodiment 13 or any one of embodiments 14 to 20, when dependent on embodiment 13, wherein the connecting portion is formed in one or more parts, at least one of said one or more parts being detachably connectable to at least one of: at least another one of said one or more parts, and at least one portion of the system infrastructure.

22. The system according to embodiment 21, said at least one part of the connecting portion being connected to the top portion and being detachable together therewith.

23. A pharmaceutical preparation hood, comprising
a housing which defines an inner volume;
a work surface located within the inner volume;
an access window formed in the housing and leading from an exterior of the hood to the work surface;

a pharmaceutical preparation system positioned on the work surface, the system comprising:
  at least one platform comprising at least one container-receiving module configured to receive a first container;
  a first mechanism operably connected to the platform for linearly displacing the platform along a first axis;
  a manipulator configured for holding and manipulating a second container;
  a second mechanism operably connected to the manipulator for linearly displacing the manipulator along a second axis, transverse to the first axis;
  wherein the first mechanism is configured to move the platform at least between: a first level in which the at least one container-receiving module is manually accessible via the access window, and a second level in which the at least one container-receiving module is positioned away from the access window and is inaccessible to the user.

24. The hood according to embodiment 23, wherein the system comprises a controller configured for:
  a. instructing the second mechanism to linearly displace the manipulator;
  b. instructing the first mechanism to linearly displace the platform; and
  c. synchronizing actuation of the first and second mechanisms to enable a fluid interface between the first container received at the at least one container-receiving module and the second container held by the manipulator.

25. The hood according to embodiment 23 or 24, wherein the at least one platform is parallel to the work surface.

26. The hood according to any one of embodiments 23-25, wherein the first axis is a vertical axis of both the system and the hood; and the second axis is a horizontal axis of both the system and the hood.

27. The hood according to any one of embodiments 23-26, wherein the first container comprises a vial or an IV bag, and the second container comprises a syringe assembly.

28. The hood according to any one of embodiments 23-27, wherein at the second level the platform is distanced from the work surface a greater distance than at the first level.

29. The hood according to any one of embodiments 23-28, wherein a long dimension of the access window is parallel to the second axis, and wherein the long dimension is at least 3 times longer than a short dimension of the access window.

30. The hood according to embodiment 29, wherein the system comprises multiple container-receiving modules and wherein at least at the first level, the multiple container-receiving modules are arranged linearly along the platform, parallel to the long dimension of the access window.

31. The hood according to embodiment 30, wherein the multiple container-receiving modules are positioned at a depth of the hood which is in direct manual reach of a user located in front of the access window.

32. The hood according to any one of embodiments 24-31, wherein the system is free of a permanent anchoring to the hood and can be removed from the hood.

33. The hood according to any one of embodiments 23-32, wherein the second mechanism is configured to move the manipulator between a home position and at least one working position; wherein at the home position the manipulator does not interfere with movement of the platform, and the second container is manually accessible via the access window.

34. The hood according to embodiment 33, wherein at the home position of the manipulator, at least in a front view of the system, the manipulator is located laterally to the platform along the second axis of the system.

35. The hood according to any one of embodiments 23-34, wherein the access window is defined on a front panel of the hood housing, and wherein the first axis along which the platform is moved is parallel to a plane defined by the front panel.

36. The hood according to embodiment 35, wherein the access window is shaped and sized to allow a user to introduce their hands transversely to the plane of the front panel to reach the platform.

37. The hood according to any one of embodiments 23-36, wherein when the platform is in the first level, at least an upper surface of the platform is accessible via the access window.

38. A pharmaceutical preparation system shaped and sized to fit within a hood, the system comprising:
  at least one platform comprising at least one container-receiving module configured to receive a first container;
  a first mechanism operably connected to the platform for moving the platform at least along a first axis;
  a manipulator configured for holding and manipulating a second container;
  a second mechanism operably connected to the manipulator for moving the manipulator at least along a second axis, transverse to the first axis;
  wherein the first mechanism is configured to move the platform at least between: a first level in which the at least one container-receiving module is accessible to a user, and a second level in which the at least one container-receiving module is inaccessible to the user.

39. The system according to embodiment 38, wherein the first mechanism is configurable so that the first and second levels are selected according to a size and position of an access window of a hood in which the system is located.

40. A pharmaceutical preparation system defining a vertical axis and a horizontal axis, the system comprising:
  at least one platform onto which a vial holder is mounted, the vial holder configured to hold and to pivot at least one vial;
  a lift mechanism operably connected to the platform for raising or lowering the platform along the vertical axis; and
  a controller configured for:
    a. instructing the lift mechanism to raise or lower the platform;
    b. instructing the vial holder to pivot the vial to assume an upright orientation for injecting fluid into the vial or an inverted orientation for drawing fluid from the vial;
    c. synchronizing actuation of the lift mechanism and the vial holder such that a level to which the platform is moved is correlated one or both of: the orientation of the vial, presence of one or more components connected to the vial and aligned vertically with respect to the vial.

41. The system according to embodiment 40, wherein the components include: an adaptor connected to the vial, a syringe, or a cap of the vial.

42. The system according to embodiment 40 or 41, further comprising:
 a syringe manipulator configured for holding and manipulating a syringe assembly;
 a movement mechanism operably connected to the syringe manipulator for moving the syringe manipulator along the horizontal axis;
 wherein the controller is further configured for:
  a. instructing the movement mechanism to move the syringe manipulator along the horizontal axis;
  b. synchronizing actuation of the lift mechanism, the movement mechanism and the vial holder to enable a fluid interface between the syringe assembly received at the syringe manipulator, and a vial received at the vial holder.

43. The system according to embodiment 42, wherein the controller is configured to instruct the vial holder and the syringe manipulator to:
 a. hold the vial at an upright orientation for injecting fluid from the syringe assembly into the vial;
 b. hold the vial at an inverted orientation for drawing fluid from the vial by the syringe assembly.

44. The system according to embodiment 42 or embodiment 43, wherein the controller is configured to synchronize simultaneous movement of the platform along the vertical axis, the syringe manipulator along the horizontal axis, and the vial holder.

45. The system according to any one of embodiments 40-44, wherein the vial holder is comprised of a body and a frame which holds the vial to the body, and wherein movement of the vial holder includes one or both of: turning of the body about a body long axis; pivoting of the frame with respect to the body.

46. The system according to embodiment 42 or any one of embodiments 43 to 45, when dependent on embodiment 42, wherein the controller is configured to synchronize movement of the syringe manipulator to position the syringe manipulator laterally to the platform when lowering the platform towards a bottom portion of the system.

47. The system according to embodiment 42 or any one of embodiments 43 to 46, when dependent on embodiment 42, wherein the controller is configured to synchronize movement of the vial holder frame to invert a vial while a syringe is connected to the vial, while at the same time lowering the platform to allow an operational space under a top portion of the system for the syringe to fit in.

48. The system according to embodiment 47, wherein the controller is configured for raising the platform until the top portion of the system pushes on a plunger of the syringe, for injecting the fluid from the syringe and into the vial.

49. The system according to embodiment 48, wherein the controller is configured for setting the extent in which the platform is raised according to a distance by which the plunger needs to be pushed for providing the injection of a controlled volume of fluid from the syringe into the vial.

50. A pharmaceutical preparation system comprising:
 a rigid system infrastructure including a top portion, a bottom portion substantially parallel to the top portion, and a connecting portion extending between the top and the bottom portions along a vertical axis;
 at least one platform comprising at least one container-receiving module configured to receive at least one fluid container;
 a lift mechanism configured as part of the connecting portion, the lift mechanism being operably connected to the platform for lifting and lowering the platform along the vertical axis relative to the connecting portion.

51. The system according to embodiment 50, wherein a long axis of the platform is substantially perpendicular to the vertical axis.

52. The system according to embodiment 51, wherein multiple container-receiving modules are arranged along the long axis of the platform.

53. The system according to any one of embodiments 50-52, wherein if the platform length, as measured along the long axis of the platform, is "D", then at least in a front view of the system the connecting portion and the platform cross each other at a location within the range of 0.1 D-0.9 D.

54. The system according to any one of embodiments 50-53, wherein at least in a front view of the system the connecting portion and the platform cross each other at a substantial center of the platform.

55. The system according to any one of embodiments 50-54, wherein the lift mechanism comprises a servo motor which is housed within the connecting portion.

56. The system according to any one of embodiments 50-55, wherein the top portion extends laterally on both sides of the connecting portion, wherein a first portion on one side of the connecting portion is configured to push on a plunger of a syringe when the syringe is approximated to the top portion by the platform; and a second portion on an opposite side of the connecting portion comprises an imager.

57. The system according to any one of embodiments 50-56, wherein the infrastructure is shaped and sized to fit within a standard hood.

58. The system according to any one of embodiments 50-57, wherein the top portion and the connecting portion define a T shape, and the bottom portion and the connecting portion define an inverted T shape.

59. The system according to any one of embodiments 50-58, wherein the connecting portion is formed in one or more parts, at least one of said one or more parts being detachably connectable to at least one of: at least another one of said one or more parts, and at least one portion of the rigid system infrastructure.

60. The system according to embodiment 59, said at least one part of the connecting portion being connected to the top portion and being detachable together therewith.

61. A fluid transfer assembly for use in a pharmaceutical preparation system, the assembly comprising:
 an IV bag holder defining at least two positions for receiving IV bags, the at least two positions arranged linearly along a longitudinal axis of the IV bag holder, each of the at least two positions associated with a designated function of the IV bag received therein;
 a syringe manipulator configured to hold and manipulate a syringe assembly;
 a movement mechanism operably connected to the syringe manipulator for moving the syringe manipulator along an axis parallel to the longitudinal axis of the IV bag holder, the syringe manipulator being movable between the at least two positions of the IV bags; and
 a controller configured to instruct the movement mechanism to move the syringe manipulator between the at least two positions of the IV bag based on a required designated function of the IV bag.
62. The assembly according to embodiment 61, wherein the designated functions associated with the at least two positions of the IV bags include at least two of: an IV bag filled with a diluent, from which the diluent is to be drawn; an empty IV bag into which a ready drug is to be injected; an IV bag partially filled with a diluent for receiving a drug that requires dilution; an empty IV bag for receipt of excess gas and/or fluids.
63. The assembly according to embodiment 61 or embodiment 62, wherein the IV bag holder is mounted on a platform which is moveable along an axis perpendicular to said longitudinal axis by a lift mechanism.
64. A mechanism for rotationally aligning a vial assembly, the vial assembly defining a non-circumferential protrusion extending in a radially outwards direction from a top portion of the vial assembly, the mechanism comprising:
a cylindrical shaft extending from a support beam, the cylindrical shaft having a lumen sized to receive at least the top portion of the vial assembly therein, the cylindrical shaft comprising a slit shaped to fit about the non-circumferential protrusion of the vial assembly to allow the top portion of the vial assembly to fit within the lumen of the shaft only when the slit is rotationally aligned with the protrusion; and an actuator configured to rotate the cylindrical shaft about the shaft long axis to thereby rotate the vial assembly, when the top portion of the vial assembly is received within the lumen of the shaft.
65. The mechanism according to embodiment 64, wherein the top portion of the vial assembly comprises a vial adaptor, and wherein the non-circumferential protrusion constitutes a part of the vial adaptor.
66. The mechanism according to embodiment 64 or embodiment 65, wherein the cylindrical shaft and its actuator, along with a frame mounted on top of the actuator, together define a vial aligner assembly; the vial aligner assembly being movable with respect to a fixed contact sensor; wherein the frame of the vial aligner assembly is normally located adjacent the sensor and in contact with the frame.
67. The mechanism according to embodiment 66, wherein the actuator is configured to rotate the cylindrical shaft when an indication is provided by the contact sensor that the frame is no longer in contact with the sensor; and wherein the actuator is configured to continue rotating the cylindrical shaft until the protrusion is aligned with the slit, allowing the vial aligner assembly to return to a position in which the frame is back in contact with the sensor.
68. The mechanism according to embodiment 67, wherein the vial assembly is at least indirectly moved by a platform configured for being raised or lowered, and wherein raising of the platform causes the protrusion to push on the vial aligner assembly, thereby moving the frame away from the sensor.
69. The mechanism according to embodiment 68, wherein based on the indication that the frame is no longer in contact with the sensor, raising of the platform is automatically stopped.
70. The mechanism according to any one of embodiments 66-69, wherein the cylindrical shaft is moveable within the frame in a direction perpendicular to the shaft long axis.
71. The mechanism according to embodiment 70, wherein the cylindrical shaft is spaced from an interior wall of the frame along the direction perpendicular to the shaft long axis, said space between the cylindrical shaft and the frame allowing the movement of the cylindrical shaft within the frame in the direction perpendicular to the shaft long axis.
72. The mechanism according to embodiment 71, wherein the actuator is spaced from the interior wall of the frame along the direction perpendicular to the shaft long axis, said space between the actuator and the frame allowing said movement of the cylindrical shaft within the frame together with the actuator.
73. A manipulator for holding and manipulating a container in a pharmaceutical preparation system, said manipulator comprising:
a gripper for receiving therewithin at least a portion of the container, said gripper being displaceable between a closed state in which the gripper at least partially grips the container and an open state in which the gripper allows at least a restriction-free removal of the container from the gripper, said gripper comprising a restriction mechanism configured to, at the closed state of the gripper, allow at least one of: a restricted removal of the container from the gripper and a restricted introduction of the container into the gripper; and
at least one actuation mechanism configured for at least one of: displacing the gripper from the closed state to the open state, and displacing the gripper from the open state to the closed state.
74. The manipulator according to embodiment 73, wherein at the closed state of the gripper, the restriction mechanism allows said at least one of: the restricted removal and the restricted introduction by application of a first force on the container, and at the open state, the gripper allows at least the restriction-free removal of the container from the gripper by application of a second force on the container, the second force being lesser than the first force.
75. The manipulator according to embodiment 73 or 74, wherein the gripper comprises a plurality of gripping members, at least one of the gripping members being configured to engage the container at the closed state, said gripping members defining therebetween a gripping space for receiving therewithin said portion of the container, wherein at the open state, the gripping space is expanded.
76. The manipulator according to embodiment 75, wherein the restriction mechanism comprises at least one restriction element protruding into the gripping space at least at the closed state, wherein said at least one restriction element, at the closed state, at least partially interferes with at least one of: removal of the container from the gripping space and introduction of the container into the gripping space, thereby allowing the corresponding at least one of: the restricted removal of the container from the gripper and the restricted introduction of the container into the gripper.
77. The manipulator according to embodiment 76, wherein the at least one actuation mechanism is configured at least for displacing the at least one restriction element to expand the gripping space, thereby displacing the gripper into the open state from the closed state.
78. The manipulator according to embodiment 76 or 77, further comprising a restriction biasing mechanism configured to bias the at least one restriction element towards the gripping space.

79. The manipulator according to embodiment 78, wherein the restriction biasing mechanism comprises a spring.

80. The manipulator according to embodiment 78 or 79, wherein the at least one actuation mechanism is configured to selectively displace the at least one restriction element in a direction opposite the gripping space.

81. The manipulator according to any one of embodiments 76-80, wherein the at least one restriction element protrudes from a corresponding one of the gripping members into the gripping space.

82. The manipulator according to any one of embodiments 75-81, wherein the at least one actuation mechanism is configured for at least one of: displacing at least one of the gripping members towards another one of the gripping members to displace the gripper into the closed state, and displacing at least one of the gripping members away from another one of the gripping members to displace the gripper into the open state.

83. The manipulator according to any one of embodiments 75-82, further comprising a gripper biasing mechanism configured to bias at least one of the gripping members in one of: a first gripper bias direction extending from the gripping space towards said at least one gripping member, and a second gripper bias direction extending from said at least one gripping member towards the gripping space.

84. The manipulator according to embodiment 83, wherein the at least one actuation mechanism is configured to selectively displace said at least one gripping member in a direction opposite said one of the first and second gripper bias directions.

85. The manipulator according to embodiment 83 or 84, wherein each of the gripping members comprises a corresponding internal surface at least partially defining the gripping space and an opposite external surface, said gripper biasing mechanism configured to bias said at least one of the gripping members in the first gripper bias direction extending from the corresponding internal surface towards the corresponding external surface, wherein the at least one actuation mechanism is configured to engage the corresponding external surface to selectively displace said at least one gripping member in a direction opposite said first gripper bias direction.

86. The manipulator according to embodiment 85, wherein at the closed state, the at least one actuation mechanism maintains said at least one gripping member in a first position associated with the closed state, and for displacing the gripper into the open state, the actuator is configured to allow said at least one gripping member to move under the influence of the gripper biasing mechanism into a second position associated with the open state.

87. The manipulator according to embodiment 85 or 86, wherein the gripping members are formed as jaws, and the actuator is formed as brackets positioned radially outwardly to the jaws.

88. A manipulator for holding and manipulating a container in a pharmaceutical preparation system, said manipulator comprising:
a gripper having a gripping space for receiving therewithin at least a portion of the container, said gripper comprising a restriction mechanism configured to allow at least one of: a restricted removal of the container from the gripping space and a restricted introduction of the container into the gripping space; and
a restriction biasing mechanism configured to bias the restriction mechanism towards the gripping space.

89. The manipulator according to embodiment 88, wherein the restriction mechanism allows said at least one of: the restricted removal and the restricted introduction by application of a first force on the container, said first force being greater than a force required for said at least one of: the restricted removal and the restricted introduction in the absence of the restriction mechanism.

90. The manipulator according to embodiment 88 or 89, wherein the restriction mechanism comprises at least one restriction element protruding into the gripping space, wherein said at least one restriction element, at least partially interferes with at least one of: removal of the container from the gripping space and introduction of the container into the gripping space, thereby allowing the corresponding at least one of: the restricted removal of the container from the gripping space and the restricted introduction of the container into the gripping space.

91. The manipulator according to embodiment 90, wherein the at least one restriction element is configured to contact the container during said at least one of: removal of the container from the gripping space and introduction of the container into the gripping space, thereby interfering therewith.

92. The manipulator according to embodiment 90 or 91, wherein the restriction biasing mechanism is configured to bias the at least one restriction element towards the gripping space.

93. The manipulator according to embodiment 92, wherein the restriction biasing mechanism comprises a spring.

94. The manipulator according to embodiment 92 or 93, wherein said at least one restriction element is configured to be displaced against the bias of the restriction biasing mechanism during at least one of removal of the container from the gripping space and introduction of the container into the gripping space, thereby allowing corresponding said at least one of: the restricted removal of the container from the gripping space and the restricted introduction of the container into the gripping space.

95. The manipulator according to any one of embodiments 90-94, wherein the gripper comprises a plurality of gripping members defining therebetween the gripping space, wherein said at least one restriction element protrudes into the gripping space from a corresponding one of the gripping members.

96. The manipulator according to any one of embodiments 88-95, wherein the restriction mechanism comprises a snap-fit mechanism.

97. The manipulator according to any one of embodiments 88-96, wherein the restriction mechanism is in the form of opposing rollable balls, each positioned at a socket of a respective gripping member, the rollable balls being normally biased inwardly towards the gripping space.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a schematic diagram of a pharmaceutical preparation system comprising a platform movable along the vertical axis, and a manipulator movable along the horizontal axis, according to embodiments of the presently disclosed subject matter;

FIG. 1B is a flowchart of a general method of operating a pharmaceutical preparation system as shown in FIG. 1A, according to embodiments of the presently disclosed subject matter;

FIGS. 17A-B are a front view (FIG. 17A) and a schematic side view (FIG. 17B) of a hood in which the a pharmaceutical preparation system is accessible via an access window, according to embodiments of the presently disclosed subject matter;

DETAILED DESCRIPTION OF EMBODIMENTS

Figure 1C:
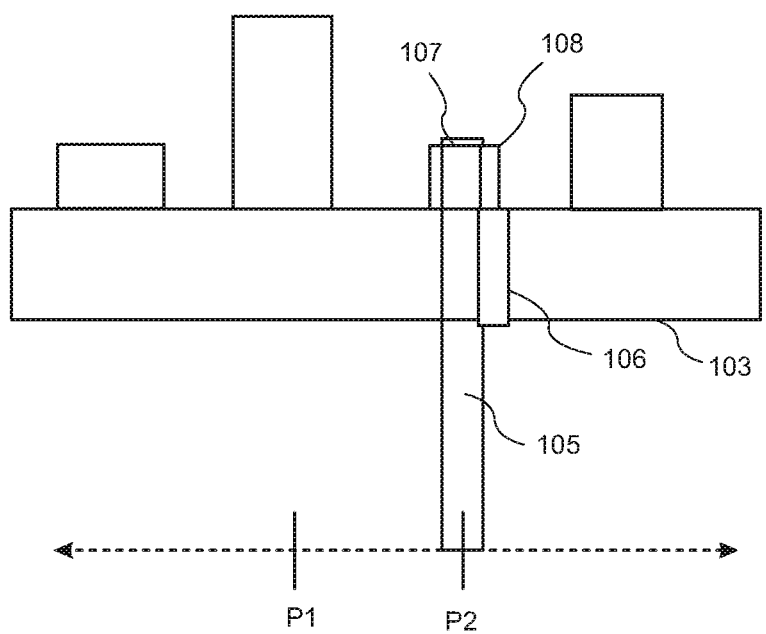
FIG. 1C is a schematic diagram of a pharmaceutical preparation system as shown in FIG. 1A, demonstrating a fluid interface between two containers, according to embodiments of the presently disclosed subject matter.

A pharmaceutical preparation system as described herein can be referred to as at least partially occupying a three-dimensional volume. The system includes components that are generally movable along at least two first and second intersecting axes. Optionally, one or more components are movable only along the first axis, and one or more other components are movable only along the second axis. In some cases, the first axis constitutes a vertical axis of the system, and the second axis constitutes a horizontal axis of the system.

One of the above-mentioned system components can include a platform, e.g. a table, board, stage or other element defining a level surface, (optionally, a flat top surface). Generally, the platform extends about a plane which intersects the first axis of the system, which, in some examples, constitutes the vertical axis. Optionally, the plane defined by the platform is perpendicular to the vertical axis.

A plurality of container-receiving modules can be mounted on the platform or otherwise connected thereto. The container-receiving modules can be permanently anchored to the platform, functioning as a non-removable part of the system which can serve for multiple uses. Examples of container-receiving modules associated with the platform can include:

- a vial holder, which is configured for receiving and holding at least one vial. The vial holder can be further configured to move the vial, for example, pivot the vial to agitate the vial and/or pivot the vial to change its orientation and optionally maintain the vial at the selected orientation (e.g. an upright orientation, an inverted orientation). The vial holder can be constructed, for example, of a body, and a frame or gripper which is pivotably connected to the body and is configured for grasping the vial to agitate and/or invert the vial with respect to the vial holder body.
- an IV bag holder, which is configured for receiving and holding at least one IV bag. The IV bag holder can include designated surface(s) on which the bag can be mounted or laid, hangers (e.g. hooks) for holding the bag, and/or other elements suitable for holding and/or supporting the bag.
- a syringe holder, which is configured for receiving and holding at least one syringe.

Another of the above-mentioned system components can include a manipulator. The manipulator can be configured for receiving and manipulating at least one container, optionally, a container of a different type than at least one of those received by the container-receiving modules which are associated with the platform. The manipulator, in general, is not mounted to the platform or connected thereto. In an exemplary system, the manipulator is a syringe manipulator which holds a syringe and is configured to operate the syringe, for example, by including a plunger actuator which can pull or push a plunger of the syringe with respect to a barrel of the syringe. FIG. 1A shows an example of the pharmaceutical preparation system 101, with the platform designated as 103, and the manipulator designated as 105. In this example, the manipulator holds and manipulates a container 106 such as a syringe.

A plurality of container-receiving modules 107 are mounted to the platform, each configured to receive at least one container 108. The container-receiving modules include, for example, an IV bag holder and a vial holder. In an exemplary use of the system, as detailed in FIG. 1B, after containers such as vials and IV bags are loaded onto the container-receiving modules, and the syringe is loaded onto the manipulator, at 111, the manipulator is moved along the horizontal axis (X axis) to an axial position corresponding with that of a selected container-receiving module situated on the platform. Then, at 113, the platform is raised or lowered along the vertical axis (Z axis) to obtain an interface between a container of the selected container-receiving module, and the container held by the manipulator, in this case, the syringe. Once an interface is obtained, fluid transfer can be carried out, for example by actuating a plunger of the syringe.

In an exemplary process, the syringe manipulator is moved along the horizontal axis to an axial position P1 corresponding with that of a container-receiving module constituting an IV bag holder. The platform is then lowered so that a fluid interface is obtained between the syringe and the IV bag, such as via a spike of the IV bag. By actuating the plunger, fluid (e.g. a diluent, such as saline) is drawn by the syringe from the bag. Then, the platform is raised upwards to disconnect the bag, and the syringe manipulator is moved further along the horizontal axis to an axial position P2 which corresponds with that of a container-receiving module constituting a vial holder. The platform is then lowered so that a fluid interface is obtained between the syringe and the vial. By actuating the plunger, fluid can be injected from the syringe into the vial. FIG. 1C schematically illustrates this stage in the process, showing a fluid interface obtained between a first container 106 (e.g. a syringe) held by the manipulator, and another second container 108 received at the container receiving module (e.g. a vial received at a vial holder). As shown, the fluid interface takes place when the manipulator has been moved to an axial position of the vial holder, P2.

It is noted that the order of steps is not limiting, for example, the manipulator can be moved before the platform moves, after the platform moves, or even simultaneously with the platform.

Figure 2:
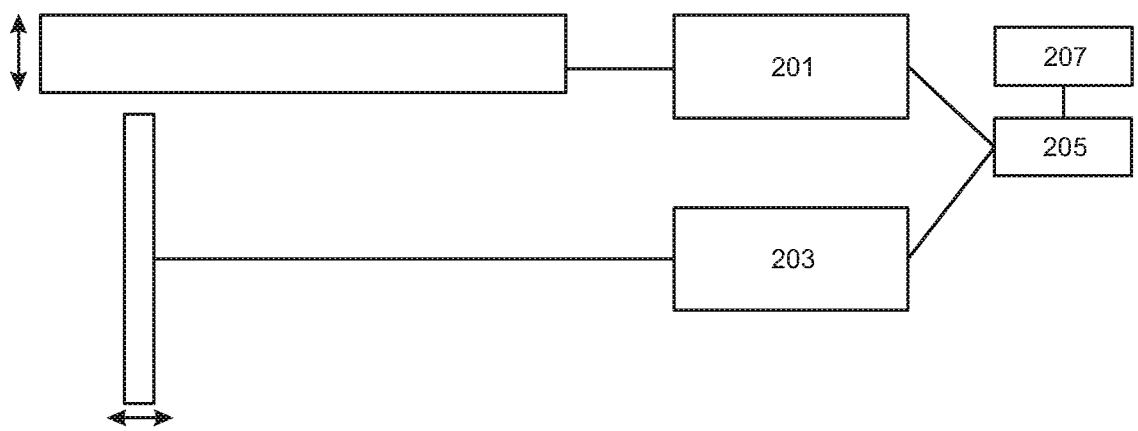
FIG. 2 is a schematic diagram of control in a pharmaceutical preparation system as shown in FIG. 1A, according to embodiments of the presently disclosed subject matter.

The platform and the manipulator can each be operably connected to a mechanism which is configured for moving them along the respective axis. As schematically shown in FIG. 2, the platform can be moved along the vertical axis (raised or lowered) with the aid of a first mechanism 201, which in some embodiments constitutes a lift mechanism; and the manipulator can be moved along the horizontal axis with the aid of a second mechanism 203, which in some embodiments constitutes a movement mechanism, configured for sliding, transferring, or otherwise driving the manipulator along the horizontal axis. Each of the mechanisms includes an actuator, such as a motor. The motor can be a servo motor, a hydraulic motor, a pneumatic motor, an electric motor, a magnetic motor, a mechanical actuator such as a spring, a piston and a combination thereof.

The system further comprises or is operably connected to a controller 205. The controller can be configured for communicating (e.g. via wired and/or wireless communication) with the lift mechanism and the movement mechanism for instructing their operation. The controller can be configured to set parameters of the movement generated by the mechanisms, including, but not limited to: a timing of movement, a duration of movement, a speed of movement, a direction of movement (e.g. up or down for the lift mechanism; left or right for the movement mechanism); an extent of movement, and/or other parameters. The controller can be configured to synchronize the two mechanisms for obtaining a fluid interface between one or more containers of the container-receiving modules of the platform with a container (e.g. a syringe) of the manipulator. Synchronization of the two mechanisms allows bringing the platform and the manipulator to an interface in which fluid communication between their respective containers is enabled. Since each of the platform and the manipulator are generally movable along a single axis, such intersect may be simpler to obtain as compared, for example, to a system in which a component needs to be moved along two or more axes for interfacing with another component.

In some examples, the system can have one or more imagers 207 positioned and configured to obtain image data, such as image data related to a position and/or a state of the platform, the manipulator, the container-receiving modules and/or the containers themselves, and the controller instructs the mechanisms based on the image data received from the imagers.

Generally, control of movement of the platform and/or the manipulator, for example, determining an extent of movement along the axis, can be carried out using position data. The position data can be obtained using the one or more imagers, and/or using an actuator of the associated mechanism (for example, via an encoder of a motor). In some embodiments, feedback regarding a position of the platform and/or manipulator is obtained using one or more of: image data collected by one or more imagers; indications from sensor(s), such as motion sensors, contact sensors, acceleration sensors or other sensor types; operational parameters associated with the actuators of movement, such as motor current consumption, motor speed; and/or other methods via which a position can be determined. In some embodiments, based on the obtained position feedback, upcoming movement of the platform and/or manipulator can be controlled.

A pharmaceutical preparation system for example as described herein can be used inside a controlled environment, optionally sterile, which provides for reducing or preventing exposure to hazardous gases and/or materials. Examples of such environment can include a hood, such as a standard fume hood; a clean room; a bio safety cabinet; an isolator; or any other suitable enclosure (e.g. a housing) in which environmental conditions can be controlled.

Alternatively, the system can be used in a non-closed or non-controlled environment, for example when the system is used in the preparation of non-hazardous drugs. For example, the system can be used in a hospital ward, in a clinic, in a pharmacy, and/or other.

In the example of a system used inside a hood, dimensions of the system and a total weight of the system can be suitable for having the system fit inside the hood, for example, be mounted on a work surface of the hood. In some cases, the system is placed on the work surface of the hood and can be put to work by connecting the system to electrical power supply, configured inside and/or outside the hood.

Generally, the system can be accessed (such as for loading or unloading containers therefrom) via an opening of the hood, when the platform and manipulator are brought to a level of the opening. The opening can be formed as a window, a slit, a hole, a glovebox, a passageway, and/or any other suitable structure which enables access, directly or indirectly, from outside the hood to an inner volume of the hood. Optionally, the user inserts their hands at least partially through the opening. Alternatively, the user inserts their hands into gloveboxes, and approaches the system using the gloves. In such example, containers may be loaded/unloaded through a designated drawer or other passageway leading into and/or out of an inner volume of the hood.

Figure 3A:
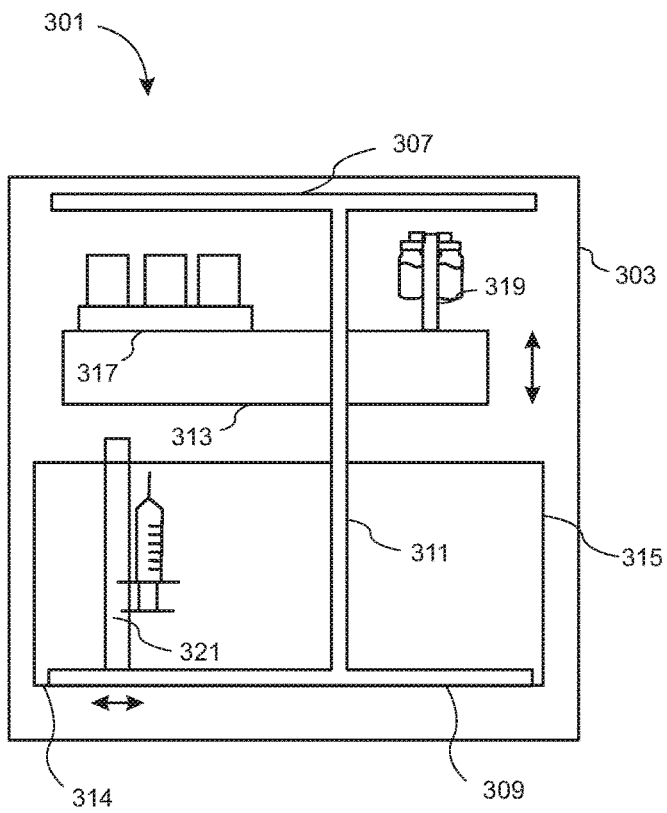
FIGS. 3A-C are schematic illustrations of a pharmaceutical preparation system positioned inside a hood, with the platform and manipulator shown at two locations with respect to an access opening of the hood, according to embodiments of the presently disclosed subject matter.
Figure 3B:
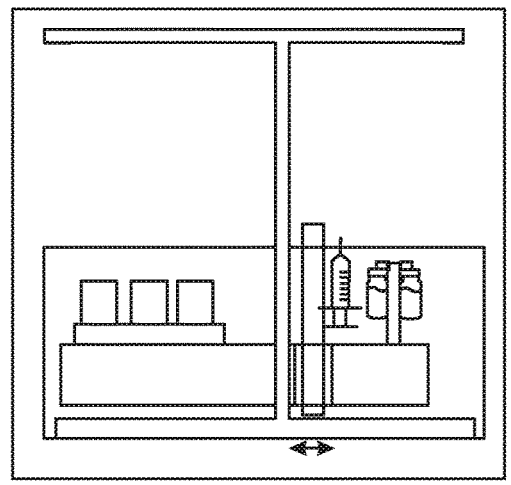
Figure 3C:
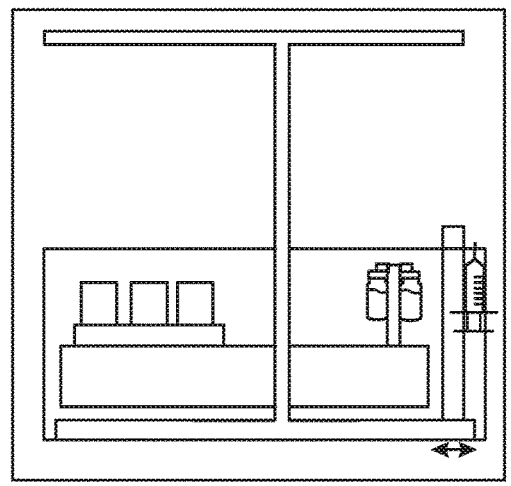

FIGS. 3A-C show an example of such system, designated 301, placed inside a hood 303. The system includes an infrastructure which functions as a supporting frame for the system, generally constructed of a top portion 307, a bottom portion 309, and a connecting portion 311 extending between the top and bottom portions. As shown, the top and bottom portions are parallel to each other and parallel to the platform 313, and the connecting portion is perpendicular to the portions, extending vertically between them. The bottom portion is removably placed on the work surface 314 of the hood.

In some embodiments, the platform travels up and down along at least a portion of the length of the connecting portion, and the manipulator travels sideways along at least a portion of the length of the bottom portion. In other embodiments, the manipulator may travel along the top portion.

In some examples, the system can include only one of the top and bottom portions, along which the manipulator travels. For instance, in some examples, the manipulator can travel along the top portion, and the system may or may not include the bottom portion. In some examples, the manipulator can travel along the bottom portion, and the system may or may not include the top portion. It is to be understood herein that the top portion, the connection portion, and the bottom portion can have any shape, structure, and size suitable for allowing movement of the corresponding manipulator and platform therealong.

The hood 303 of this example is shown to include an access window 315. In FIG. 3A, the platform is lifted to a level in which it is inaccessible via the window. More specifically, the container-receiving modules on the platform, such as the IV bag holder 317 and the vial holder 319, are positioned at a level in which they cannot be reached via the window, for example, located out of the manual reach of a user. In FIGS. 3B-C, the platform is lowered to a level in which the container-receiving modules can be accessed via the window.

Referring now to the manipulator 321 of the system, for example, a syringe manipulator, the manipulator can be moved along the bottom portion of the infrastructure, between a home position, two examples of which are shown in FIGS. 3B-C, and a plurality of working positions, one of which is shown in FIG. 3A.

At the home position, the manipulator does not interfere with movement of the platform along the vertical axis, allowing the platform to be lowered to a same level as the manipulator. This can be achieved, for example, by the platform having a recess (not shown) extending across a thickness of the platform, through which the manipulator extends when the platform is lowered, as shown in FIG. 3B; or, in another example, by the platform being short enough along its horizontal dimension to allow the manipulator to be positioned adjacent (laterally to) the platform, as shown in FIG. 3C.

At the working position, the manipulator is located at one of the axial positions along the horizontal axis which corresponds to an axial position of a selected container-receiving module. By that, when the platform is lowered towards the manipulator, an interface between the container held at the manipulator (such as a syringe) and a container held at the container-receiving module (e.g. an IV bag, a vial) can be obtained.

In some embodiments, the container-receiving modules are arranged linearly on the platform so that when the platform is brought to a level in which the modules are accessible via the window of the hood, containers of all modules can be loaded/unloaded substantially without requiring internal movement of system components. This can enable a user standing adjacent the window to manually access all container-receiving modules directly, and at the same approach to the window. Furthermore, when the manipulator is at its home position, the manipulator is located at the same level as the platform and can be accessed as well for loading/unloading a container such as a syringe therefrom. Potential advantages of accessing modules of the system for loading or unloading containers therefrom at the same approach (e.g. only once during an operation cycle of the system) may include improving safety since all containers can be loaded prior to the operation cycle, and no containers need to be loaded or unloaded in the middle of the cycle; the opening to the hood can remain closed throughout the operation cycle; and the system can operate continuously, without interruptions. A general method of using a system placed inside a hood is described in FIG. 4A. At 451 the platform is raised or lowered, with the aid of the lift mechanism, to a first level in which the container-receiving modules of the platform are accessible via a window of the hood, and are arranged along the platform, parallel to a long dimension of the window. For example, the window of the hood is rectangular and extends along at least a portion of the length of the hood; and the platform of the system is configured so that the container-receiving modules, at least when the platform is brought to the window level, are arranged along the long dimension of the window. Such arrangement may facilitate access of the user to all container-receiving modules, since they are aligned along the length of the window and can be easily manually reached. At 453, the user loads/unloads containers from the container-receiving modules and/or from the manipulator, for example: loads at least one vial onto the vial holder, at least one IV bag to the IV bag holder, at least one syringe to the manipulator. At 455, The platform is raised or lowered to a second level in which the container-receiving modules are positioned away from the access window, and are inaccessible to the user. At that point, the system can be operated to automatically carry out the drug preparations processes.

Figure 4B:
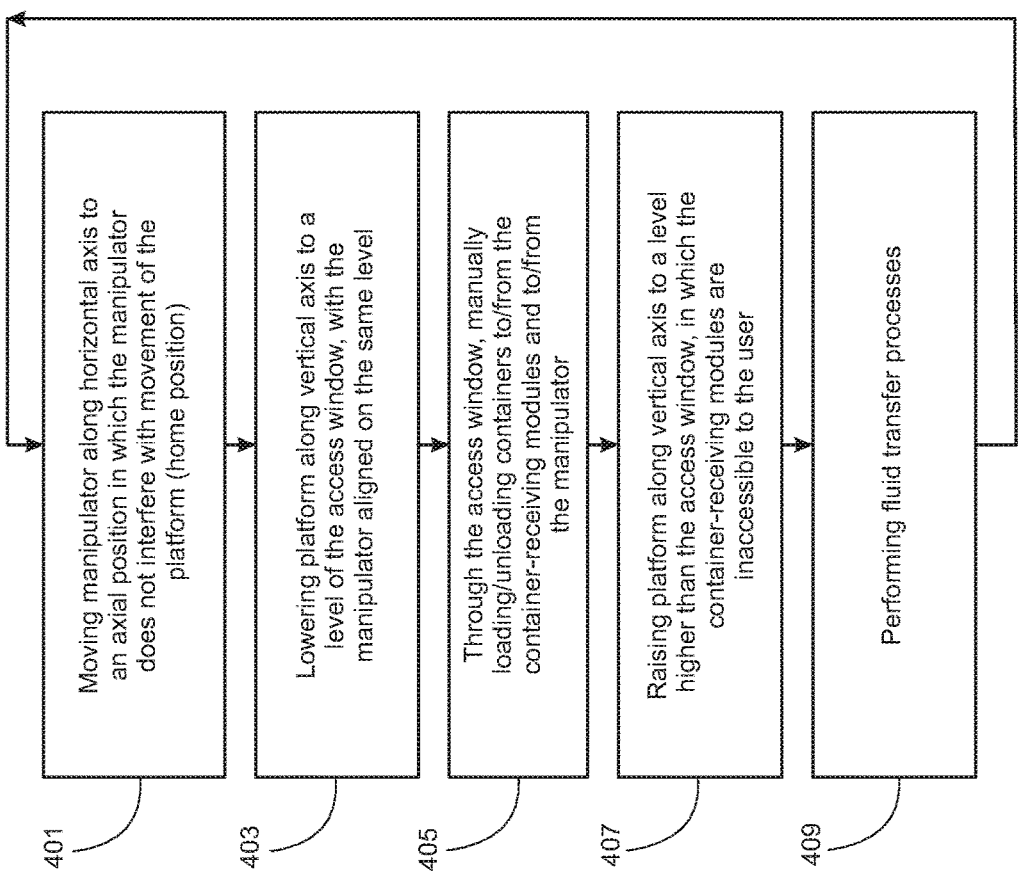
FIG. 4B is a flowchart of an exemplary method of operating a pharmaceutical preparation system in accordance with the method of FIG. 4A.
Figure 4A:
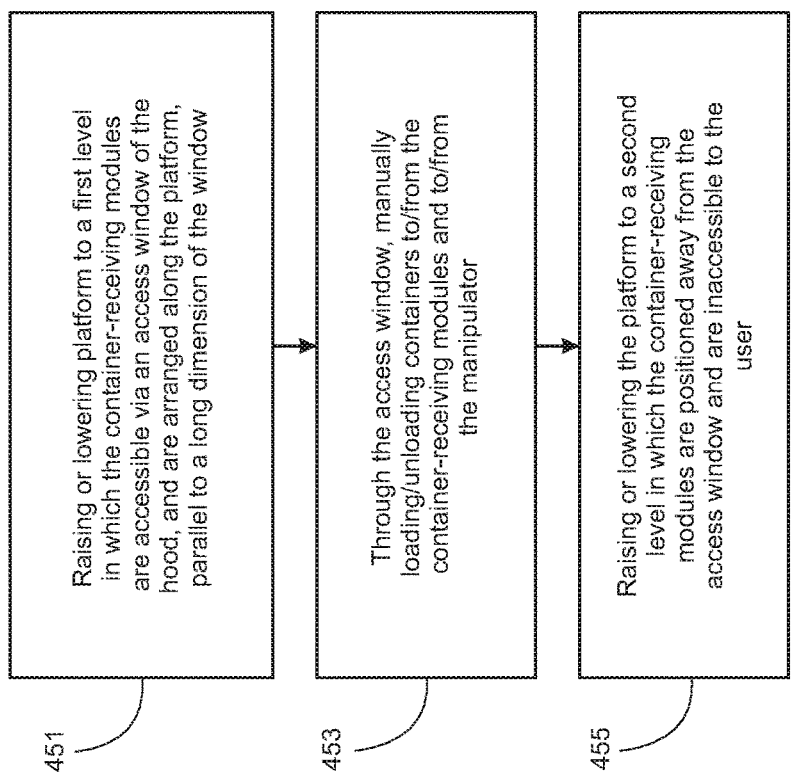
FIG. 4A is a flowchart of a general method of operating a pharmaceutical preparation system positioned inside a hood, according to embodiments of the presently disclosed subject matter.

An exemplary method in accordance with the general method of FIG. 4A is described in FIG. 4B. At 401, the manipulator is moved, as needed, to its home position, which constitutes an axial position in which the manipulator does not interfere with raising or lowering of the platform.

Then, at 403, the platform is lowered to a level of the access window (or other opening) to the hood, being aligned at the same level with the manipulator. At 405, a user accesses the system through the window for loading and/or unloading containers, such as vials, IV bags, and/or syringe (s). In an example, the user loads a syringe onto the manipulator, at least one vial to a vial holder located on the platform, and at least one IV bag to an IV bag holder located on the platform. When the manipulator is at the home position, it does not stand in the way of accessing the one or modules of the platform. In some embodiments, the manipulator is located (and is horizontally moved) within a space located between the access window and the platform, with respect to a depth axis of the system.

At 407, the platform is raised along the vertical axis to a level higher than the access window, in which the container-receiving modules of the platform are inaccessible to the user. By moving the platform away from the window, user safety as well as product safety can potentially be improved, due to the following reasons: the user cannot manually access the system modules when the platform is moved to a non-accessible volume of the hood; exposure of the user to toxic or otherwise hazardous gases or materials can be reduced; exposure of the user to needles or other hazardous mechanical components, as well as to moving parts of the machinery, can be reduced; exposure of the drug products to contaminates from the environment (e.g. dust) and/or contaminates from the user can be reduced.

At 409, fluid transfer processes and/or other processes are automatically performed by the system for preparing the pharmaceuticals. Once the pharmaceuticals are prepared, the method can be repeated for unloading the ready products and optionally loading new container(s) onto the system.

Figure 5:
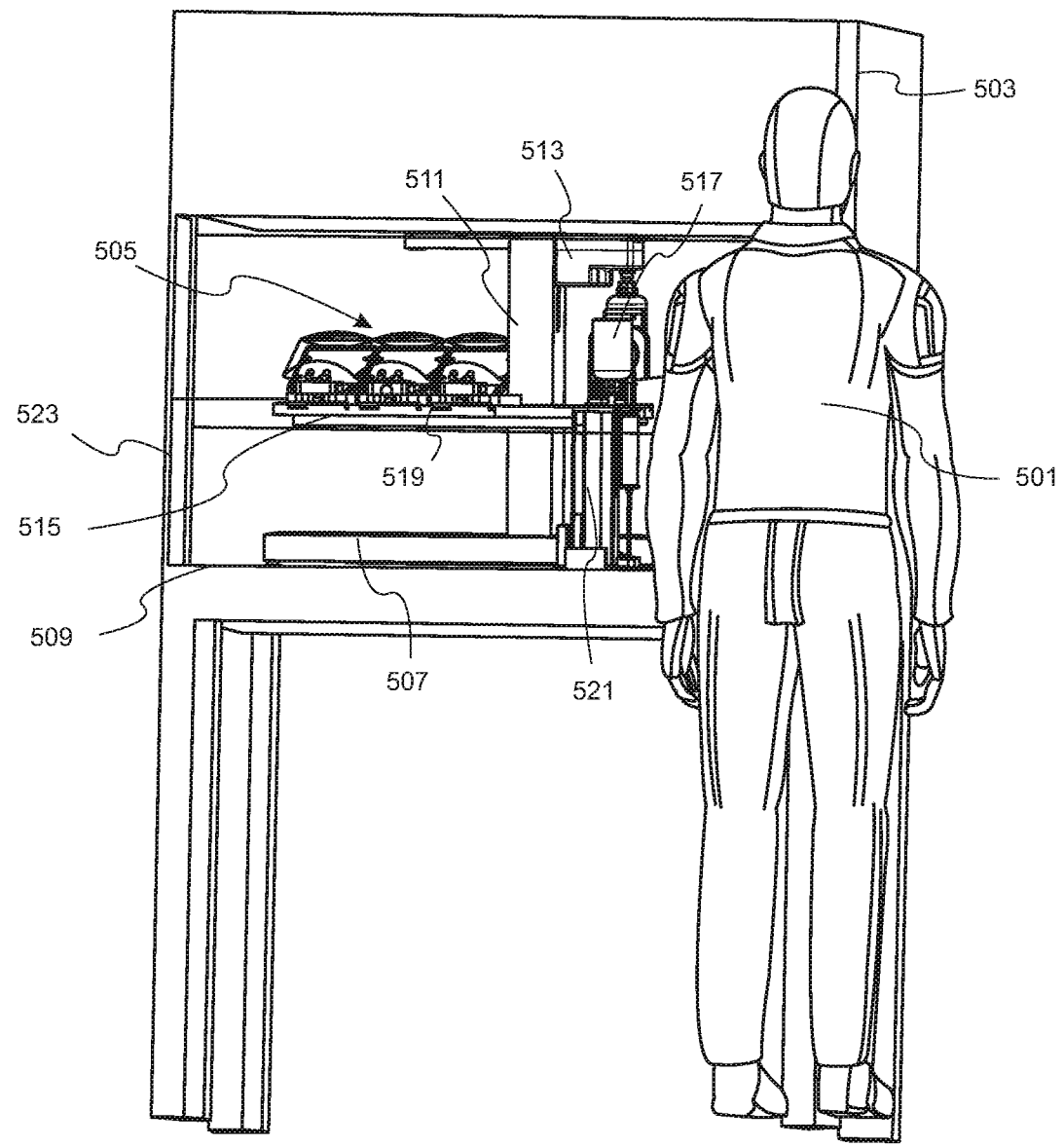
FIG. 5 is an illustration demonstrating user access to a pharmaceutical preparation system positioned inside a hood, according to embodiments of the presently disclosed subject matter.

In the illustration of FIG. 5, a user 501 stands in front of a hood 503 in which the pharmaceutical preparation system 505 is positioned. As shown, a bottom portion 507 of the system infrastructure is situated on a work surface 509 of the hood. The infrastructure can be fixed to the hood, or, alternatively, be removably placed inside the hood, for example such that the system can be easily transferred between hoods or even moved into a different area inside the same hood.

Referring back to the system, a connecting portion 511 of the infrastructure extends perpendicularly from the bottom portion, ending at the top portion 513 of the infrastructure. A platform 515 of the system is movable about the connecting portion, and comprises, in this example, a vial holder 517 and an IV bag holder 519 situated thereon. A syringe manipulator 521 is located beneath the platform and is configured for moving horizontally along the bottom portion of the infrastructure.

In this example, the hood comprises a window 523, optionally, a transparent window through which at least a part of the system can be seen. The bottom portion of the window can be at least partially opened (or at least openable) to allow access to the system. In the example shown, the platform of the system can be located at a level higher than the openable part of the window, and cannot be accessed by the user.

In some examples, as shown in FIGS. 17A-B, a window 1701 of a hood 1703 is located on a front panel 1705 of a housing of the hood. Generally, the front panel can include an insulating, non-accessible portion 1704, and an accessible portion 1706 in which the window (or other access opening or path for a user) is defined.

In some examples, the window is normally closed and is controllably opened only at selected times of the system operation cycle and/or for a selected duration of time, for example to allow loading and/or unloading of containers to and from the container-receiving modules of the system.

In some embodiments, when a platform 1707 is lowered to a level of the window (schematically shown in FIG. 17B), the platform is situated, for example, on a bottom portion 1709 of the system infrastructure or adjacent to it (optionally, such that the platform is directly situated on a working surface 1711 of the hood) where the container-receiving modules that are on the platform can be easily accessed by a user located in front of the front panel 1705. In some examples, at least the platform upper surface 1715 is parallel to the working surface of the hood.

In some examples, a vertical axis 1713 along which the platform is moved is parallel to a plane 1717 within which the front panel lies. When the platform is lowered along the vertical axis so as to be accessible, the platform is brought to a position in which the platform upper surface is located below the non-accessible portion 1704 of the front panel.

When the platform is lowered to the accessible position, a user in front of the hood can introduce their hands 1716 transversely to plane 1717, e.g. along or parallel to a depth axis 1714, to place and/or remove containers to and from the system, for example to and from the plurality of container-receiving modules situated on the platform, to and from the syringe manipulator, or others. In some embodiments, when the platform is lowered to the accessible position, the syringe manipulator 1719 is moved axially to a side edge 1721 of the platform or beyond it, so that the manipulator does not stand in the way of accessing the platform.

In some embodiments, the system can be configured according to a specific hood size and/or configuration. For example, the levels between which the platform is moved can be selected according to the size and position of the access window of the hood. The motor which drives movement of the platform may be programmed according to the selected levels.

Figure 6:
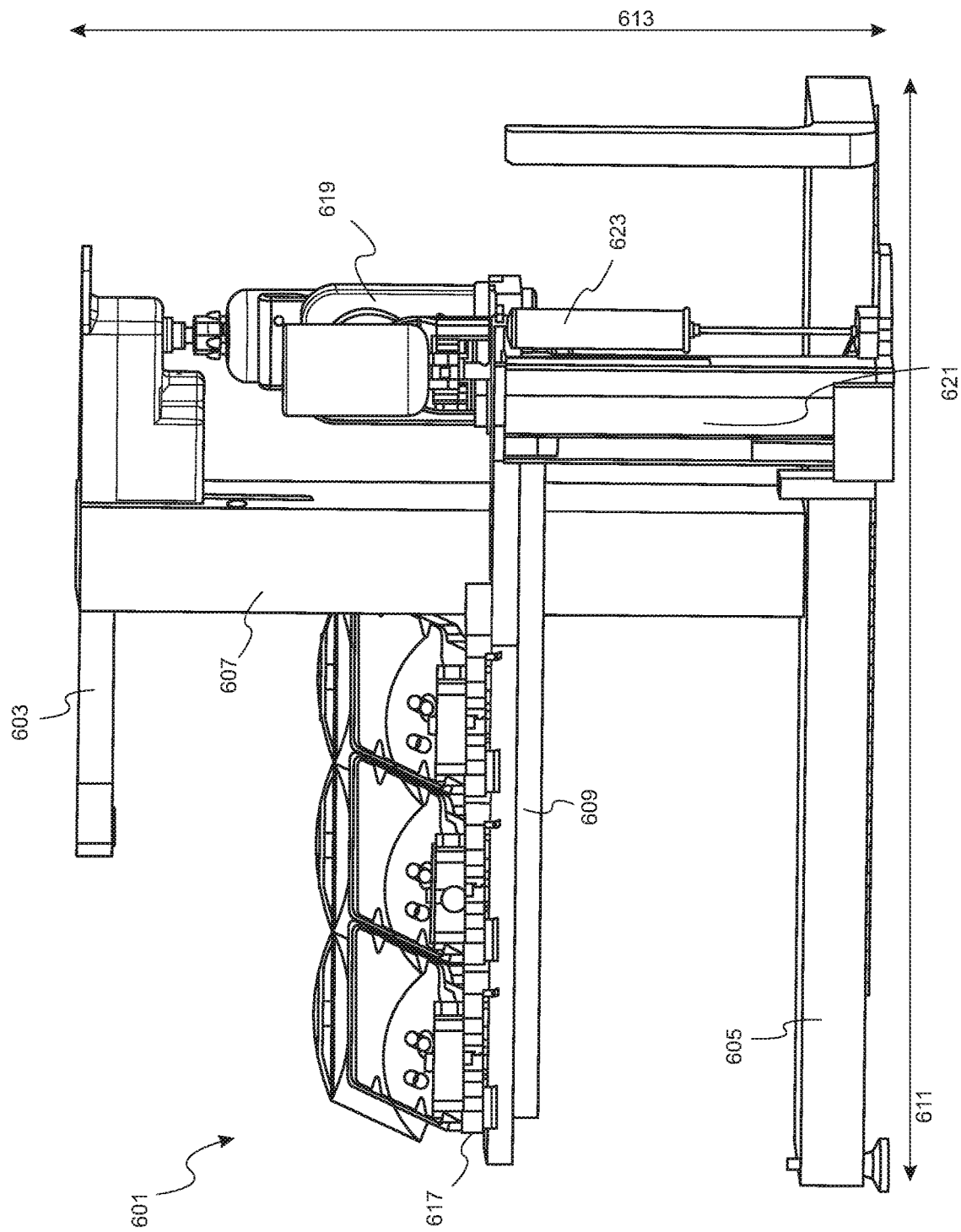
FIG. 6 is a front view of a pharmaceutical preparation system, according to an example of the presently disclosed subject matter.
Figure 7B:
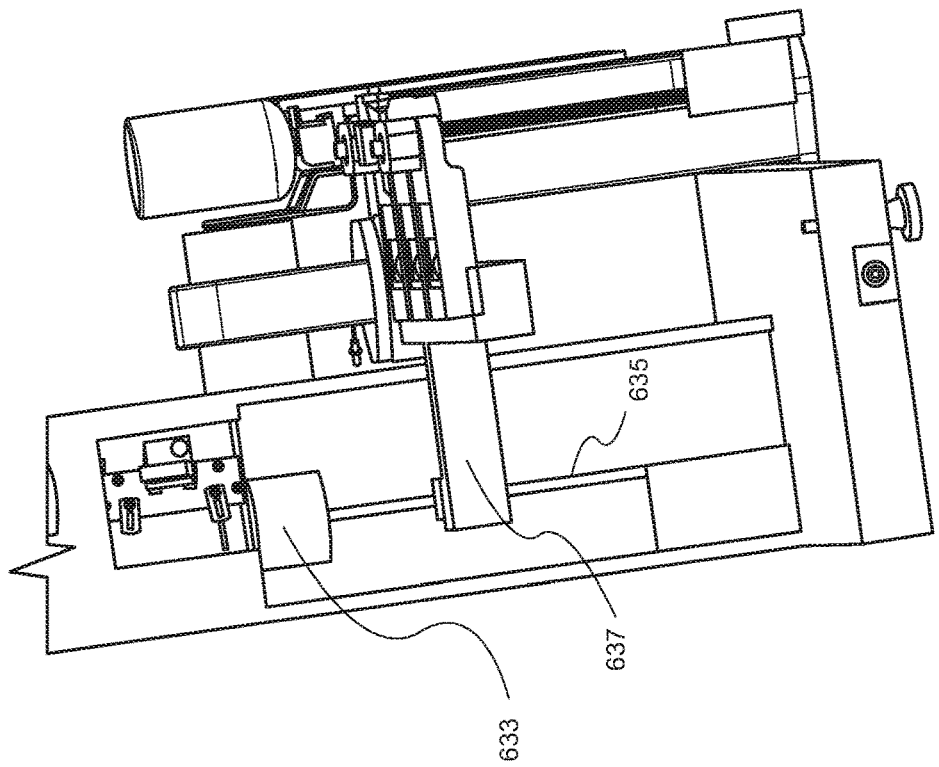
FIG. 7B is a side cross section view of a system as shown in FIG. 6.
Figure 7A:
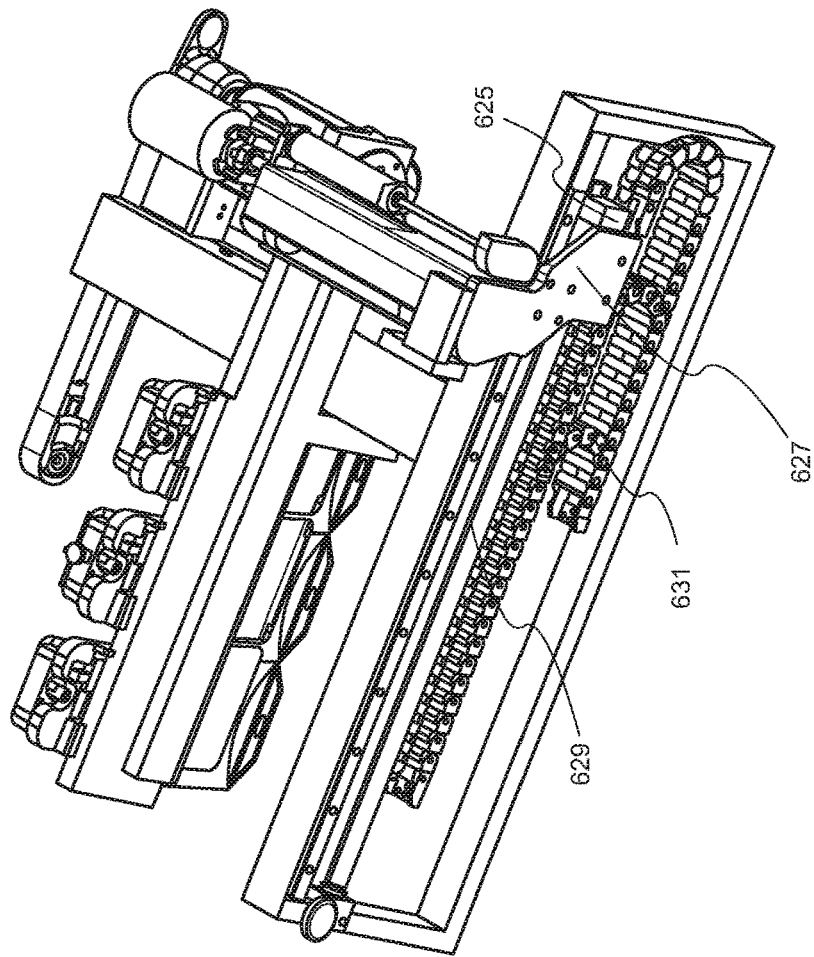
FIG. 7A is a bottom view of a system as shown in FIG. 6.
Figure 8:
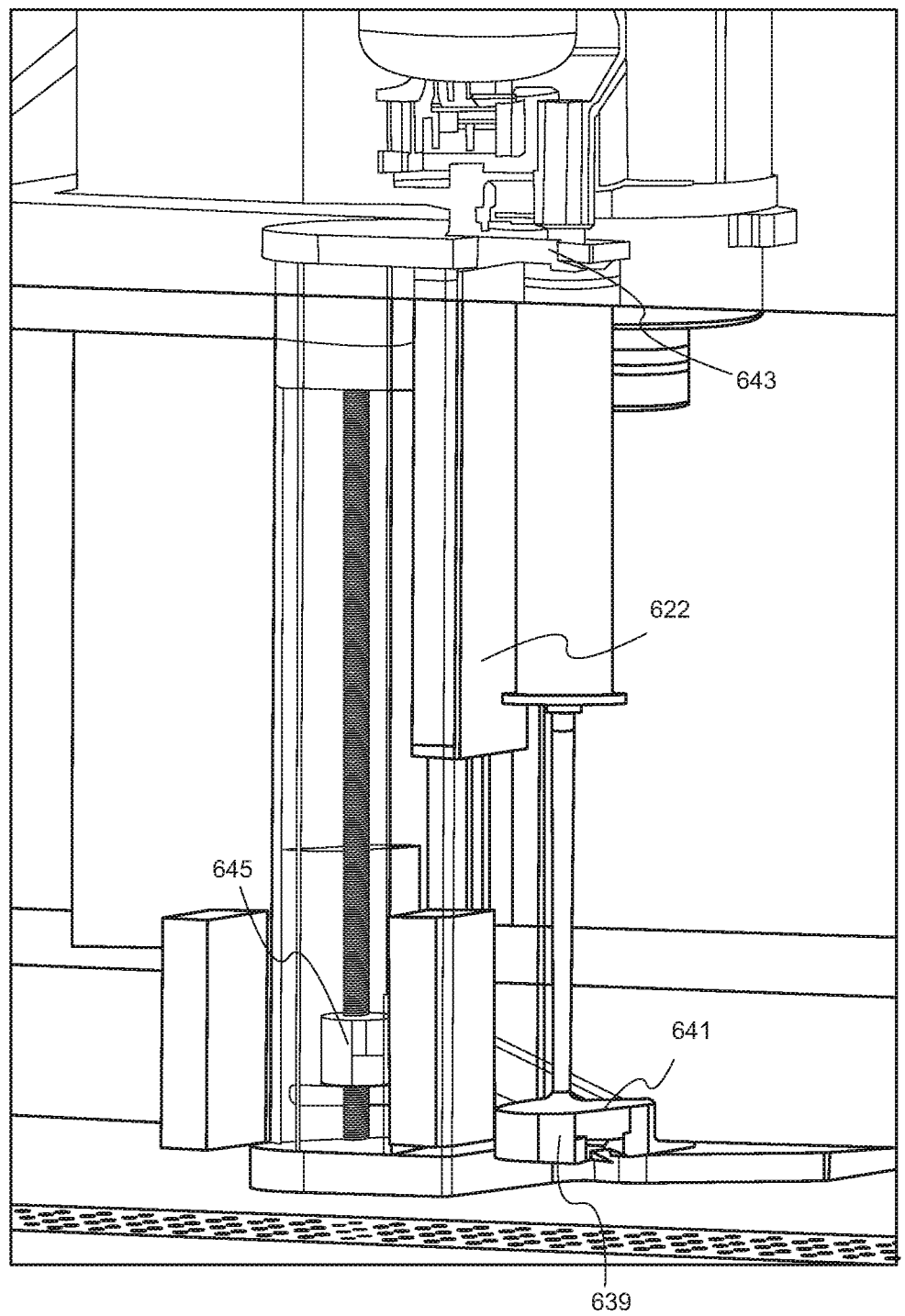
FIG. 8 is an enlarged view of a manipulator of a system for example as shown in FIG. 6.

An exemplary pharmaceutical preparation system and components thereof are demonstrated by FIGS. 6-8. System 601 comprises, in accordance with some embodiments, an infrastructure including a top portion 603 and a bottom portion 605 defining surfaces that are parallel to each other, and a connecting portion 607 extending between the top and the bottom portions, perpendicularly to the top and bottom portions. In some embodiments, the infrastructure is sized to fit within a lab hood, for example, on a work surface of the hood. The infrastructure can be small enough and light-weight enough to be lifted and placed into the hood manually. Dimensions of the infrastructure such as a width 611, e.g. as measured along the horizontal axis; a height 613, e.g. as measured along the vertical axis; and a depth (not shown), e.g. as measured along an axis perpendicular to the horizontal and vertical axis, are selected to be small enough so as to fit within a standard hood, optionally on the work surface of the hood. In some cases, the system, when placed inside a hood, does not occupy more than 80%, more than 70%, more than 60%, more than 50% or intermediate or smaller volume of an available work volume of the hood.

As further shown in the system of FIGS. 6-8, a platform 609, which defines a surface parallel to the top and bottom portions, is configured to be raised or lowered along at least a portion of the length to the connecting portion by a lift mechanism. The platform comprises container-receiving modules constituting, in this example, an IV bag holder 617, and a vial holder 619, both mounted onto a top surface of the platform.

The lift mechanism which raises and lowers the platform, shown at the cross section view of FIG. 7B, comprises a motor, such as a linear servo motor 633, having an elongate screw 635 extending longitudinally inside the connecting portion of the infrastructure. The platform is slidably connected to the elongate screw via an extension 637, optionally L-shaped, as shown, extending from a rear face of the platform. The lift mechanism can be configured to raise or lower the platform a distance of up to, for example, 200 mm, 350 mm, 450 mm, or intermediate, longer or shorter distance.

A manipulator 621, which in this case is configured to move and manipulate a syringe 623, is slidably connected to the bottom portion of the infrastructure. As can be seen in FIG. 7A, the movement mechanism of the manipulator comprises a linear motor 625 to which the manipulator is connected via a coupling 627. The coupling is seated on a linear rail 629 and driven with respect to the rail with the aid of a chain mechanism 631. The manipulator itself, as shown in FIG. 8, comprises a plunger-flange receiver 639 including a housing which defines one or more recesses 641 into which a plunger flange can be fittingly inserted; and a grasper (or gripper) 643 which is configured to hold an upper portion of the syringe, such as the syringe hub, barrel, or, when used, a syringe connector. The plunger-flange receiver is operably connected to a linear servo motor 645 which can raise or lower the plunger-flange receiver so as to either draw fluid into the syringe barrel, or inject fluid therefrom.

In some embodiments, the manipulator comprises an illumination component 622 such as a LED array situated, for example, behind the syringe. The illumination component can facilitate imaging of the syringe, for example for the purpose of assessing a volume of fluid inside the syringe.

In some examples, the connecting portion can be generally formed in one or more parts, and at least one of those one or more parts can be detachably connectable to another one of those one or more parts and/or to a portion of the rigid system infrastructure. In some examples, the at least a part of the top portion of the system can be connected to the detachably attachable part of the connecting portion, and thus can be assembled and disassembled together therewith. The connecting portion being formed in one or more detachably attachable parts imparts modularity to the system, thereby allowing the parts of the system to be modularly assembled into and disassembled from the hood.

Figure 25A:
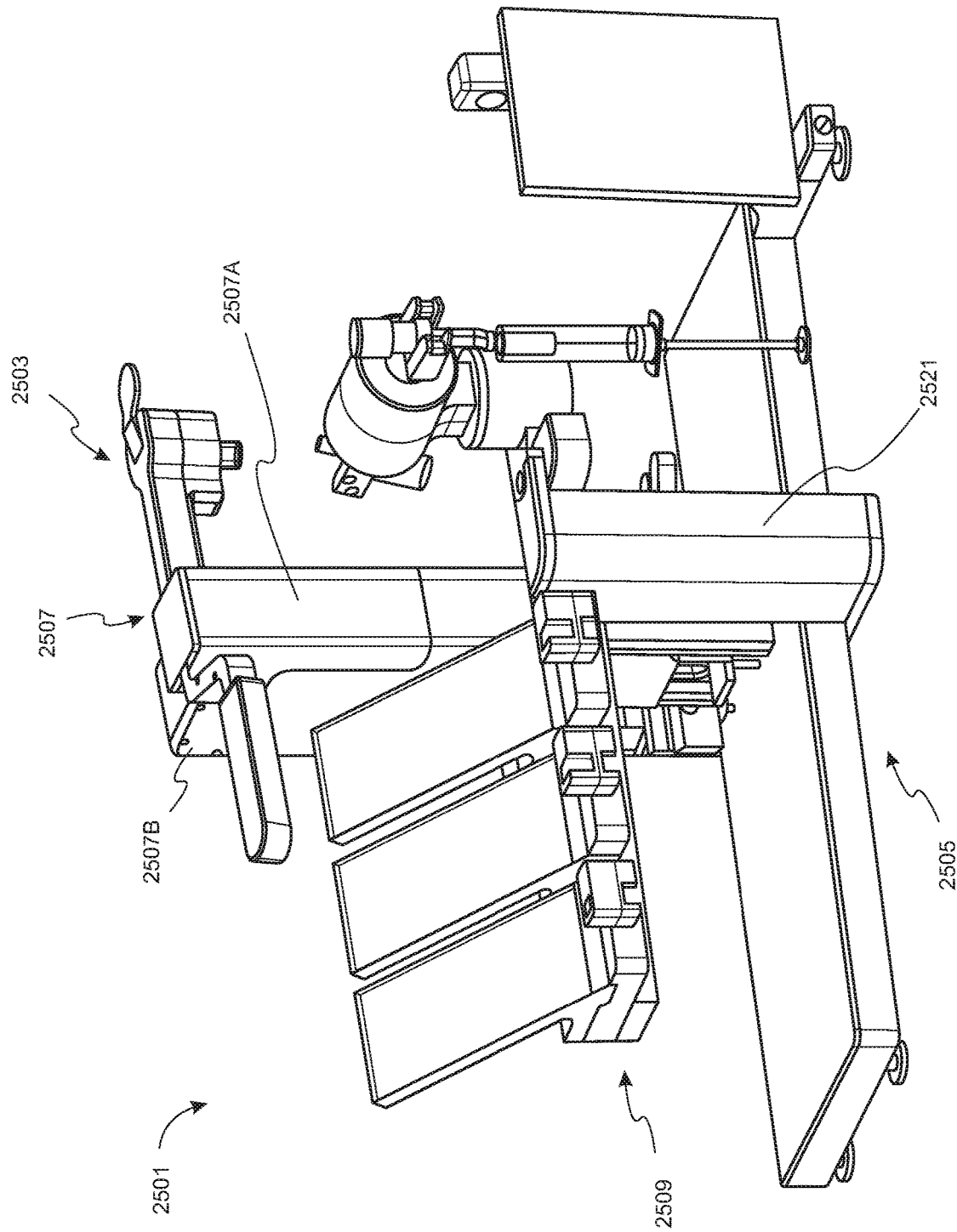
FIG. 25A is a front perspective view of a pharmaceutical preparation system, according to an example of the presently disclosed subject matter.
Figure 25B:
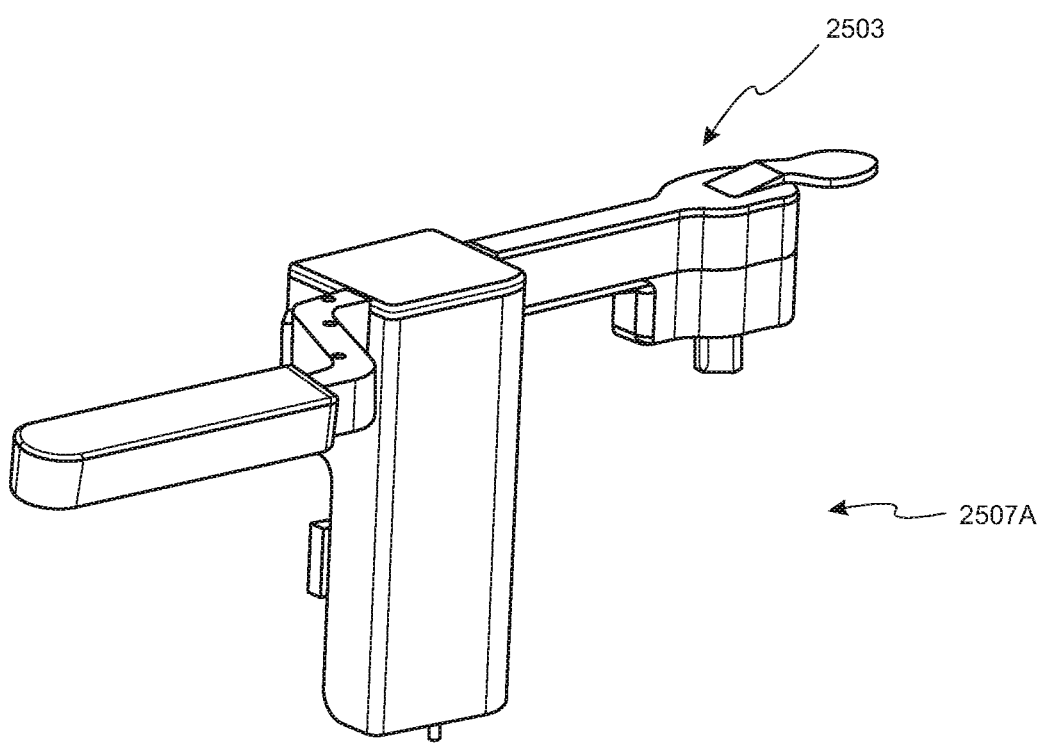
FIG. 25B is a front perspective view of a part of a connecting portion of the system infrastructure disassembled from the pharmaceutical preparation system of FIG. 25A.
Figure 25C:
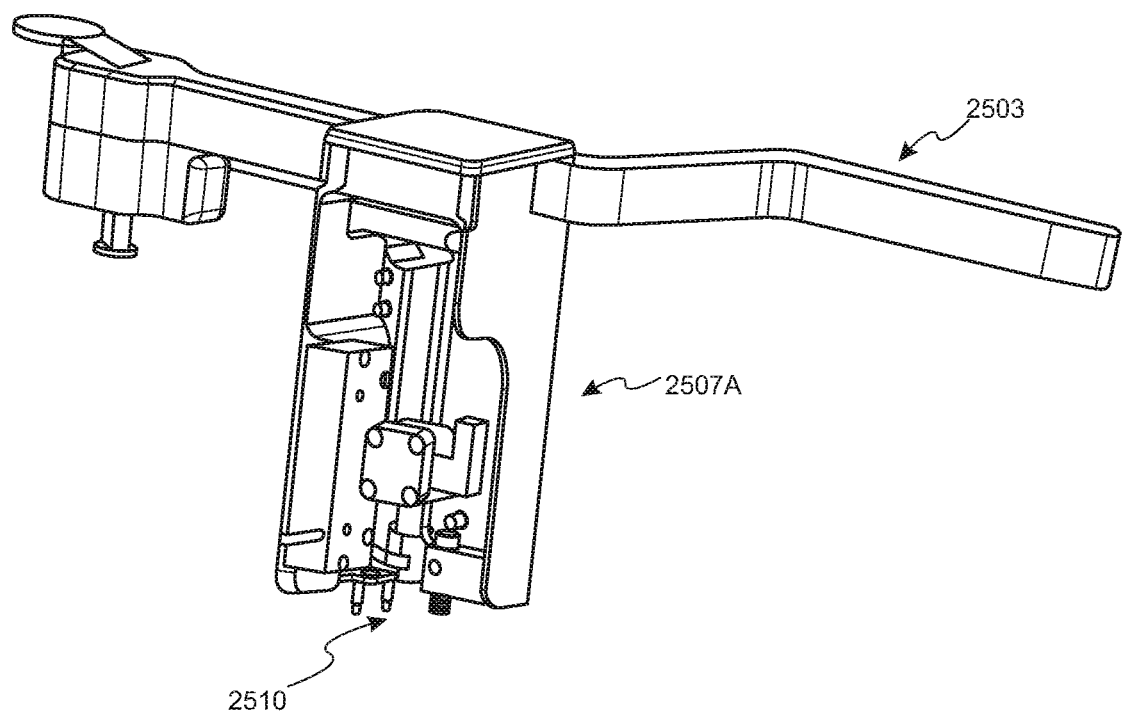
FIG. 25C is a rear perspective view of the part of the connecting portion shown in FIG. 25B.

In the example illustrated in FIGS. 25A-C, a pharmaceutical preparation system 2501 and components thereof are demonstrated. The system 2501 comprises, in accordance with some embodiments, an infrastructure including a top portion 2503, a bottom portion 2505, a connecting portion 2507 extending between the top and the bottom portions, a platform 2509 comprising container-receiving modules, and a manipulator 2521. It is to be understood herein that the system 2501 can include some or all of the features of the pharmaceutical preparation systems described herein according to various embodiments, and the description of the components (for example, top portion, bottom portion, connecting portion, platform, and manipulator) of the pharmaceutical preparation systems described herein can apply to the corresponding components of the system 2501 as well.

In addition to including the features of the connecting portions of the pharmaceutical preparation systems described herein, the connecting portion 2507 is modularly formed in two parts 2507A and 2507B being detachably attachable to each other. The first part 2507A is detachably attachable to the second part 2507B, whereas the first part 2507 can be assembled to the second part 2507B after the system has been positioned within a hood. Also, the first part 2507 can be disassembled from the second part 2507B for cleaning and/or maintenance purposes. The top portion 2503 is connected to the detachable (first) part 2507A and can be assembled and disassembled together therewith. This enables easy and quick assembly, disassembly, and/or maintenance of the system in the hood. As can be seen best in FIG. 25C, the detachable part 2507A can be assembled and disassembled by assembling means 2510, which in the illustrated example comprises nut, bolts, and screws. In some examples, the assembling means can include any mechanical, electro-mechanical, electronic/electrical, magnetic means, or combinations thereof, generally known to facilitate quick and easy assembly and disassembly of the detachable part. In some examples, the assembling means can include a snap-fit mechanism.

Figure 9:
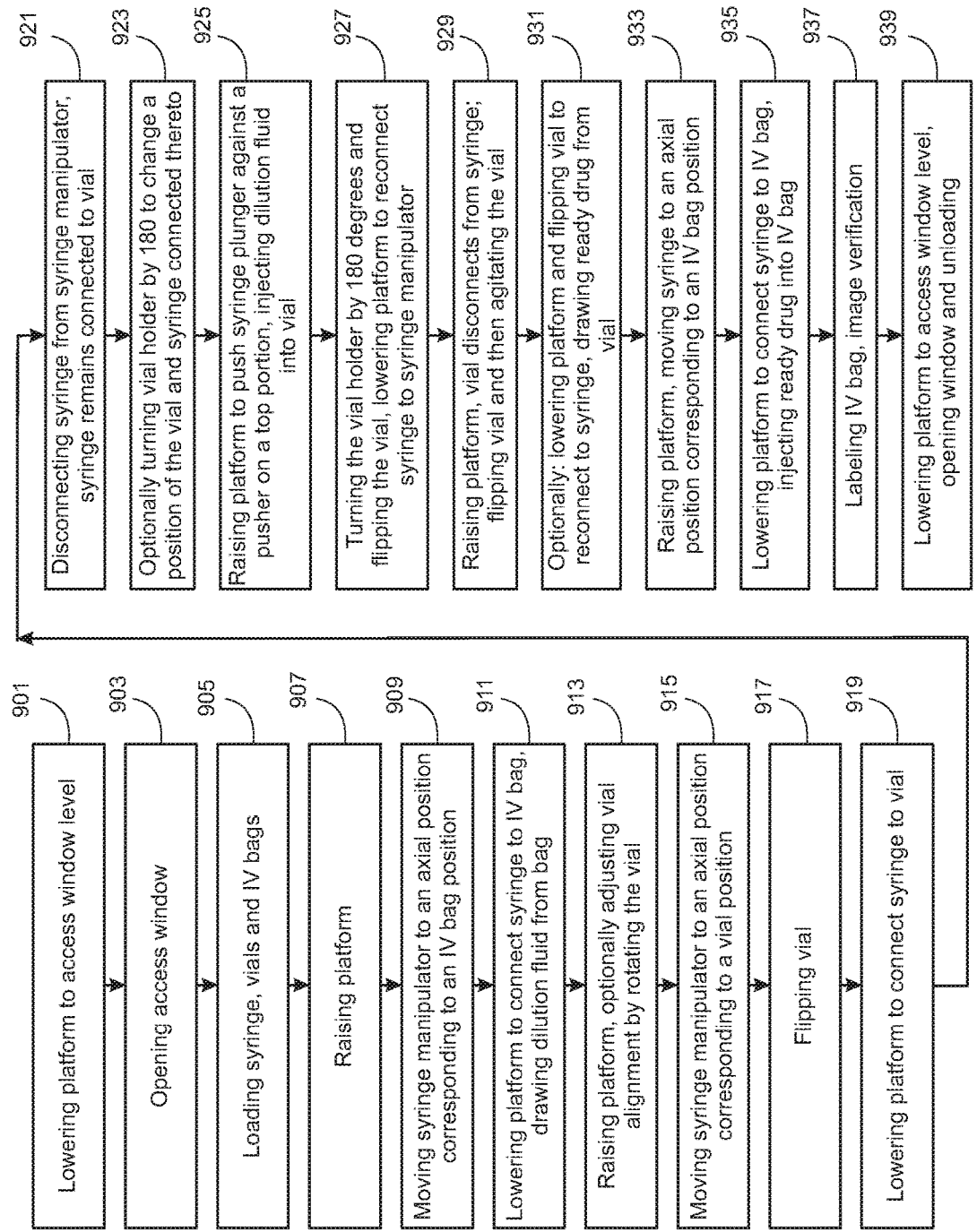
FIG. 9 is a flowchart of a detailed method of operating a pharmaceutical preparation system positioned inside a hood, according to an example of the presently disclosed subject matter.

In an exemplary use of the system (for example, when located inside a hood), as described in the flowchart of FIG. 9, the following processes can take place:

At 901, the platform is lowered to a level in which it can be accessed via window or other opening of the hood. At 903, the window is opened. At 905, a user (e.g. a lab technician, a nurse, a pharmacist, a physician and/or other medical or lab personnel) prepares the system by loading containers, such as by loading one or more vials and one or more IV bags onto the respective container-receiving modules on the platform, and at least one container, such as a syringe, onto the manipulator.

At 907, the platform is raised to a level in which it is no longer accessible via the window. At 909, the syringe manipulator is moved along the horizontal axis to an axial position corresponding with that of at least one IV bag positioned on the IV bag holder. At 911, the platform is lowered again to obtain a fluid interface between the syringe held at the manipulator, and the IV bag. Fluid (e.g. a diluent such as saline) is then drawn from the IV bag into the syringe (by actuation of the syringe plunger).

At 913, the platform is raised again. Optionally, an alignment of a vial held at the vial holder is adjusted by rotating the vial using a vial aligner configured at the top portion of the infrastructure, as further described herein in FIG. 10.

At 915, the syringe manipulator is moved along the horizontal axis to another axial position, corresponding with that of a vial held by the vial holder. Then, at 917, the vial is flipped by the holder so that it is held at an inverted orientation, and at 919 the platform is lowered to connect the syringe (held by the manipulator) to the inverted vial.

At 921, the syringe is disconnected from its manipulator, and remains connected to the vial. At 923, optionally, the vial holder is turned about its own axis to change a position of the vial and syringe connected thereto. At 925, the platform is raised to push the plunger flange of the syringe against a pusher element (or generally a designated surface) configured at the top portion of the infrastructure, for causing the fluid to be injected from the syringe into the vial. (Optionally, the change in position by turning of the vial holder is performed for bringing the vial and syringe to a location that is directly underneath the pusher).

At 927, the vial holder is turned again, and the vial is flipped to an inverted position. The platform is then lowered to reconnect the syringe to the syringe manipulator.

At 929, the platform is raised, pulling the vial away from the syringe. Then, the vial holder flips the vial into an upright orientation, and agitates the vial to mix its contents, by repetitively pivoting the vial. At this stage, the vial can contain a ready drug.

At 931, optionally, the platform is lowered and the vial holder flips the vial again to an inverted orientation. The syringe reconnects to the vial, and the syringe plunger is actuated to draw the ready drug from the vial into the syringe.

At 933, the platform is raised, and the syringe manipulator moves horizontally to an axial position corresponding to an IV bag position. Optionally, the IV bag intended for filling is at a different position than the initial IV bag from which the diluent was drawn.

At 935, the platform is lowered to connect the syringe to the selected IV bag, and the plunger is actuated to inject the ready drug into the IV bag.

At 937, the filled IV bag is labeled, for example to mark its contents, a time of preparation, details of the patient who was administered with the drug, an expiration date, and/or other relevant data.

At 939, the platform is lowered again to the level of the access window. The window is opened and the containers, including the IV bag filled with the ready drug, can be unloaded.

It is noted that in some embodiments, the ready drug can be received or remain within the syringe, or, alternatively, be injected into a same or different vial.

It is noted that the steps described and the order in which they are carried out are provided only as an example and use of the system should not be restricted to the above-described method.

In a system as described, it can be possible to perform multiple processes while containers of the system remain held by the same holder to which they were loaded, throughout the complete preparation. For example, a vial loaded onto a vial holder remains held by the vial holder throughout the processes of: injecting a diluent into the vial, agitating the vial, drawing the ready drug from the vial. In another example, an IV bag remains held at the same position on the bag holder throughout drawing of fluid from the bag, and optionally insertion of fluid into the bag, at a later stage of the process. In another example, at least one vial is agitated while fluid transfer processes (e.g. drawing, injecting fluid) are performed for at least one other vial.

Maintaining a container held at the same holder throughout the complete process, between loading of the system to unloading of the system, may: reduce a complexity of the system, facilitate loading/unloading, accelerate preparation times (as there is no need to transfer containers between different locations of the system), and may generally provide for a more compact arrangement with a potentially small footprint.

Further, in a system as described, fluid interface(s) can be obtained by synchronized movement of the platform and the manipulator, whereby each is configured to be moved along a single axis. This may facilitate control of the system and reduce complexity.

Further, the different container-receiving modules of the platform can be utilized simultaneously, thereby potentially reducing preparation times. In an example, the syringe manipulator can approach and draw/inject fluid from/to an IV bag on the bag holder, while at the same time a vial into which a diluent was previously injected is agitated by the vial holder.

Further, raising and lowering of the platform can provide for a selective interface between container-receiving modules of the platform and other parts or components of the system which are configured at or generally connected to the top and bottom portions of the infrastructure. For example, as further described below, the platform can be raised to bring a vial (held by a vial holder situated on the platform) to a vial aligner extending from the top portion of the infrastructure. Generally, movement of the platform can provide for performing different manipulations on the containers at different height levels.

In some examples of the pharmaceutical preparation system, one or more imagers (e.g. 2, 3, 4, 5, 7, 10 intermediate, larger or smaller number of imagers) can be used. Generally, an imager can be mounted or otherwise connected to the system infrastructure, to the platform and/or to the inner walls of the hood, for providing image data such as: detection of a volume of fluid inside a container; detection of presence of a container; detection of a position of: a container, a container-receiving module, the platform, the manipulator; detection of fluid related parameters, and/or others.

Figure 10B:
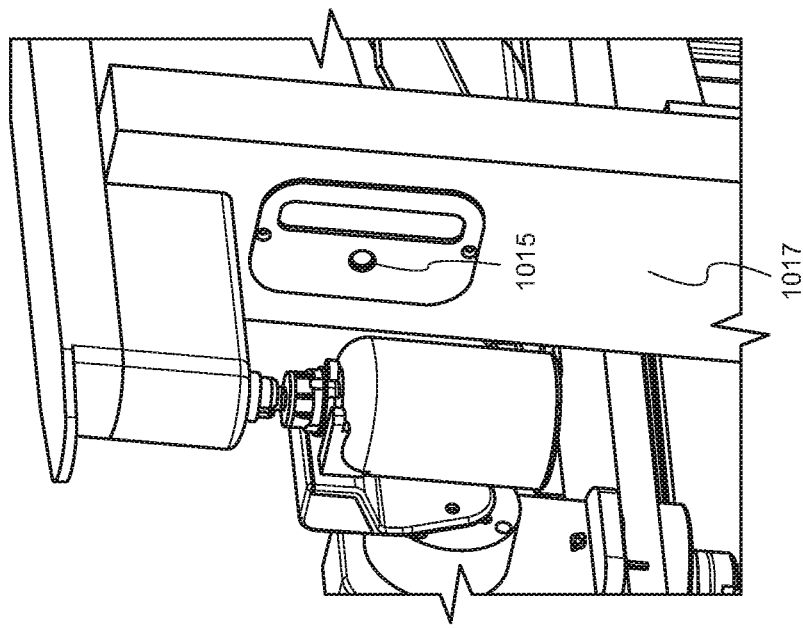
FIGS. 10A-B are illustrations demonstrating use of a plurality of imagers in a pharmaceutical preparation system, according to an example of the presently disclosed subject matter.
Figure 10A:
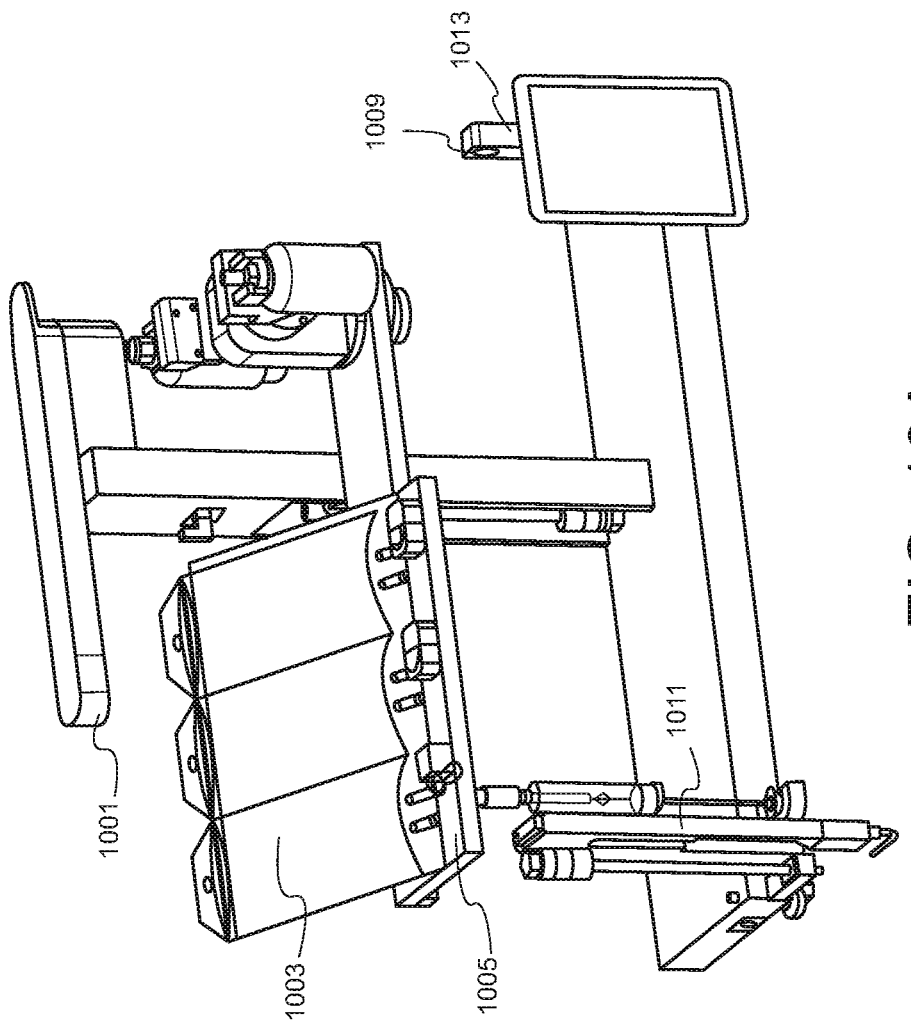

In the example of FIGS. 10A-B, a first imager 1001 is positioned at a location suitable for imaging IV bag(s) 1003 positioned on the IV bag holder 1005. The first imager 1001 can be, for example, configured at the top portion of the infrastructure. Data obtained by the imager can include: presence of IV bag(s), a volume of fluid within an IV bag, labeling data of the IV bag, and/or other parameters related to the IV bag(s). A second imager 1009 is positioned at a location suitable for imaging the manipulator 1011 and the container (e.g. syringe) held by the manipulator. The second imager 1009 can be, for example located at an upright extension 1013 of the bottom portion of the infrastructure. Imager 1009 can be configured, for example, for detecting a volume of fluid within the syringe, detecting a relative position of the manipulator (e.g. along the horizontal axis), and/or other parameters related to the manipulator and/or to the syringe.

In some embodiments, extension 1013 and/or the system infrastructure in general can serve for holding illumination and/or sensing components of a safety light curtain, for guarding access to the system.

A third imager 1015 is positioned at a location suitable for imaging vial(s), for example located at the connecting portion 1017 of the infrastructure. The imager can be configured for detecting presence of a vial, an alignment of a vial (in a situation in which the vial or a vial adaptor does not have rotational symmetry), a volume of fluid in the vial, and/or other parameters related to the vial.

Figure 11:
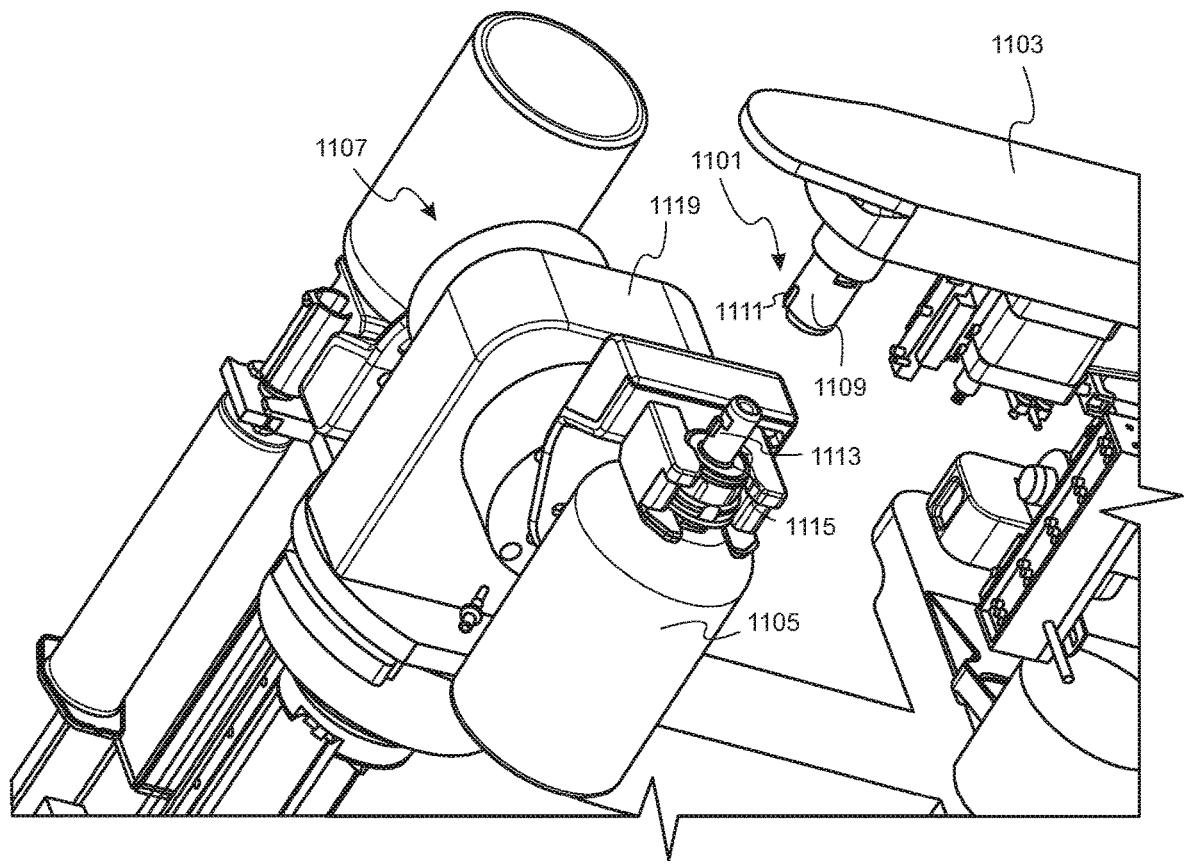
FIG. 11 is an enlarged view of a part of a pharmaceutical preparation system which includes a vial aligner, according to embodiments of the presently disclosed subject matter.

As mentioned above, if the vial or a vial adaptor mounted thereon are not rotationally symmetric, it may be desired to align the vial by rotating it. In an example of a closed fluid transfer system, the vial comprises an adaptor and the syringe comprises a connector, and a sealed connection between the two may be achieved only at a certain rotational alignment of the adaptor. In such case, it may be needed to rotate the vial and/or its adaptor. A mechanism for aligning the vial is described with respect to FIG. 11. In the example shown, a vial aligner 1101 is configured at the top portion 1103 of the infrastructure, located directly above a vial 1105 held at the vial holder 1107 (or at a position to which the vial holder can rotate the vial to, such that the vial can be aligned under the vial aligner). The vial aligner comprises a cylindrical shaft 1109 extending downwards from the top portion of the infrastructure (or, optionally, other supporting beam) towards the bottom portion of the infrastructure. The cylindrical shaft includes a slit 1111 formed along a portion of the wall of the shaft, for fitting onto a respective protrusion 1113 of an adaptor 1115 of the vial. The cylindrical shaft can be fitted onto the adaptor by raising the platform until the top of the adaptor is received within the shaft. Turning of the shaft about the shaft long axis can then turn the vial assembly (the vial and adaptor) about the long axis of the assembly, aligning the vial assembly at a selected rotational alignment. Optionally, the vial can be turned by the vial aligner even when the vial remains held by a frame of the vial holder (more specifically, when held by clamping arms 1117 of the frame). An actuator of the shaft which is configured for turning the shaft can include a motor (not shown), e.g. a stepper motor, optionally located inside the top portion of the infrastructure, and connected to the cylindrical shaft.

Rotation of shaft 1109 of the vial aligner can be controlled based on image data received from one or more imagers positioned and configured to image the vial. In an example of use, a current rotational orientation of the vial is assessed based on an acquired image; the shaft of the vial aligner is then rotated (such as according to a selected number of steps of the stepper motor) such that the slit 1111 is placed directly above a protrusion of the vial adaptor; then, the platform is raised to at least partially insert the vial adaptor into the shaft, to an extent sufficient to allow the shaft, when rotated, to rotate the vial adaptor (along with the vial) as well. At that stage, the vial assembly (including the vial and its adapter) can be rotated by a selected angle, for example to have the protrusion face a direction in which it can later engage a connector of a syringe and/or other containers or adaptors having a specific connection orientation. It is noted that the protrusion can be in the form of any non-circumferential protrusion, extending in a certain radially outwards direction from the vial assembly.

In some cases, following alignment of a first vial, turning of a body 1119 of the vial holder about its axis can place another (e.g. a second) vial which is held by the holder underneath the vial aligner, and the alignment process can be repeated for the second vial.

Figure 22A:
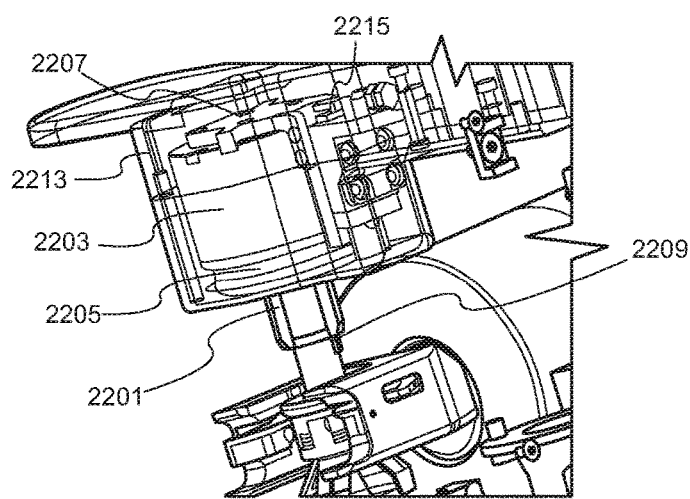
FIGS. 22A-D are images showing operation of an exemplary vial alignment mechanism, according to some embodiments.
Figure 22B:
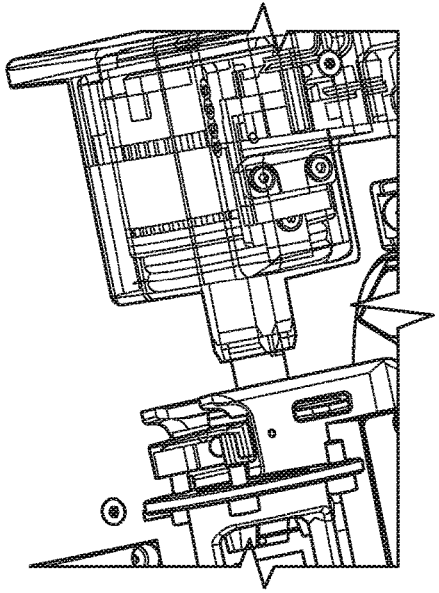
Figure 22C:
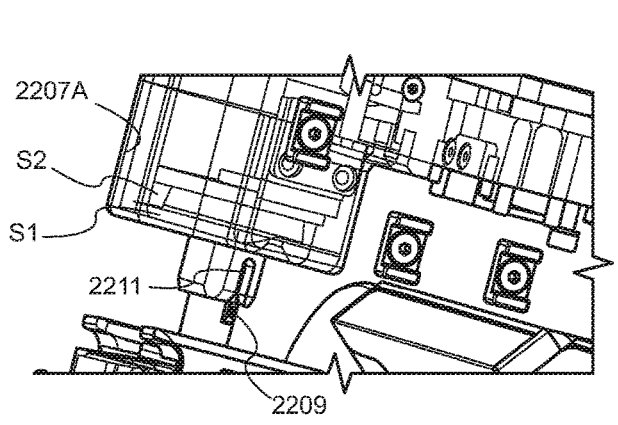
Figure 22D:
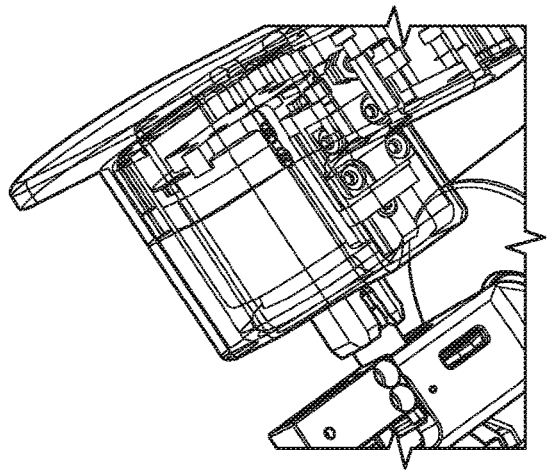

An exemplary vial alignment mechanism is described in FIGS. 22A-D. The vial aligner assembly comprises a cylindrical shaft 2201 which is connected to a rotary motor 2203 via a bearing 2205. A frame 2207 is located atop the motor. In use, the platform is raised to bring a vial assembly (a vial along with its adaptor) to the vial aligner. If the protrusion 2209 of vial adaptor is not aligned with the slit 2211 of the cylindrical shaft, as shown in FIG. 22A, raising of the platform continues and the protrusion slightly pushes the vial aligner assembly (including the cylindrical shaft, bearing, motor and frame) upwards with respect to the external housing 2213 of the system infrastructure, see FIG. 22B.

When the vial assembly is pushed upwards by the protrusion, the frame moves away from a sensor 2215 which is normally located at the level of the frame and contacts the frame. At this stage, the sensor, which is a contact-based sensor (e.g. an electrical conduction sensor) no longer contacts the frame, and an indication is provided. Based on the provided indication, raising of the platform is automatically stopped, and the motor of the vial aligner starts to rotate the cylindrical shaft. Rotation of the cylindrical shaft continues until the slit is aligned with the protrusion (see FIG. 22C), allowing the vial aligner assembly to "drop" back downwards, while the protrusion enters deeper into the slit (see FIG. 22D). When the vial aligner assembly has returned its lower position, the sensor contacts the frame again.

In a case in which no sensor indication is provided, it may imply that the cylindrical shaft has been initially oriented such that the slot is aligned with the protrusion, and there is no need to rotate the cylindrical shaft.

A potential advantage of a vial alignment mechanism for example as described with respect to FIGS. 22A-D may include that movement of the platform (raising/lowering) as well as rotation of the cylindrical shaft can be controlled by the same indication of the sensor.

In addition to the rotation, the cylindrical shaft 2201 can also be configured to move in a horizontal direction perpendicular to the shaft long axis of the shaft 2201. For example, as can be seen in FIGS. 22A-D, there is a space (or gap) S1 between the shaft and an interior wall 2207A of the frame 2207. The space S1 extends along a direction (in the illustrated example, the direction is horizontal) perpendicular to the shaft long axis and allows a degree of freedom to the shaft within the frame 2207 along the direction perpendicular to the shaft long axis.

In the illustrated example, there is a space S2 between the actuator (which is the motor 2203 in the illustrated example) and the interior wall 2207A of the frame 2207. The space S2, similarly to the space S1, extends along the direction perpendicular to the shaft long axis and allows a degree of freedom to the actuator (along the shaft) within the frame 2207 along the direction perpendicular to the shaft long axis. In some examples, only the shaft can be moveable in the space S1, and in some examples, both the shaft and the motor can be moveable in direction perpendicular to the shaft long axis within the frame.

In the illustrated example, the motor 2203, in addition to rotating the shaft, serves as a driver to move the shaft 2201 and the motor 2203 along the direction perpendicular to the shaft long axis. The motor 2203, serving as the driver, can be configured to move the shaft 2201 and the motor 2203 along the direction perpendicular to the shaft long axis independently of the rotation of the shaft 2201.

In some examples, the vial alignment mechanism can comprise a driver, independent and separate from the motor, for moving either or both of the shaft 2201 and the motor 2203.

It is to be noted that the above-described degree of freedom of the shaft 2201 (either alone or together with the motor 2203) along the direction perpendicular to the shaft long axis facilitates effective alignment of: the shaft 2201 with respect to the vial, for example while the vial is being fitted into the vial aligner, and/or the shaft 2201 together with the vial, for example while the vial is being aligned.

It is noted that in some examples, control of the vial aligner assembly can be performed using one or both of: image data, and sensor data, e.g. with a contact sensor for example as described above.

Figure 12:
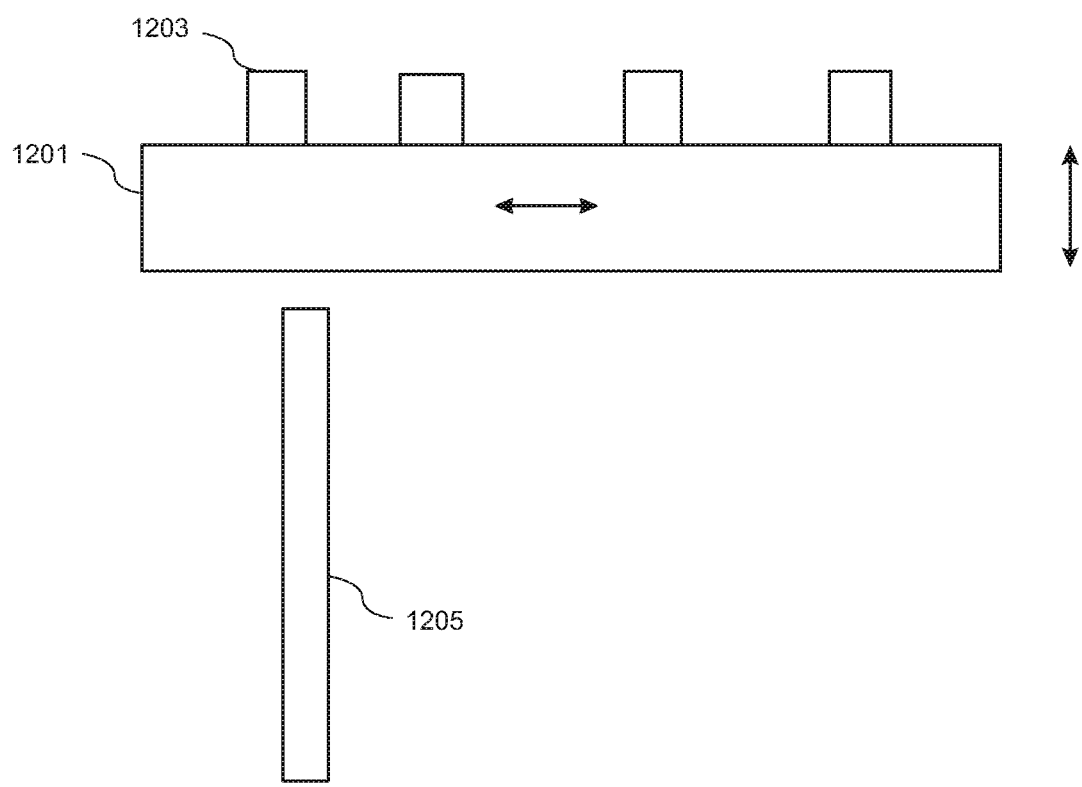
FIG. 12 is a schematic diagram of a pharmaceutical preparation system comprising a platform movable along the vertical axis and along the horizontal axis, according to other embodiments of the presently disclosed subject matter.

It is noted that the present disclosure is not limited to a platform that is movable vertically, and a manipulator that is movable horizontally. Some alternative system configurations are shown in FIGS. 12-15. In FIG. 12, a platform 1201 comprises a plurality of container-receiving modules 1203, and is movable along both the vertical axis and the horizontal axis. A manipulator 1205, e.g. a syringe manipulator, is positioned beneath the platform at a stationary position. In use, a fluid interface between a container (e.g. a syringe) held at the manipulator and a container held by the container-receiving modules can be obtained by horizontally moving the platform to align the selected container with the syringe, and then lowering the platform until a fluid interface is obtained.

Figure 13:
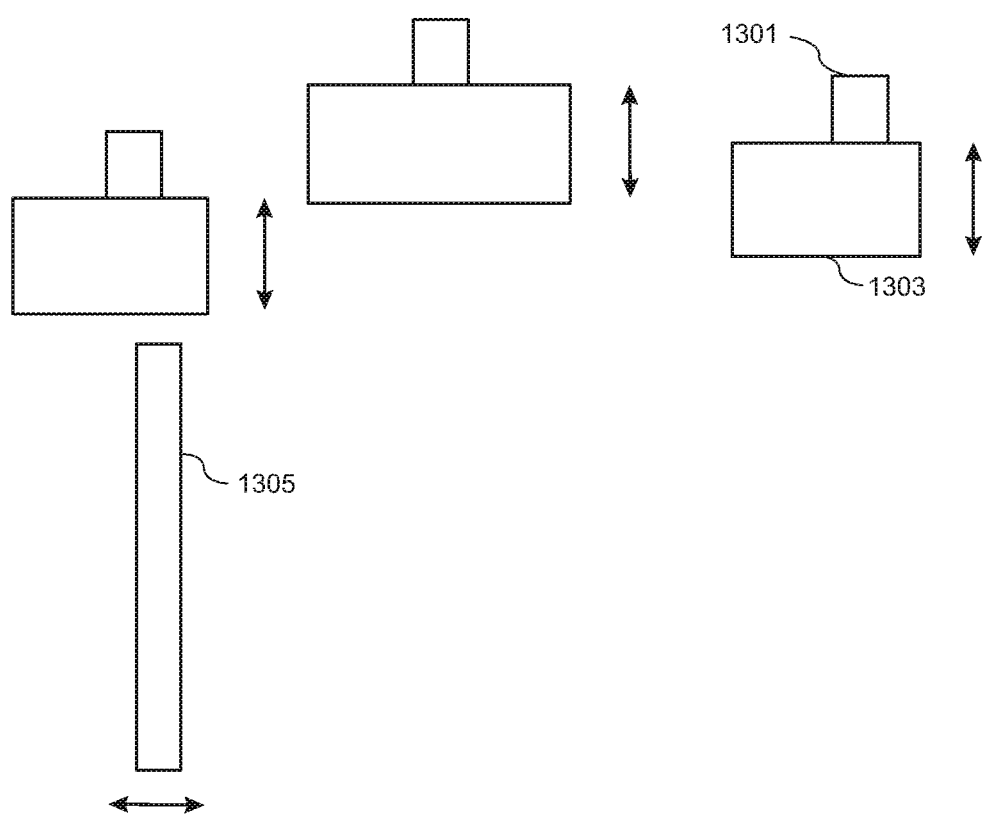
FIG. 13 is a schematic diagram of a pharmaceutical preparation system comprising multiple platforms, each platform independently movable along the vertical axis, and a manipulator movable along the horizontal axis, according to other embodiments of the presently disclosed subject matter.

In FIG. 13, each of a plurality of container-receiving modules 1301 is separately positioned on its own platform 1303, and each of the plurality of platforms is independently movable along the vertical axis, for obtaining a fluid interface with a horizontally moving manipulator 1305.

Figure 14:
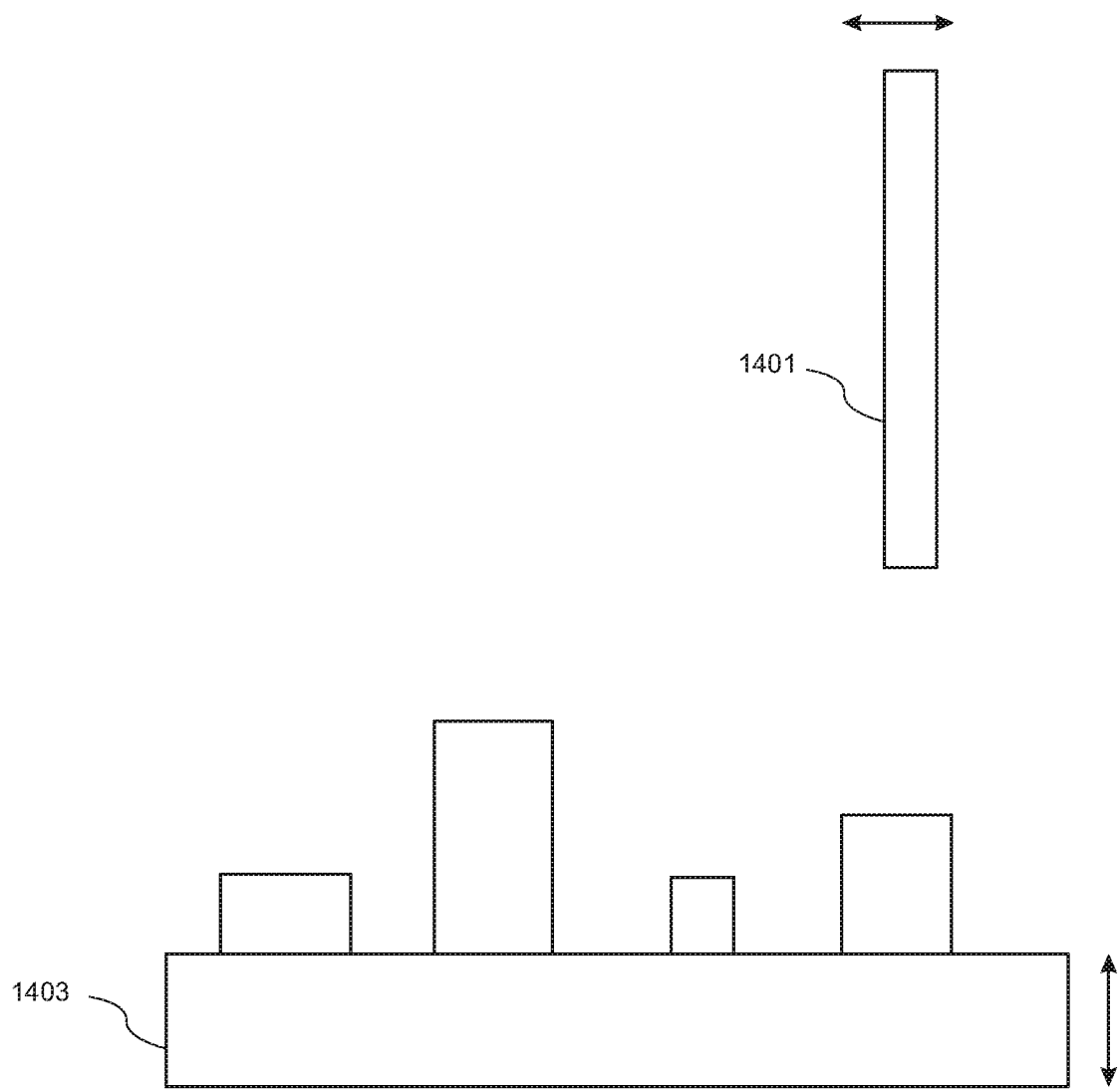
FIG. 14 is a schematic diagram of a pharmaceutical preparation system in which a manipulator is movable along the horizontal axis and is positioned above a platform that is movable along the vertical axis, according to other embodiments of the presently disclosed subject matter.
Figure 15:
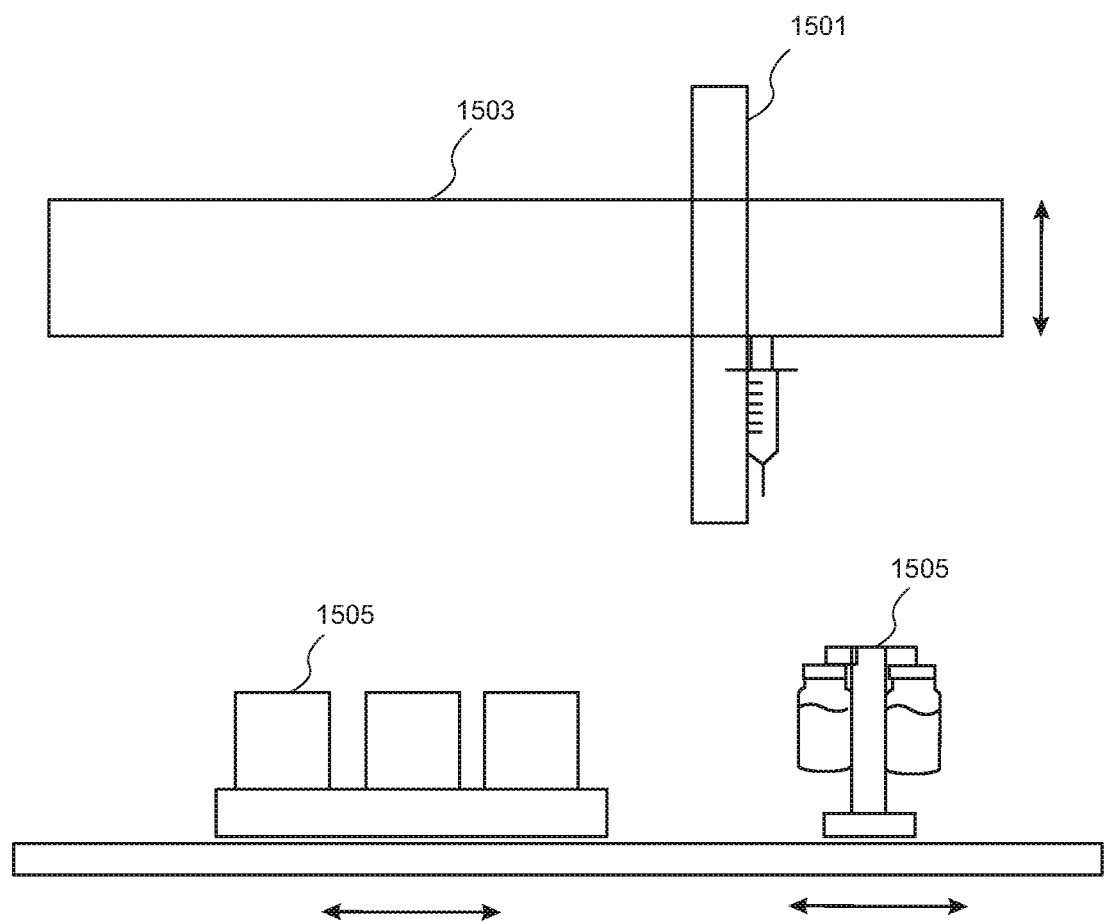
FIG. 15 is a schematic diagram of a pharmaceutical preparation system in which container receiving module(s) are movable along the horizontal axis, and a manipulator mounted or connected to a platform moves along with the platform along the vertical axis, according to other embodiments of the presently disclosed subject matter.

In FIG. 14, a manipulator 1401 (e.g. a syringe manipulator) is positioned above (for example as opposed to below) a platform 1403 which comprises a plurality of container-receiving modules. In use, the manipulator can be moved horizontally above the platform to an axial position corresponding with that of a selected container-receiving module, and then the platform can be raised for obtaining the fluid interface. In FIG. 15, a manipulator 1501 is situated on or otherwise connected to a platform 1503 which is movable along the vertical axis; and a plurality of container-receiving modules 1505, optionally positioned along the bottom portion of the infrastructure, are each independently movable horizontally. In use, a selected container-receiving module can be moved to an axial position corresponding to that of the manipulator; and the platform can be lowered to obtain a fluid interface between the container (e.g. a syringe) held by the manipulator, and a container of the selected container-receiving module.

Figure 16:
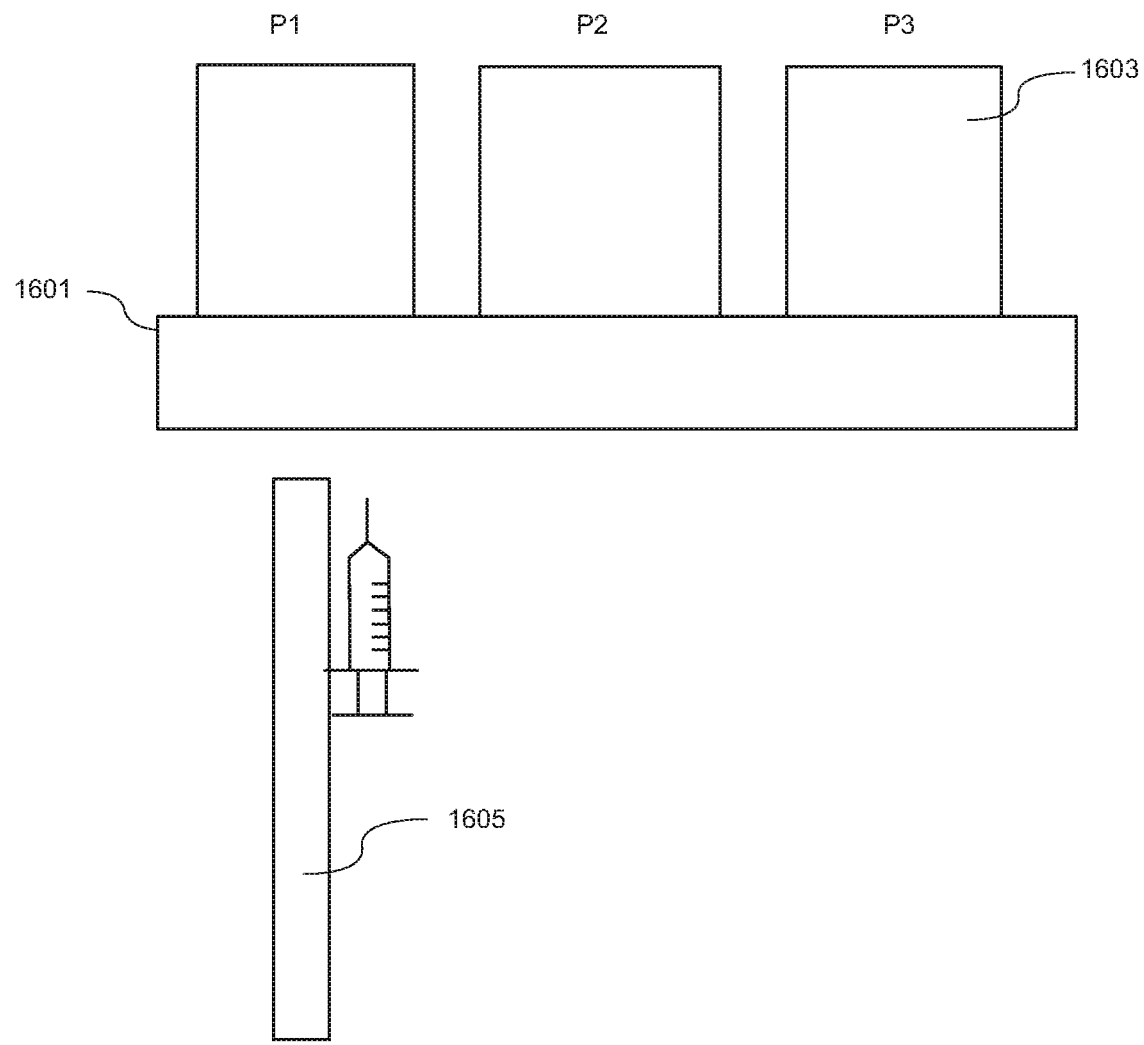
FIG. 16 is a schematic diagram of a fluid transfer assembly comprising an IV bag holder on which multiple IV bags are positioned, according to embodiments of the presently disclosed subject matter.

In FIG. 16, a fluid transfer assembly which can be used as part of a drug preparation system is shown. The fluid transfer assembly is comprised of a bag holder 1601, which defines multiple positions for receipt of corresponding multiple IV bags 1603; and a syringe manipulator 1605 configured to manipulate and optionally move a syringe. Each of the multiple positions P1-P3 defined at the bag holder can be associated with a designated function of the bag placed thereon, including, for example, a bag for dilution, which includes a diluent (e.g. saline, water); a bag for receipt of a drug, which can be empty or partially filled with a diluent; a bag which can be empty for receipt of excess gas or fluids; and/or other designated functions.

Selective access of the syringe manipulator to a bag in a certain position can be performed based on the required designated function of the bag. For example, when there is a need to obtain diluent, a controller of the system can bring the syringe manipulator to an interface with a bag at a certain position, for example, to a bag at position P1, which is associated with the dilution function; when there is a need to fill a bag with a ready drug, a controller of the system can bring the syringe manipulator to a bag at position P2, which is associated with the filling function, etc.

It is noted that a fluid interface between the syringe held at the manipulator and an IV bag at the holder can be obtained, in different systems, by either one of the following options: moving the syringe manipulator horizontally and moving the bag holder vertically; moving the bag holder horizontally and moving the syringe manipulator vertically; moving only the bag holder, vertically and horizontally; moving only the syringe manipulator, vertically and horizontally.

Figure 18:
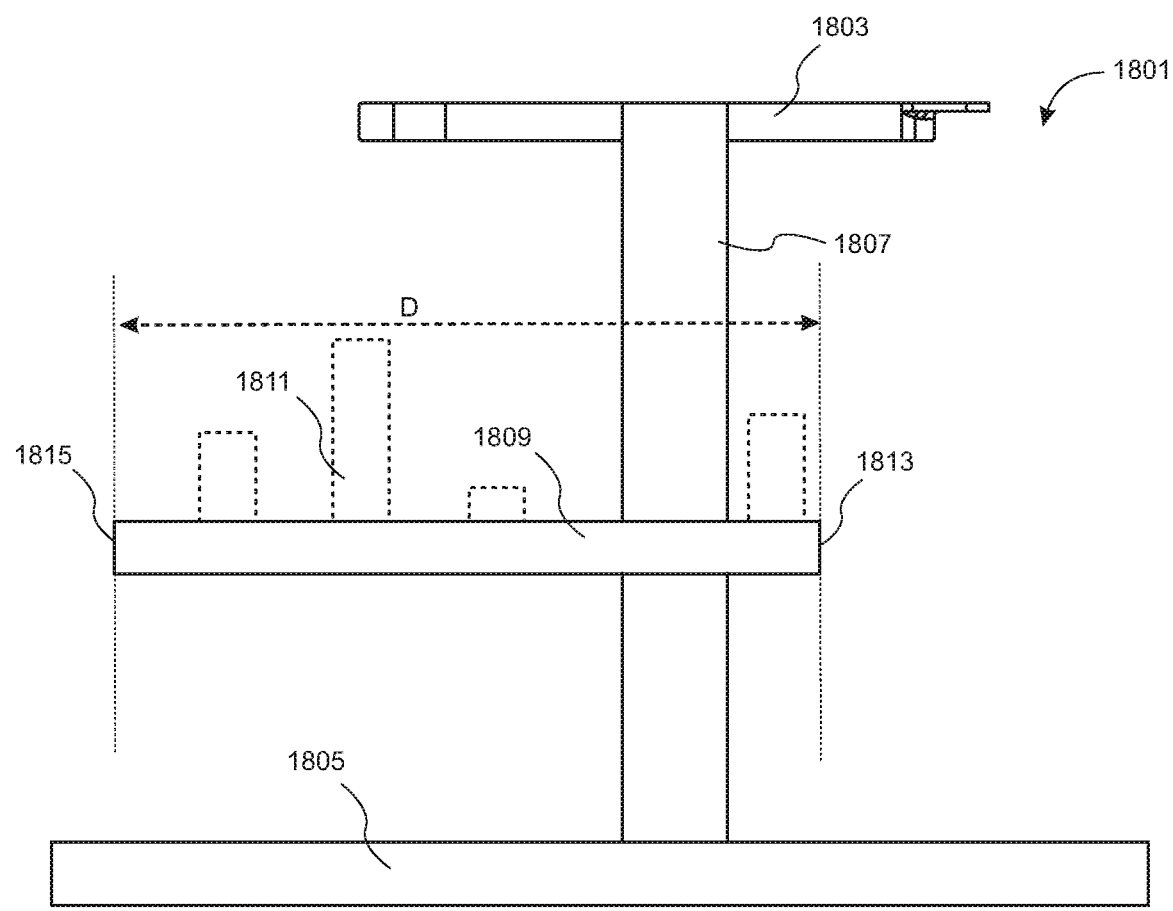
FIG. 18 is an outline of an infrastructure of a pharmaceutical preparation system which includes a movable platform, in accordance with some embodiments.

FIG. 18 is an outline of the infrastructure 1801 of a pharmaceutical preparation system which includes a platform, in accordance with some embodiments. The infrastructure is generally comprised of a top portion 1803, a bottom portion 1805, and a connecting portion 1807 which extends vertically between the top and bottom portions.

In some embodiments, the platform 1809 is parallel to the top and bottom portions, and is movable (lifted or lowered) with respect to a vertical (long) axis of the connecting portion. A plurality of container-receiving modules 1811 are mounted on the platform, being located in different axial positions along the platform. By dispersing the plurality of container-receiving modules axially along the platform, the modules may be easily accessed (when the platform is lowered to its accessible position), without the need for internally moving the modules or interchanging their positions to make them accessible via the hood access window. Commonly, the platform is shaped and sized so that a platform dimension along the horizontal axis of the system is at least twice as long as the platform dimension along the depth axis, and at least three times as long as the platform dimension along the vertical axis. In some examples, the platform is in the shape of a rectangular box, a beam, an elongate shelf or as such.

In some embodiments, the platform 1809 is operably connected to the connecting portion 1807 such that at least in a front view of the infrastructure, the connecting portion and the platform cross at a substantive center of the platform and in any case not at a side edge (1813, 1815) of the platform. In other words, assuming that each side edge defines a plane (with the two planes being opposite each other), and a distance D (equal to the length of the platform)

exists between the planes, the connecting portion crosses the platform at a position which is within the range of 0.1 D-0.9 D. A connecting portion being located such that it is substantially centralized with respect to the platform may be advantageous in that: a. a motor driving the vertical movement of the platform can be housed inside the connecting portion and in close proximity to the platform which it moves (requiring less or no transmission elements, and potentially allowing direct driving of the platform); b. having the platform extend in two opposite directions with respect to the connecting portion may provide improved weight distribution and potentially reduce the force moment acting on the platform, for example as compared to a structure in which the connecting portion is located at a side of the platform or adjacent thereto.

Figure 19:
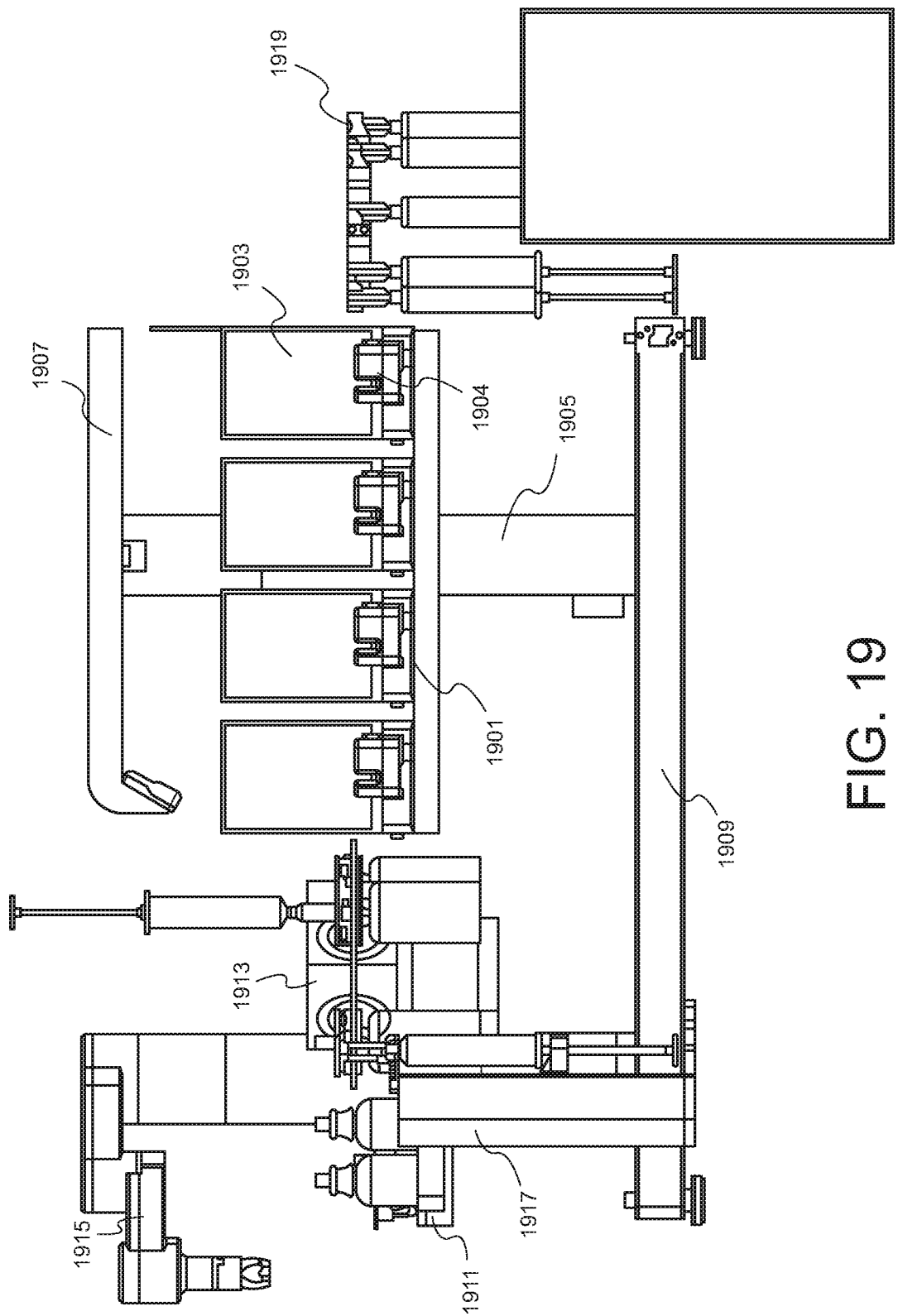
FIG. 19 is a front view of a pharmaceutical preparation system which comprises an infrastructure of the type shown in FIG. 18, in accordance with some embodiments.

FIG. 19 is a front view of a pharmaceutical preparation system which comprises an infrastructure of the type shown in FIG. 18, in accordance with some embodiments. In this example, a platform 1901 (on which, in this case, a plurality of IV bags 1903 are mounted with the aid of an IV bag holder 1904) is operably connected to a connecting portion 1905 of the infrastructure, extending such that a long axis of the platform is perpendicular to a long axis of the connecting portion. The connecting portion 1905 extends vertically between a top portion 1907 and a bottom portion 1909 of the infrastructure, and the platform can be moved (lifted or lowered) along the connecting portion. As can be observed, the connecting portion crosses the platform (at least in a front view of the system) at a substantive center of the platform length, such that the platform extends laterally on both sides of the connecting portion.

As shown, in some embodiments, the system can include additional structures or modules mounted along or adjacent the bottom portion. In the shown example, there are additional lift mechanisms for raising and lowering a vial tray 1911 and/or a vial holder 1913 (which is configured for agitating and/or flipping a plurality of vials); an articulated robot arm (SCARA) 1915; a syringe manipulator 1917; and a syringe conveyor 1919 which is engageable by the syringe manipulator for picking up a syringe and/or returning a syringe to the conveyor.

In some embodiments, system components are generally aligned along the bottom portion or adjacent to it in a manner which allows directly accessing them (e.g. for loading or unloading of containers) when the hood access window is open. This axial arrangement of system components along the bottom portion may be potentially advantageous in that the components are easily accessible and the user does not need to insert their hands far into a depth of the hood.

Figure 20:
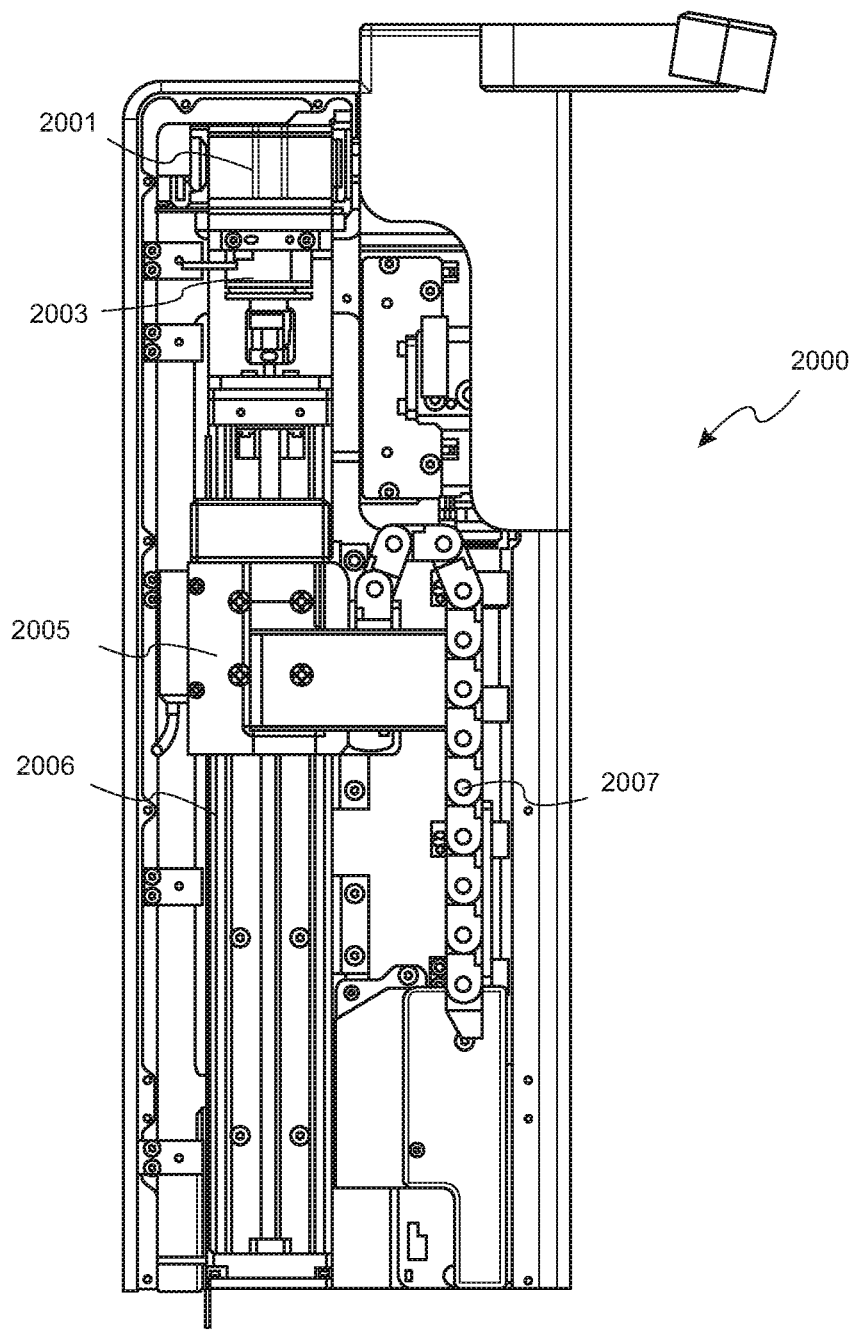
FIG. 20 shows an example of a connecting portion of the system infrastructure, with a side wall of the connecting portion removed for visibility of the internal components, in accordance with some embodiments.

FIG. 20 shows a connecting portion of the infrastructure with a side wall of the connecting portion removed for visibility of the internal components, in accordance with some embodiments.

In some embodiments, the connecting portion 2000 houses one or more mechanisms, electrical connections and optionally powering means enabling movement of the platform and/or of other modules of the system. Optionally, the mechanism(s) or components thereof are vertically arranged within an inner volume of the connecting portion.

In the example shown, a lift mechanism of the platform includes a motor 2001, connected via a bearing 2003 to an actuator 2005 which moves to the platform and along with the platform (the platform is not shown in this figure). In some embodiments, an encoder of the motor travels with the actuator along a magnetically encoded strip 2006 and monitors the movement to determine a position of the of actuator (and thereby of the platform).

Electrical connections (e.g. cables) for powering the motor are passed inside a chain belt 2007 which can be flexibly moved along with the platform. The electrical connections passing within the chain belt may be connected to a powering means which are external to the system, e.g. to a wall socket or a socket located inside the hood. Additionally or alternatively, internal powering means such as a battery may be provided.

In some embodiments, mechanisms of system components other than the platform can be at least partially contained within the connecting portion. Generally, motor(s) housed within the connecting portion are small, compact low power motors suitable to fit within a limited volume of the connecting portion. In some embodiments, each of the motors is directly coupled to the component that is moved by it, without intermediate transmission elements. Such direct coupling may provide for mechanisms which are relatively small in volume, that can be contained within the inner volume of the connecting portion.

FIGS. 21A-F are images showing automated movement of system component(s) which take place in at least two system axes simultaneously, according to some embodiments.

In some embodiments, movement in the system involves movement in two or more of the vertical, horizontal, and depth axes of the system. In some embodiments, movement of two or more system components is synchronized, for example so that one component is moved along one of the axes while a second component moves along another axis, simultaneously. Optionally, movement of at least one of the components is performed so that the component does not interfere with movement of the second component or otherwise stand in its way. Such synchronization can provide for multiple and complex manipulations of system components within the limited volume of the hood. Another potential advantage of synchronized movement may include the ability to selectively move components to a position which is accessible to the user (for example, via the window of the hood), optionally while moving other components away from the user. Another potential advantage of synchronized movement may include the ability to selectively expose components to one or more imagers of the system, for example for control and/or verification purposes.

In the example shown, movement of the platform 2101 is synchronized with movement of the vial holder 2103 and/or with movement of the syringe manipulator 2104. Generally, the platform is lifted and/or lowered along the vertical axis, the syringe manipulator slides axially along the horizontal axis; and the vial holder turns about the vial holder body 2105. In addition, a frame or a gripper 2107 which grasps the vial at the vial holder is configured to rotate so as to agitate or invert the vial.

Figure 21A:
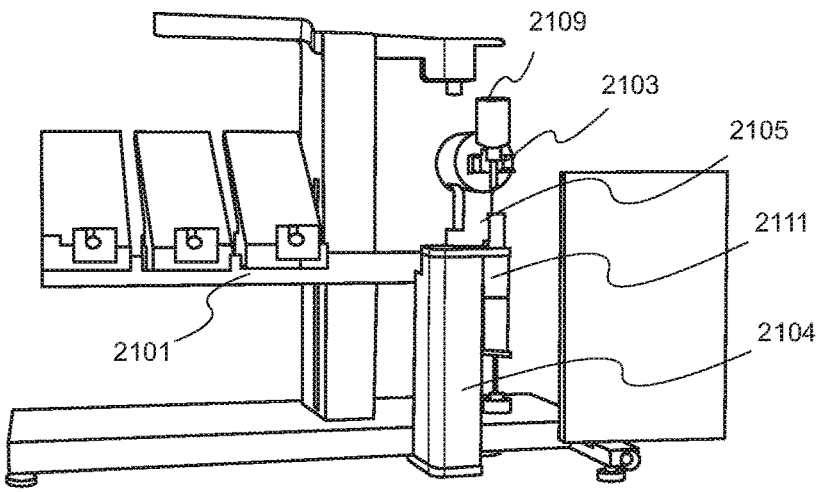
FIGS. 21A-F are images showing automated movement of system component(s) which take place in at least two system axes simultaneously, according to some embodiments.
Figure 21B:
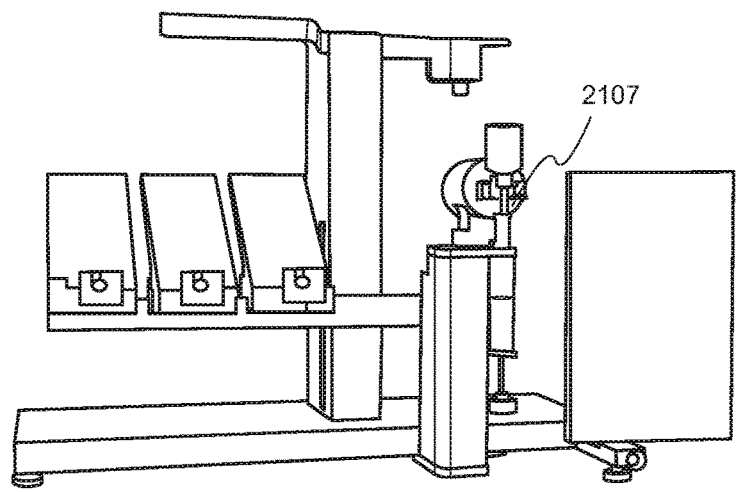
Figure 21C:
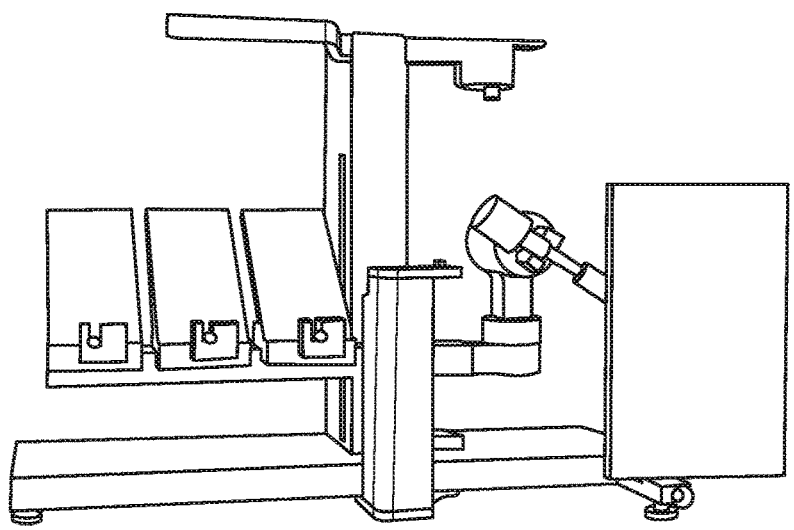

In the specific process shown: FIG. 21A shows the platform being lowered while the syringe manipulator is moved axially to a position that corresponds with the vial holder, so that an inverted vial 2109 held by the vial holder is brought into fluid communication with a syringe 2111 (optionally, via a syringe connector) held by the syringe manipulator. In FIG. 21B, the syringe and vial are connected, and the syringe is released from the syringe manipulator. In FIG. 21C, frame 2107 of the vial holder is rotated, thereby rotating the vial along with the syringe that was connected to it. Simultaneously to rotation of the frame, the vial holder turns, moving the vial and connected syringe further back (along a depth axis of the system).

Figure 21D:
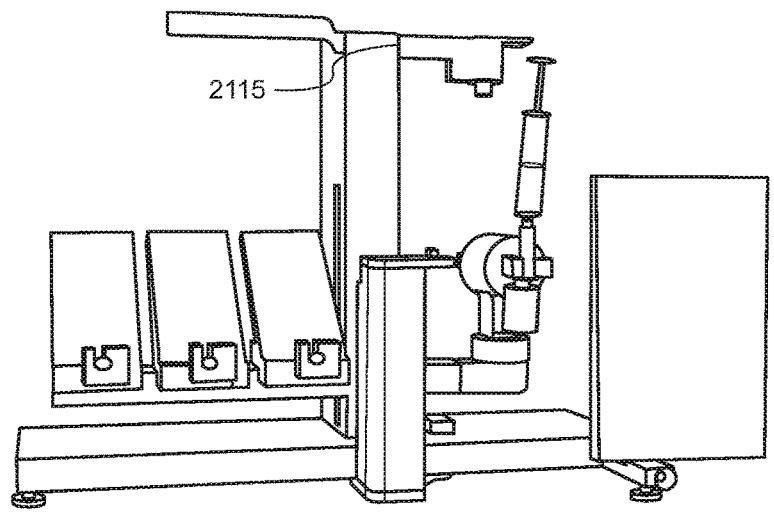

In a synchronized manner to the rotation of the frame and turning of the vial holder, platform 2101 is lowered to the level shown in FIG. 21D. By lowering the platform, an operational space is formed under a top portion 2115 of the infrastructure, enabling the syringe (which is now connected to the vial, above the vial) to fit underneath the top portion.

More generally, the platform can be raised or lowered in accordance with the vial orientation (e.g. if the vial is upright or inverted), and/or in accordance with components that are fitted vertically with respect to the vial, such as a syringe (when connected to the vial); an adaptor of the vial; a vial cap or others.

Figure 21E:
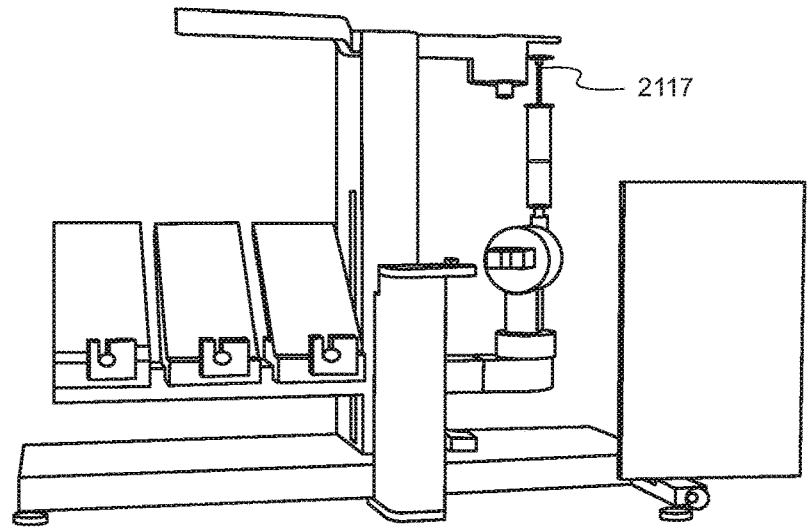
Figure 21F:
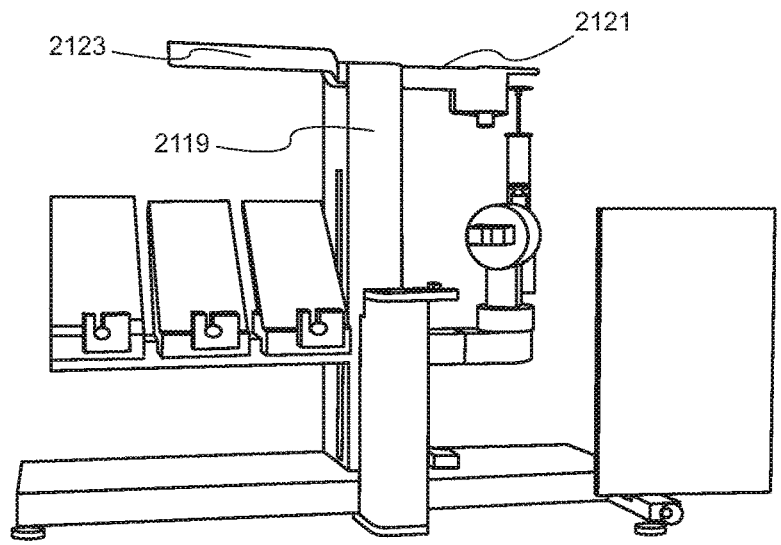

Referring back to FIG. 21, as shown in FIG. 21E, when the syringe and vial connected thereto are in a vertical orientation and directly aligned beneath the top portion, the platform is raised up again, as shown in FIG. 21F, causing a plunger 2117 of the syringe to be pushed against the top portion. This causes the fluid in the syringe to be pushed down into the vial. By setting the extent in which the platform is raised, a distance by which the plunger is pushed is controlled, thereby controlling the volume of fluid being transferred into the vial.

As further shown in FIGS. 21A-F, top portion 2115 of the infrastructure extends on both sides of the connecting portion 2119. A first portion 2121 can be located above the vial holder so that when a syringe connected to the vial is approximated thereto, the first portion 2121 presses on the syringe plunger for causing fluid in the syringe to be injected into the vial. A second portion 2123 can be located above the IV bag holder and can include an imager (not shown), such as for imaging labels on the IV bags or other components.

Figure 23A:
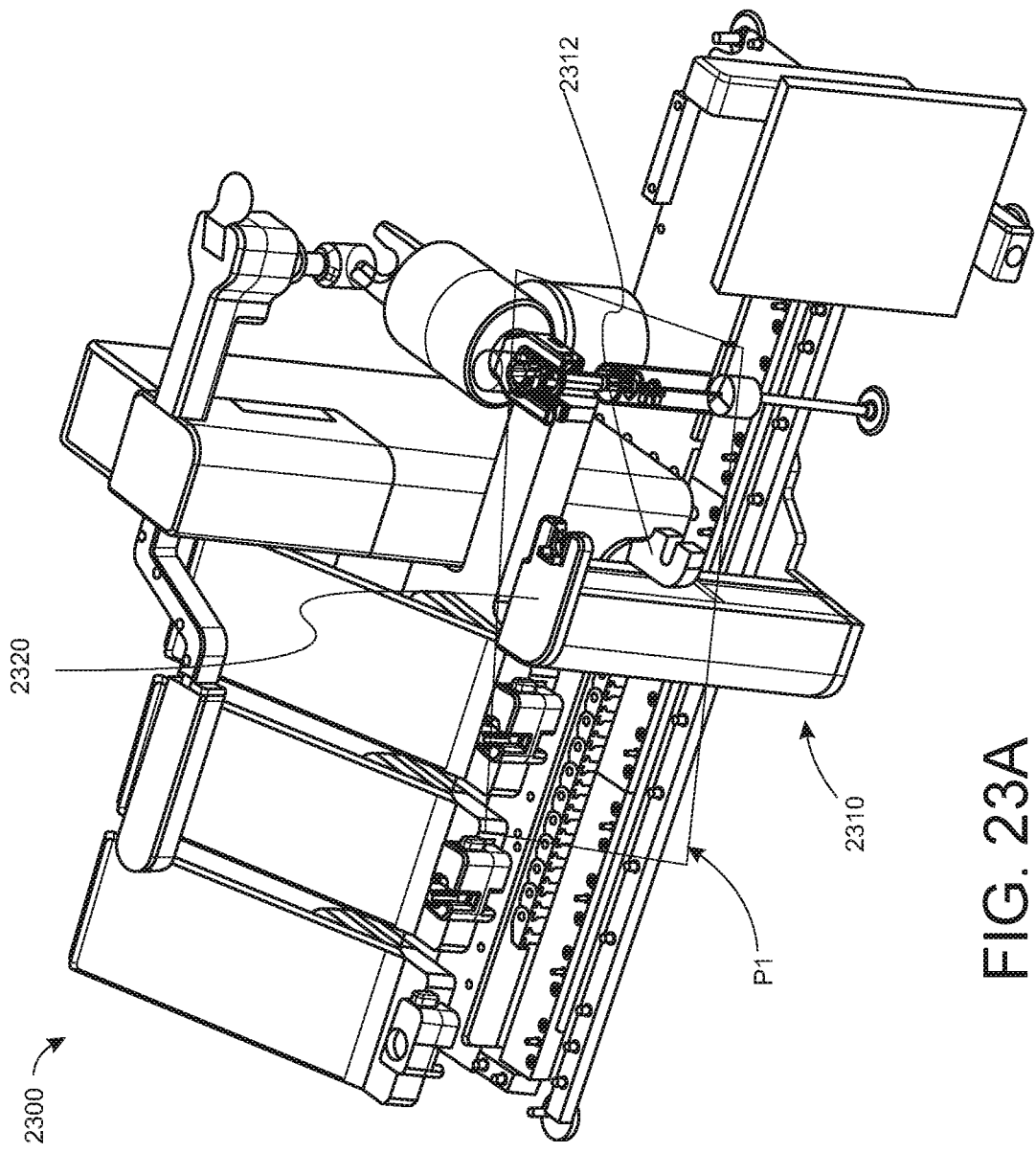
FIG. 23A is a perspective view of a manipulator within a pharmaceutical preparation system, according to an example of the presently disclosed subject matter.
Figure 23B:
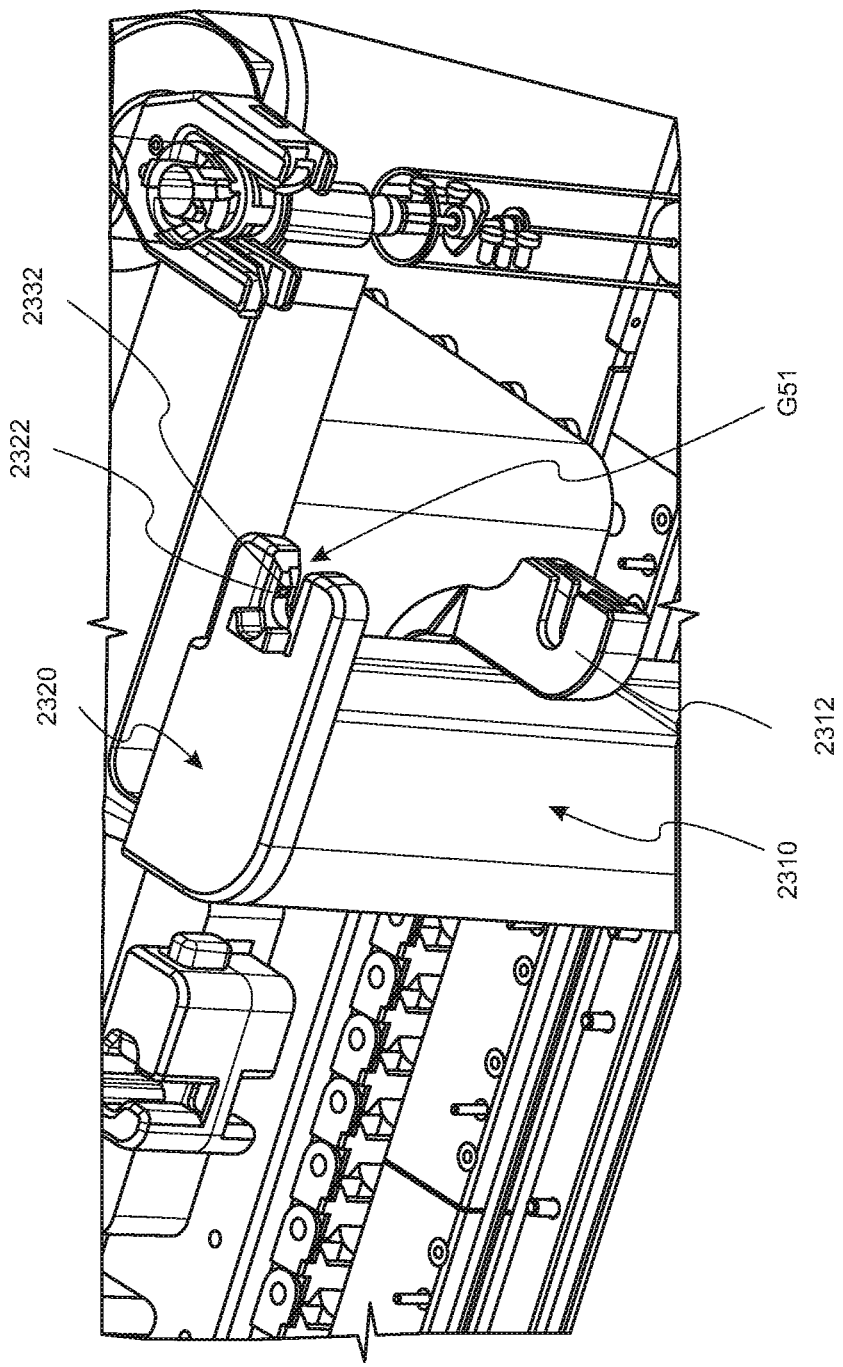
FIG. 23B is an enlarged view of portion P1 of the manipulator of FIG. 23A.
Figure 23C:
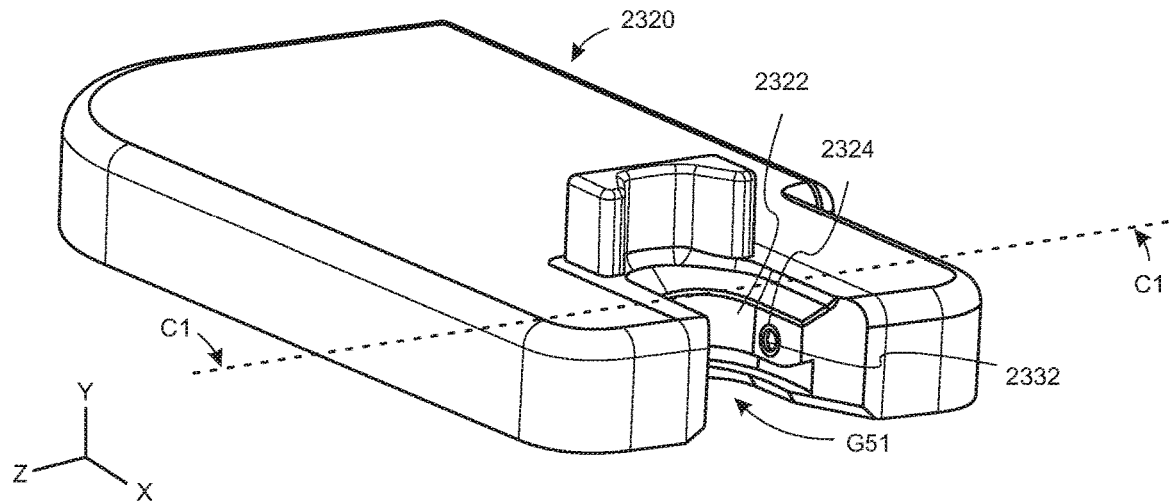
FIG. 23C is a perspective view of a gripper of the manipulator of FIG. 23A.
Figure 23D:
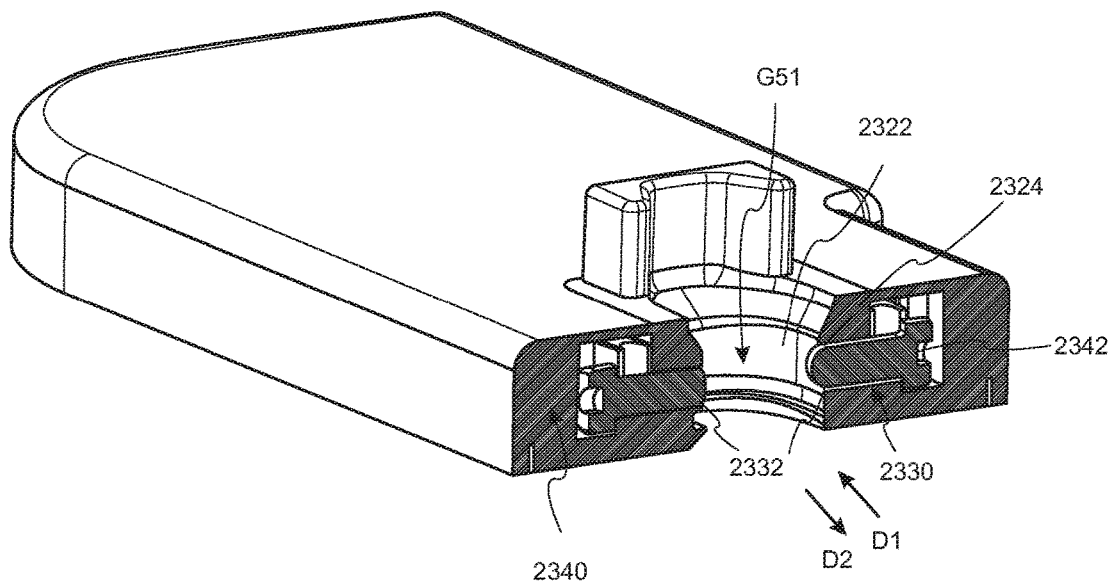
FIG. 23D is a cross-sectional view of the gripper of FIG. 23C taken along line C1-C1 in FIG. 23C.

Referring now to FIG. 23A, which illustrates a manipulator 2310 within a pharmaceutical preparation system 2300, according to an example of the presently disclosed subject matter. It is to be understood herein that the system 2300 can include some or all of the features of the pharmaceutical preparation systems described herein according to various embodiments, and the description of the components (for example, top portion, bottom portion, connecting portion, platform, and manipulator) of the pharmaceutical preparation systems described herein can apply to the corresponding components of the system 2300 as well. For instance, the manipulator 2310 is configured to hold and manipulate a container in a manner similar to the manipulators described herein with respect to the pharmaceutical preparation systems described herein according to various embodiments. In general, the manipulator can be any manipulator for holding any general container in a pharmaceutical preparation system. In some examples, the manipulator can be a syringe manipulator configured for holding and manipulating a syringe assembly, and comprising a plunger-flange receiver for operating a plunger of the syringe assembly.

The manipulator can comprise a gripper having a gripping space for receiving therewithin at least a portion of the container. The manipulator can comprise (for example, as a part of the gripper) a restriction mechanism configured to allow at least one of: a restricted removal of the container from the gripping space and a restricted introduction of the container into the gripping space. The manipulator can further comprise (for example, as a part of the gripper) a restriction biasing mechanism configured to bias the restriction mechanism towards the gripping space.

It is to be noted herein that for the purposes of the present description, the restricted removal and restricted introduction is to be understood as referring to a removal and introduction of the container from/into the gripping space by application of a first force on the container (for example, by any component of the system or manual), which first force can be greater than a force that would be required to be applied on the container for removing/introducing the container from/into the gripping space if the restriction mechanism was not there. In other words, the restricted removal and restricted introduction is to be understood as being interfered removal and introduction. For instance, the restriction mechanism can interfere (for example, by contacting the container) the introduction/removal of the container and allows the introduction/removal only upon application of a predetermined force on the container, in the direction of introduction/removal, for example, overcoming the biasing force applied by the biasing mechanism. In some examples, the restriction mechanism can have a structure and shape so as to be displaced with respect to the gripping space (to allow the restricted removal and/or introduction) by the force applied thereon by the container during the removal and/or introduction. In some examples, the restriction element(s) can have a structure that allows the container to slide along at least a portion of the restriction element(s), thereby allowing the restricted introduction/removal of the container.

In general, the restriction mechanism can include at least one restriction element protruding into the gripping space thereby restricting the access to the container into and/or out of the gripping space. The at least one restriction element can be biased by the biasing mechanism in a restriction bias direction into the gripping space by a biasing force. The restriction bias direction can extend from the at least one restriction element towards the gripping space. The at least one restriction element can be displaced in a direction opposite the restriction bias direction by application of a counter force (for example, the first force) countering the biasing force. The counter force can, for example, be applied by the container during removal/introduction of the container, and accordingly, the restriction element allows restricted removal and/or restricted introduction of the container from or into the gripping space. In some examples, the restriction biasing mechanism can comprise a spring configured to bias the restriction element into the gripping space. In some examples, the restriction biasing mechanism can include any suitable (electrical, mechanical, magnetic, or combinations thereof) biasing arrangement to bias the restriction mechanism. In some examples, the biasing of the restriction element(s) can be obtained by virtue of a structure, material, shape, or combination thereof of the restriction elements. For instance, the restriction mechanism can be structured (having a shape and/or material) to enable a snap fit engagement of the container with the gripper.

In general, the gripper can comprise a plurality of gripping members (e.g. clamps, jaws) defining therebetween the gripping space, and the restriction element(s) can protrude towards the gripping space from a corresponding gripping member. In some examples, the restriction element(s) can protrude towards the gripping space through a socket formed in a corresponding gripping member. In some examples, the at least one restriction element can be in the form of at least one rollable ball, positioned at least partially at an internal surface of a respective gripping member, and normally biased inwardly towards the gripping space. In some examples, the restriction element(s) can be separate and independent of the gripping members. It is to be understood herein that in some examples, the gripping members may not firmly hold the container and one or more of the gripping members may engage the container when the container is received in the gripping space. For instance, the manipulator can comprise another holder (for example, the plunger flange receiver in a syringe manipulator) for firmly holding the container, whereas the gripper can operate to maintain an alignment and/or orientation of the container, for example by virtue of the restriction mechanism not allowing the container to fall off, and stabilizing the container. Accordingly, the first force required to introduce/remove the container into/from the gripping space by overcoming the biasing force can be greater than a gravitational (or any other external) force acting on the container that may cause the container to change its orientation.

In the example illustrated in FIGS. 23A-D, the manipulator is a syringe manipulator configured for holding and manipulating a syringe assembly, and comprising the plunger-flange receiver (designated as 2312) for operating a plunger of the syringe assembly and the gripper (designated as 2320) having two gripping members 2322 formed as jaws defining therebetween the gripping space (designated as GS1). When a portion (for example, adaptor or barrel) of the syringe assembly is positioned within the gripping space, one or more of the gripping members 2322 can engage the portion of the syringe assembly.

The gripping members 2322 comprise corresponding sockets 2324 through which the corresponding restriction elements 2332 (constituting the restriction mechanism 2330 in the illustrated example), formed as two opposing rollable balls in the illustrated example, protrude into the griping space GS1. The restriction biasing mechanism (designated as 2340) comprises springs 2342 operatively associated with corresponding rollable balls 2332 to bias the rollable balls 2332 towards the gripping space GS1. The rollable balls 2332, thus, restrict the access into and out from the gripping space GS1. When the container (for example, syringe assembly) is being introduced into the gripping space GS1 from exterior of the gripper, for example along the introduction direction D1, the restriction elements 2332 interferes with the introduction. The restriction elements 2332 allow the container to pass therebetween only upon application of a first force in the introduction direction D1 countering the biasing force, which first force causes the restriction elements 2332 to displace away from the gripping space GS1, for example, into the sockets 2324, against the biasing force. Accordingly, the restriction mechanism 2330 allows a restricted introduction of the container into the gripping space. For instance, if the restriction elements were not present, the force required to introduce the container into the gripping space would be lesser than the first force, as there would be no biasing force to be overcome.

Similarly, when the container (for example, syringe assembly) is being removed from the gripping space GS1 from interior of the gripper, for example along the removal direction D2, the restriction elements 2332 interferes with the removal. The restriction elements 2332 allow the container to pass therebetween only upon application of the first force in the removal direction D2 countering the biasing force, which first force causes the restriction elements 2332 to displace away from the gripping space GS1, for example, into the sockets 2324, against the biasing force. Accordingly, the restriction mechanism 2330 allows a restricted removal of the container from the gripping space. For instance, if the restriction elements were not present, the force required to remove the container from the gripping space would be lesser than the first force, as there would be no biasing force to be overcome.

In the illustrated example, the rolling of the rollable allows the container to move along the balls. In some examples, the restriction elements may not be rollable, and can be configured to (by virtue of structure, shape, and/or material thereof) allow the container to slide along the restriction elements. In some examples, the restriction mechanism can have only one restriction element protruding into the gripping space, for example from a gripping member. For instance, the restriction mechanism can include one rollable ball protruding from the gripping member into the gripping space.

Referring now to FIGS. 24A-J, which illustrate a gripper 2420 of a manipulator for use in a pharmaceutical preparation system, according to an example of the presently disclosed subject matter. It is to be understood herein that the pharmaceutical preparation system can be any one of the pharmaceutical preparation systems described herein according to various embodiments, or any other pharmaceutical preparation system. The manipulator can be any one of the manipulators described herein according to various embodiments, or any other manipulator generally configured to hold and manipulate a container. For instance, the manipulator can be configured to hold and manipulate a container in a manner similar to the manipulators described herein with respect to the pharmaceutical preparation systems described herein according to various embodiments. In general, the manipulator can be any manipulator for holding any general container in a pharmaceutical preparation system. In some examples, the manipulator can be a syringe manipulator configured for holding and manipulating a syringe assembly, and comprising a plunger-flange receiver for operating a plunger of the syringe assembly.

It is to be understood herein that the gripper 2420 can include some or all of the features of the gripper 2320, and the description thereof provided herein above can apply to corresponding features of the gripper 2420 as well.

In general, the gripper 2420 can be configured for receiving therewithin at least a portion of the container. The gripper can be displaceable between a closed state in which the gripper at least partially grips the container and an open state in which the gripper allows at least a restriction-free removal of the container from the gripper. The gripper can comprise a restriction mechanism configured to, at the closed state of the gripper, allow at least one of: a restricted removal of the container from the gripper and a restricted introduction of the container into the gripper.

It is to be noted herein that for the purposes of the present description, the restricted removal and restricted introduction is to be understood as referring to a removal and introduction of the container from/into the gripper by application of a first force on the container (for example, by any component of the system or manual), which first force can be greater than a force that would be required to be applied on the container for removing/introducing the container from/into the gripper if the restriction mechanism is not there or when the gripper is in the open state. In other words, the restricted removal and restricted introduction is to be understood as being interfered removal and introduction. For instance, the restriction mechanism can interfere (for example, by contacting the container) the introduction/removal of the container, and allow the introduction/removal only upon application of a predetermined force on the container, in the direction of introduction/removal. In some examples, the restriction mechanism can have a structure and shape so as to be displaced (to allow the restricted removal and/or introduction) by the force applied thereon by the container during the removal and/or introduction. In some examples, the restriction element(s) can have a structure that allows the container to slide along at least a portion of the restriction element(s), thereby allowing the restricted introduction/removal of the container.

It is to be noted herein that for the purposes of the present description, the restriction-free removal and restriction-free introduction is to be understood as referring to a removal and introduction of the container from/into the gripper by application of a second force on the container (for example, by any component of the system or manual), which is lesser than the first force. For instance, in the open state, the restriction mechanism can be displaced so as to not interfere with the removal/introduction of the container, thereby not restricting the removal/introduction of the container, thereby allowing restriction-free removal and/or restriction-free introduction of container from/into the gripper. In other words, at the open state, the removal/introduction of the container from/into the gripper is free of any restriction or resistance, and hence the container can be removed from and introduced into the gripper by application of a second force on the container (for example, by any component of the system or manual), which is lesser than the first force. In some examples, the second force can be as less as a force required to cause the container to fall off from the gripper, for example, a gravitational force or any other external force.

The gripper can further comprise at least one actuation mechanism configured for at least one of: displacing the gripper from the closed state to the open state, and displacing the gripper from the open state to the closed state. In some examples, the actuation mechanism can be controlled by a controller, for example, a controller of the system or the manipulator, to selectively displace the gripper from the closed state to the open state and/or from the open state to the closed state.

In general, the gripper can comprise a plurality of gripping members (e.g. jaws, clamps) defining therebetween a gripping space. The gripping space can be a variable space, which upon displacement of the gripper from the closed state to the open state, can be expanded, and upon displacement of the gripper from the open state to the closed state, can be contracted. It is to be understood herein that in some examples, the gripping members, in the closed state, may not firmly hold the container and one or more of the gripping members may engage the container when is container is received in the gripping space. For instance, the manipulator can comprise another holder (for example, the plunger flange receiver in a syringe manipulator) for firmly holding the container, whereas the gripper can operate to maintain an alignment and/or orientation of the container, for example by virtue of the restriction mechanism not allowing the container to fall off. Accordingly, the first force required to introduce/remove the container into/from the gripping space by overcoming the biasing force can be greater than a gravitational (or any other external) force acting on the container that may cause the container to change its orientation.

In general, the restriction mechanism can include at least one restriction element protruding into the gripping space, at least at the closed state, thereby restricting the access to the container into and/or out of the gripping space. The at least one restriction element, at the closed state, can at least partially interfere (for example, by contacting the container) with removal and/or introduction of the container from/into the gripping space, thereby allowing the corresponding restricted removal and/or restricted introduction of the container from/into the gripper. In some examples, the restriction mechanism can be same as the restriction mechanism described above with respect to the manipulator 2310, and all of the description (general as well as that of the illustrated example) can apply to the restriction mechanism of the gripper 2420. For instance, the gripper can comprise a restriction biasing mechanism configured to bias the at least one restriction element towards the gripping space, for example in a restriction bias direction extending from the at least one restriction element towards the gripping space. In some examples, the gripper may not comprise a restriction biasing mechanism, and the at least one restriction element can be actuated by the at least one actuation mechanism to be selectively positioned within the gripping space to interfere with the introduction/removal of the container, and to be selectively positioned so as not to interfere with the introduction/removal of the container. In some examples, the gripper can comprise a restriction biasing mechanism configured to bias the at least one restriction element towards the gripping space, for example in a restriction bias direction extending from the at least one restriction element towards the gripping space, and the at least one actuation mechanism can be configured to displace the at least one restriction element in a direction opposite the restriction bias direction (or away from the gripping space) to be selectively positioned so as not to interfere with the introduction/removal of the container.

In some examples, the actuation mechanism can be configured to displace the gripper into the open state by expanding the gripping space by either or both of: moving at least one the gripping members away from at least another one of the gripping members, and moving the at least one restriction element to be positioned so as not to interfere with the introduction/removal of the container. In some examples, the actuation mechanism can be configured to displace the gripper into the closed state by contracting the gripping space by either or both of: moving at least one the gripping members towards at least another one of the gripping members, and moving the at least one restriction element towards the gripping space to be positioned so as to interfere with the introduction/removal of the container.

In general, the gripper can comprise a gripper biasing mechanism configured to bias at least one of the gripping members in one of: a first gripper bias direction extending from the gripping space towards said at least one gripping member, and a second gripper bias direction extending from said at least one gripping member towards the gripping space. The at least one actuation mechanism can be configured to selectively displace the at least one gripping member in a direction opposite to the gripper bias direction. In some examples, the gripper biasing mechanism can be configured to bias at least one of the gripping members in a first gripper bias direction extending from the gripping space towards said at least one gripping member, thereby biasing the gripper towards the open state, and the at least one actuation mechanism can be configured to selectively displace the gripper into the closed state. In some examples, the gripper biasing mechanism can be configured to bias at least one of the gripping members in a second gripper bias direction extending from said at least one gripping member towards the gripping space, thereby biasing the gripper towards the closed state, and the at least one actuation mechanism can be configured to selectively displace the gripper into the open state. The gripper biasing mechanism can include a spring.

In general, each of the gripping members can comprise a corresponding internal surface at least partially defining the gripping space and an opposite external surface. The gripper biasing mechanism can be configured to bias at least one of the gripping members in the first gripper bias direction extending from the corresponding internal surface towards the corresponding external surface, and the at least one actuation mechanism can be configured to engage the corresponding external surface to selectively displace the at least one gripping member in a direction opposite the first gripper bias direction. For instance, at the closed state, the at least one actuation mechanism maintains the at least one gripping member in a first position associated with the closed state, and for displacing the gripper into the open state, the at least one actuation mechanism is configured to allow the at least one gripping member to move under the influence of the gripper biasing mechanism into a second position associated with the open state. In some examples, the gripping members can be formed as jaws, and the at least one actuation mechanism is formed as bracket positioned radially outwardly to the jaws.

In some examples, the at least one actuation mechanism can comprise a single actuator to actuate the gripping members as well as the restriction mechanism (in examples in which the at least one actuation mechanism actuates the restriction mechanism). In some examples, in which the at least one actuation mechanism actuates the restriction mechanism, the at least one actuation mechanism can comprise separate actuators to actuate the gripping members and the restriction mechanism. The actuators can have any structure (electrical, mechanical, magnetic, combinations thereof) suitable to displace the gripping members and/or the restriction mechanism, in the manner described herein.

In the example illustrated in FIGS. 24A-J, the gripper 2420 has two gripping members 2422 formed as jaws defining therebetween the gripping space (designated as GS2). The gripping members 2422 comprise corresponding sockets 2424 through which the corresponding restriction elements 2432 (constituting the restriction mechanism 2430 in the illustrated example), formed as two opposing rollable balls in the illustrated example, protrude into the griping space GS2. It is to be understood herein that the restriction mechanism 2430 is same as, and operates, at least in the closed state of the gripper, in the same manner as the restriction mechanism 2330 described with respect to FIGS. 23A-D, and the description of the restriction mechanism 2330 provided above applies to the restriction mechanism 2430 as well.

The gripper 2420 comprises a restriction biasing mechanism (not shown), which is same as, and operates, at least in the closed state of the gripper, in the same manner as the restriction biasing mechanism 2340 described with respect to FIGS. 23A-D, and the description of the restriction biasing mechanism 2340 provided above applies to the restriction biasing mechanism of the gripper 2420 as well.

The gripping members 2422 have internal surfaces 2422A defining the gripping space GS2, and opposite external surfaces 2422B. The gripper biasing mechanism (designated as 2426), which in the illustrated example, is a spring 2426 biases the gripping members 2422 away from each other, thereby biasing the gripper 2420 into the open state (FIGS. 24F-J). The actuation mechanism (designated as 2450), formed in the illustrated example as bracket 2450 is positioned radially outwardly to the jaws 2422. The bracket is configured to contact the external surface 2422B of the jaws to selectively displace the jaws towards each other to displace the gripper in the closed state (FIGS. 24A-E), as described herein below.

The gripper can be configured so that the spring normally pushes the jaws away from each other, while the bracket 2450 counteracts the spring to maintain the jaws in a closed state. As can be best seen in FIGS. 24C-E, at the closed state of the gripper, the bracket 2450 is at a first actuator position AP1 with respect to the jaws 2422. The actuation portions 2452 of the bracket 2450 contact the external surfaces 2422B of the jaws and maintains the jaws in the closed state. In order to displace the gripper into the open state, the bracket 2450 is moved (for example, by a controller of the system or the manipulator, or any other controller) in a rearward direction RD, thereby allowing the jaws 2422 to move away from each other under the influence of biasing force of the spring 2426, thereby expanding the gripping space GS2 and displacing the gripper 2420 into the open state (FIGS. 24F-J).

Figure 24A:
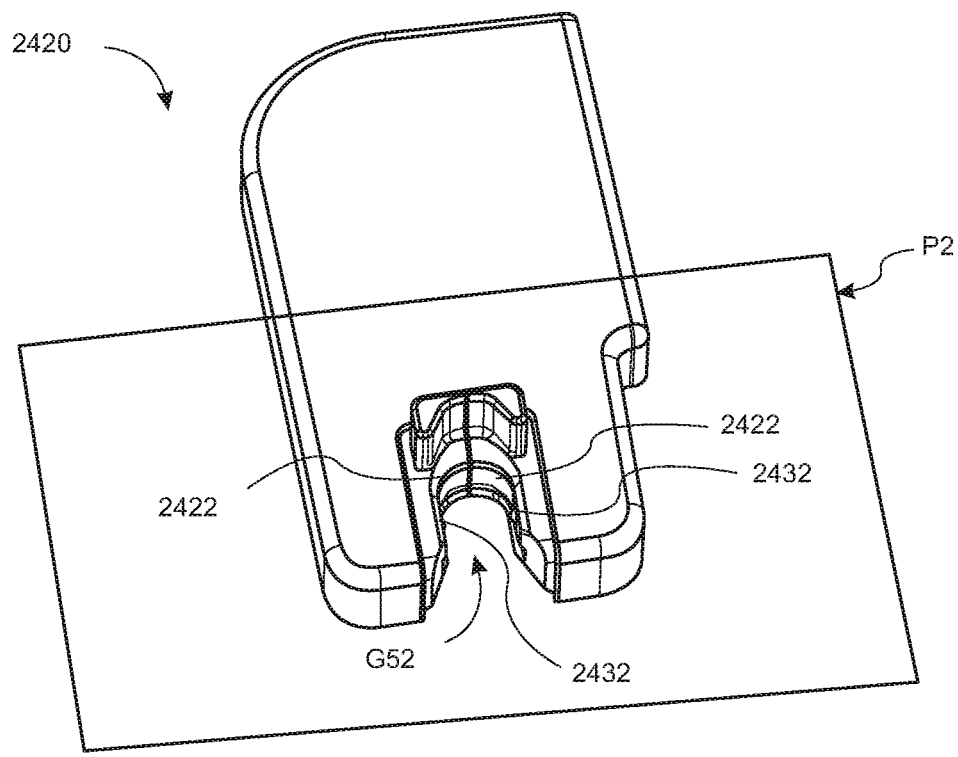
FIG. 24A is a top perspective view of a gripper of a manipulator, according to an example of the presently disclosed subject matter, shown in a closed state.
Figure 24B:
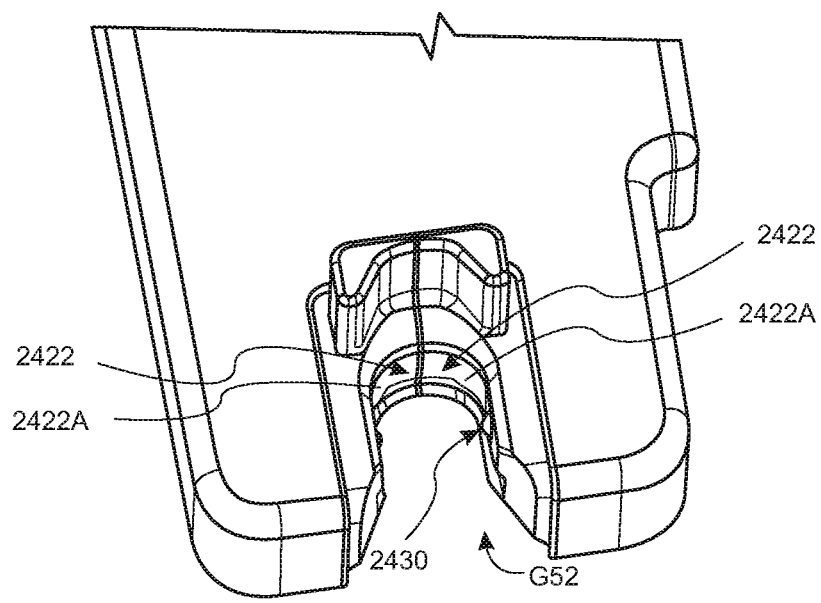
FIG. 24B is an enlarged view of portion P2 of the gripper of FIG. 24A.
Figure 24C:
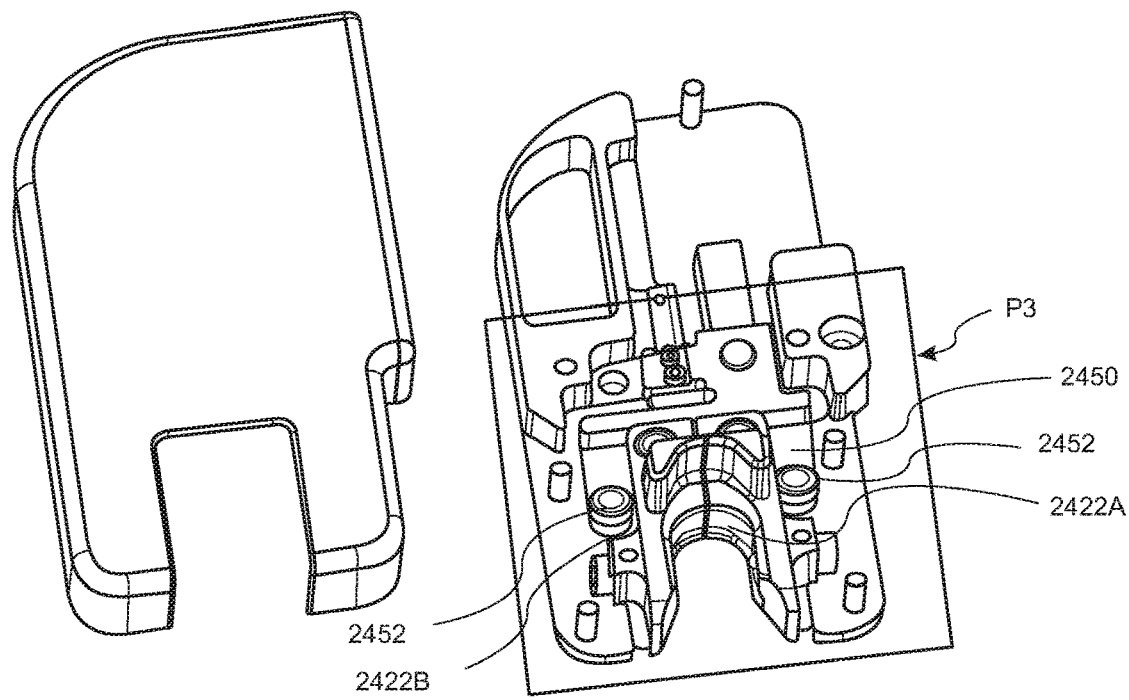
FIG. 24C is a partially exploded view of the gripper of FIG. 24A.
Figure 24D:
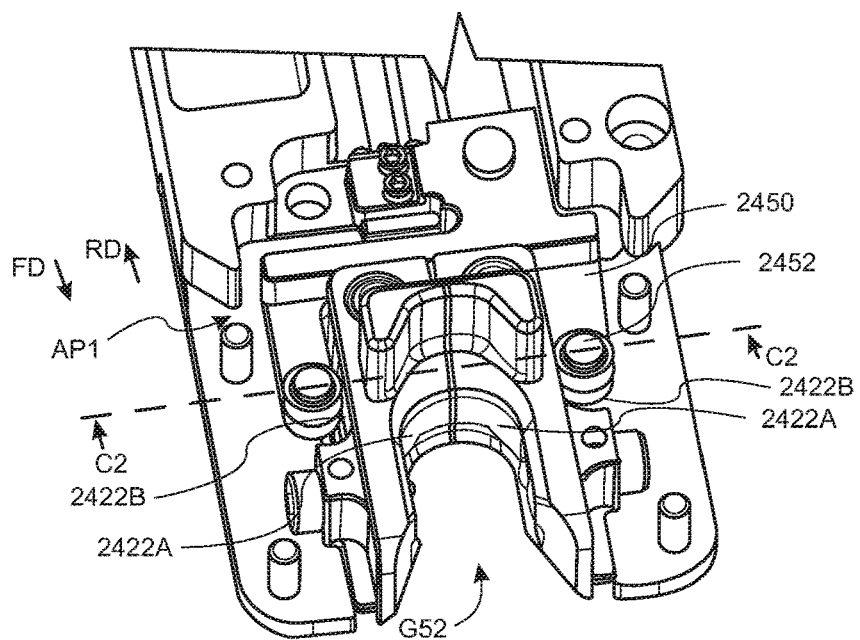
FIG. 24D is an enlarged view of portion P3 of the gripper as shown in FIG. 24C.
Figure 24E:
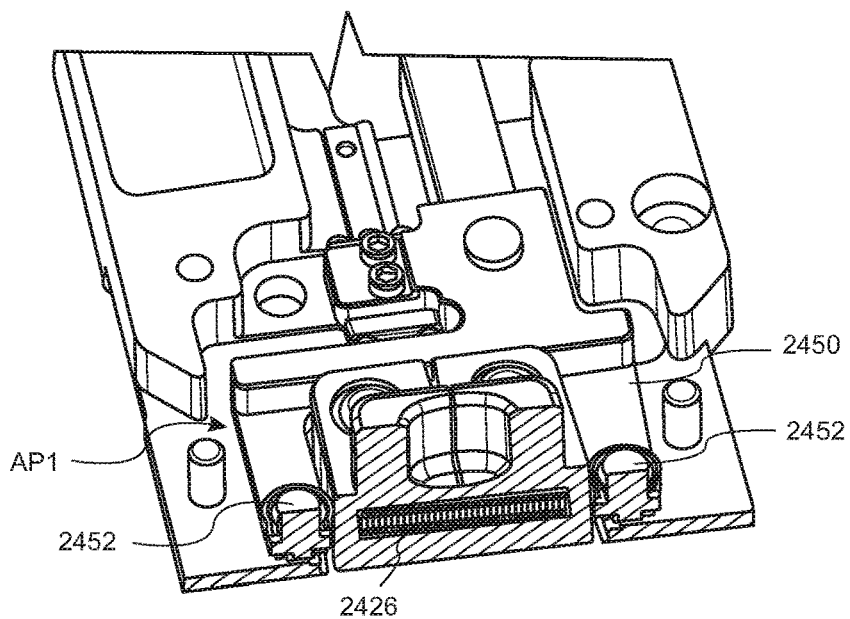
FIG. 24E is a cross-sectional view of the gripper as shown in FIG. 24D taken along line C2-C2 in FIG. 24D.
Figure 24F:
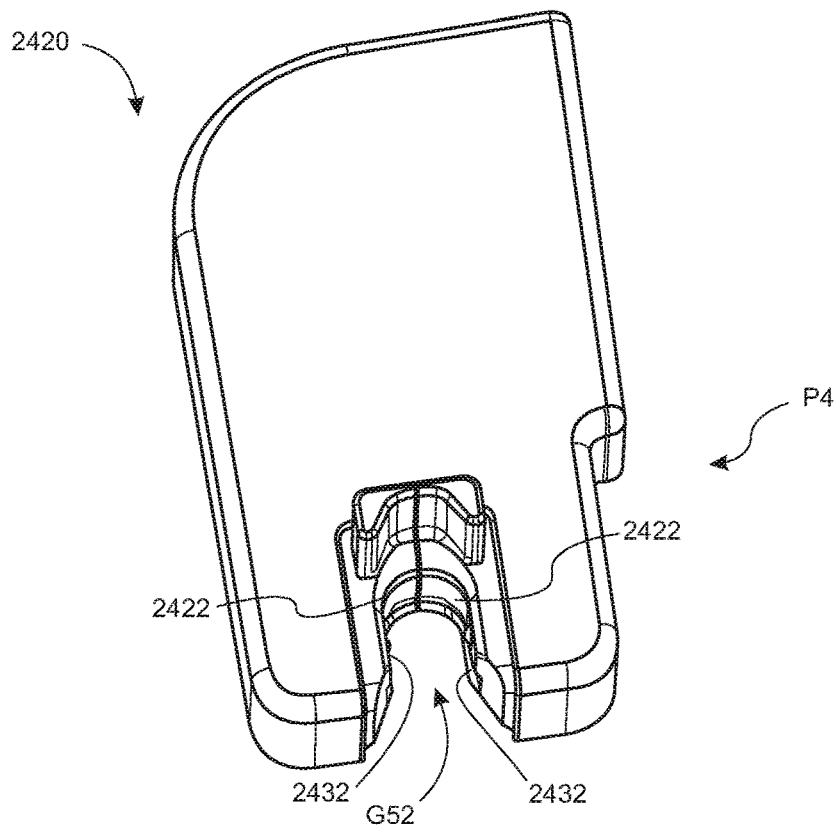
FIG. 24F is a top perspective view of the gripper of FIG. 24A, shown in a closed state.
Figure 24G:
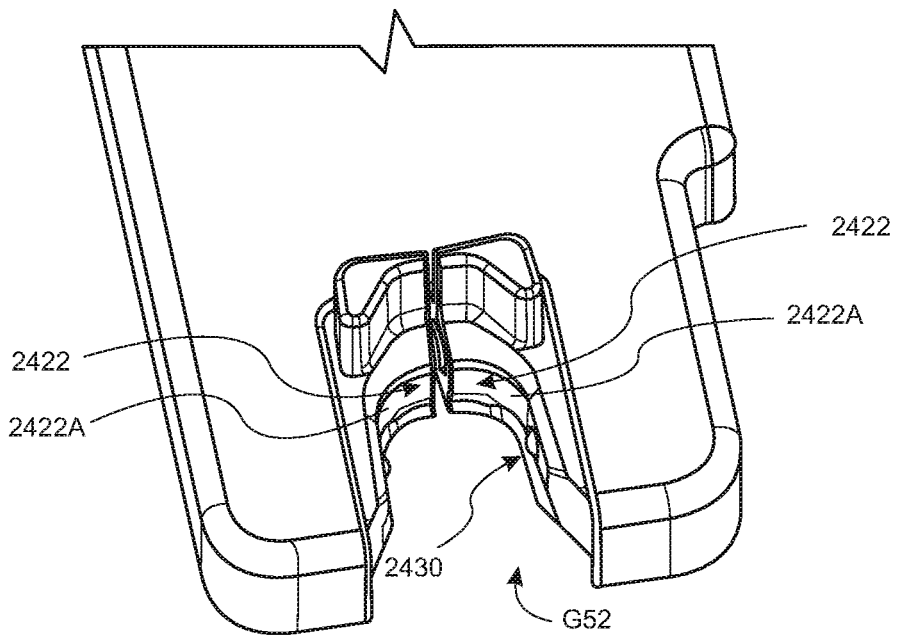
FIG. 24G is an enlarged view of portion P4 of the gripper of FIG. 24F.
Figure 24H:
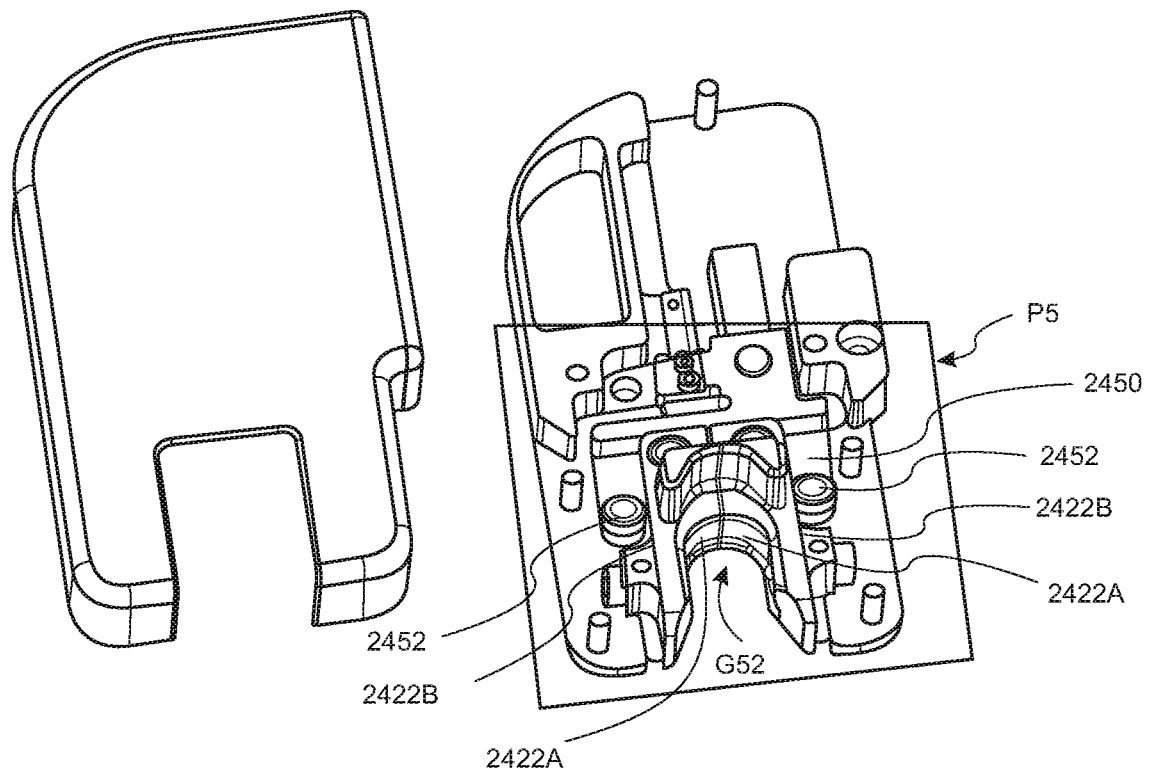
FIG. 24H is a partially exploded view of the gripper of FIG. 24F.
Figure 24I:
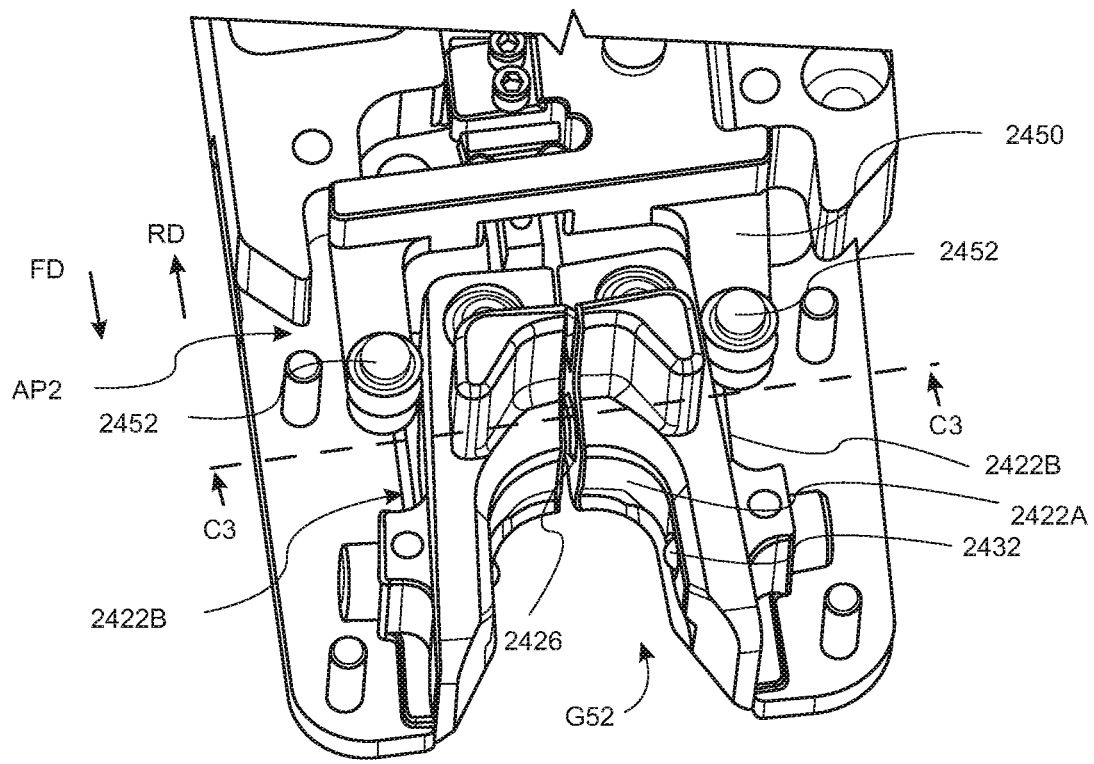
FIG. 24I is an enlarged view of portion P5 of the gripper as shown in FIG. 24H.
Figure 24J:
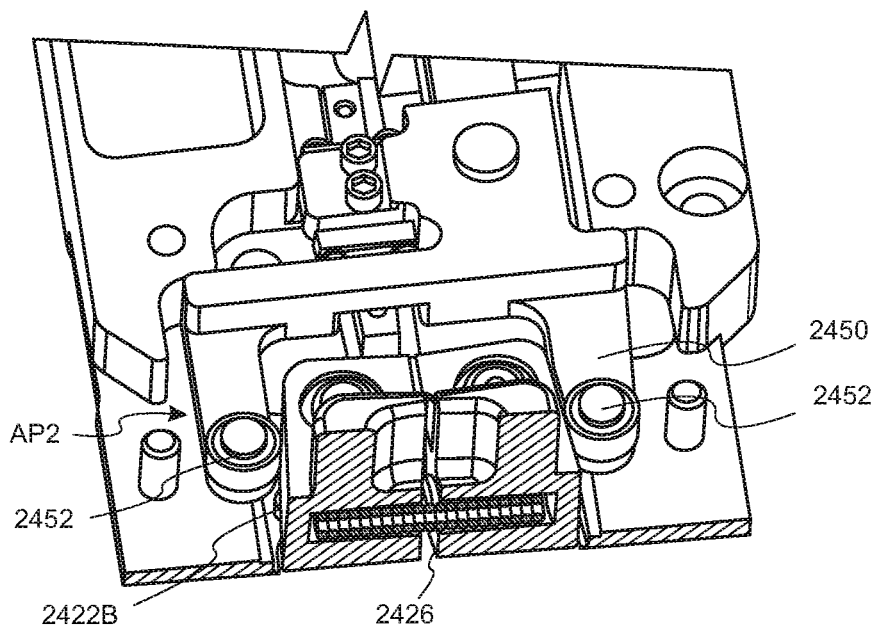
FIG. 24J is a cross-sectional view of the gripper as shown in FIG. 24I taken along line C3-C3 in FIG. 24I.

As can be best seen in FIGS. 24H-J, at the open state of the gripper 2420, the bracket 2450 is at a second actuator position AP2 with respect to the jaws 2422. In order to displace the gripper into the closed state, the bracket 2450 is moved (for example, by a controller of the system or the manipulator, or any other controller) in a forward direction FD, thereby displacing the jaws 2422 towards each other against the biasing force of the spring 2426, thereby contracting the gripping space GS2 and displacing the gripper 2420 into the closed state (FIGS. 24F-J). It is to be understood herein that although the actuation portions 2452 of the bracket 2450 have been shown as being rollable on the external surface 2422B, in some examples, the actuation portions 2452 of the bracket 2450 can be slidable on the external surface 2422B. In some examples, the actuation portions 2452 of the bracket 2450 can be configured to move towards and/or away from each other to displace the gripper into the closed and/or open state.

In operation, the container can be introduced into and/or removed from the gripper while the gripper is in the closed state, i.e., the restricted introduction/removal of the container into/from the gripper due to the interference offered by the restriction elements 2432. For smooth (restriction-free) introduction/removal of the container into/from the gripper, the gripper can be displaced into the open state thereby allowing restriction-free introduction/removal of the container into/from the gripper. Potential advantages of restriction free (which can also be defined as resistance free) removal of the container from the gripper may include reducing shaking or quivering of the container (and therefor of any fluid contents of the container); reducing a risk of mechanical damage to the container and/or the grippers, such as breakage; and generally smoothing the transfer of the container from the gripper.

It is to be understood herein that for displacing the gripper into the open state, in some examples, the restriction elements can be actuated to be displaced out of the way of the introduction/removal of the container.

The invention claimed is:
1. A pharmaceutical preparation system comprising:
a rigid system infrastructure including a top portion, a bottom portion substantially parallel to the top portion, and a connecting portion extending between the top and the bottom portions along a vertical axis;
at least one platform comprising multiple container-receiving modules each configured to receive at least one fluid container; and
a lift mechanism configured as part of the connecting portion, the lift mechanism being operably connected to the platform for lifting and lowering the platform along the vertical axis relative to the connecting portion, to selectively bring the at least one fluid container received at at least one of the container-receiving modules into an interface with one or more system components configured at or connected to at least one of the top portion and the bottom portion.

2. The system according to claim 1, wherein the platform is parallel to the top and bottom portions and has a long horizontal dimension which is substantially perpendicular to the vertical axis.

3. The system according to claim 2, wherein the multiple container-receiving modules are arranged linearly along the horizontal dimension of the platform.

4. The system according to claim 2, wherein if the platform length, as measured along the horizontal dimension, is "D", then at least in a front view of the system the connecting portion and the platform cross each other at a location within the range of 0.1 D-0.9 D.

5. The system according to claim 2, wherein at least in a front view of the system the connecting portion and the platform cross each other at a substantial center of the horizontal dimension of the platform.

6. The system according to claim 1, wherein the lift mechanism comprises a servo motor which is housed within the connecting portion.

7. The system according to claim 1, wherein the top portion extends laterally on both sides of the connecting portion.

8. The system according to claim 1, wherein the infrastructure is shaped and sized to fit within a standard hood.

9. The system according to claim 1, wherein the top portion and the connecting portion define a T shape, and the bottom portion and the connecting portion define an inverted T shape.

10. The system according to claim 1, wherein the connecting portion is formed in one or more parts, at least one of said one or more parts being detachably connectable to at least one of: at least another one of said one or more parts, and at least one portion of the rigid system infrastructure.

11. The system according to claim 10, said at least one part of the connecting portion being connected to the top portion and being detachable together therewith.

12. The system according to claim 1, wherein the one or more system components include a manipulator located at the bottom portion and configured for holding and manipulating a second container; and a movement mechanism operably connected to the manipulator for linearly displacing the manipulator along the bottom portion of the infrastructure.

13. The system according to claim 12, comprising a controller configured for: instructing the lift mechanism to lift or lower the platform; instructing the movement mechanism to linearly displace the manipulator; synchronizing actuation of the lift mechanism and the movement mechanism to enable a fluid interface between the container received at the container-receiving module and the second container held by the manipulator.

14. The system according to claim 12, wherein the container received at the container-receiving module comprises a vial or an IV bag, and the second container held by the manipulator comprises a syringe assembly.

15. The system according to claim 12, wherein the one or more system components further include one or more of: an imager, a plunger-pushing portion, and a vial aligner for rotation of a fluid container in the form of a vial.

16. The system according to claim 15, wherein one or more system components are located at the top portion of the infrastructure.

17. The system according to claim 12, wherein a rail is positioned along at least a portion of the length of the bottom portion, and the movement mechanism comprises a linear motor for driving the manipulator on the rail.

18. The system according to claim 12, wherein the movement mechanism is configured to linearly displace the manipulator between: a home position in which the platform can be leveled with the manipulator; and a plurality of working positions in which a fluid interface between the at least one fluid container and the second container can be obtained.

19. The system according to claim 18, wherein at least the bottom portion extends along the horizontal axis to an extent longer than the platform, and wherein at the home position the manipulator is located adjacent the platform, and at each of the working positions the manipulator is located under the platform.

20. The system according to claim 1, wherein the multiple container-receiving modules are non-removable parts of the system.

21. The system according to claim 1, wherein the multiple container-receiving modules can be operated simultaneously.

22. The system according to claim 1, wherein at least the bottom portion extends along the horizontal axis to an extent longer than the platform.

23. The system according to claim 1, wherein the multiple container-receiving modules are configured to receive different types of fluid containers.

* * * * *

UNITED STATES PATENT AND TRADEMARK OFFICE
CERTIFICATE OF CORRECTION

PATENT NO. : 12,169,416 B1
APPLICATION NO. : 18/584981
DATED : December 17, 2024
INVENTOR(S) : Eric Shem-Tov, Marino Kriheli and Boaz Slav Page 1 of 1

It is certified that error appears in the above-identified patent and that said Letters Patent is hereby corrected as shown below:

In the Specification

Column 6, Line 30 change:
"0.1 D-0.9 D"
To:
--0.1D - 0.9D--

Column 18, Line 17 change:
"0.1 D-0.9 D"
To:
--0.1D - 0.9D--

Column 39, Lines 2-3 change:
"0.1 D-0.9 D"
To:
--0.1D - 0.9D--

In the Claims

Column 49, Line 12 (Claim 4) change:
"0.1 D-0.9 D"
To:
--0.1D - 0.9D--

Signed and Sealed this
Thirtieth Day of September, 2025

John A. Squires
*Director of the United States Patent and Trademark Office*